(12) United States Patent
Coney et al.

(10) Patent No.: US 8,851,043 B1
(45) Date of Patent: Oct. 7, 2014

(54) ENERGY RECOVERY FROM COMPRESSED GAS

(71) Applicant: LightSail Energy, Inc., Berkeley, CA (US)

(72) Inventors: Michael Coney, Swindon (GB); Karim Wazni, Danville, CA (US); Danielle A. Fong, Oakland, CA (US); Stephen E. Crane, Santa Rosa, CA (US); Edwin P. Berlin, Jr., Oakland, CA (US)

(73) Assignee: LightSail Energy, Inc., Berkeley, CA (US)

( * ) Notice: Subject to any disclaimer, the term of this patent is extended or adjusted under 35 U.S.C. 154(b) by 0 days.

(21) Appl. No.: 13/836,790

(22) Filed: Mar. 15, 2013

(51) Int. Cl.
*F02B 75/32* (2006.01)
*F02G 3/00* (2006.01)
*F01B 9/02* (2006.01)
*F02B 41/04* (2006.01)
*F02B 75/02* (2006.01)

(52) U.S. Cl.
CPC . *F02G 3/00* (2013.01); *F01B 9/023* (2013.01); *F02B 41/04* (2013.01); *F02B 75/32* (2013.01); *F02B 2075/025* (2013.01)
USPC ...................................................... 123/197.4

(58) Field of Classification Search
USPC ..................................................... 123/197.1
See application file for complete search history.

(56) References Cited

U.S. PATENT DOCUMENTS

| | | |
|---|---|---|
| 1,751,537 A | 3/1930 | Vianello |
| 1,929,350 A | 10/1933 | Christensen |
| 3,585,795 A | 6/1971 | Grieb |
| 3,797,237 A * | 3/1974 | Kamiya ........................ 123/239 |
| 4,393,653 A | 7/1983 | Fischer |
| 4,426,847 A | 1/1984 | Fischer |
| 4,432,203 A | 2/1984 | Fischer |
| 4,476,821 A * | 10/1984 | Robinson et al. ............... 123/68 |
| 4,747,271 A | 5/1988 | Fischer |

(Continued)

FOREIGN PATENT DOCUMENTS

| | | |
|---|---|---|
| JP | 2007-502389 A | 2/2007 |
| WO | WO 01/75290 A1 | 10/2001 |
| WO | WO 03/021702 A1 | 3/2003 |

OTHER PUBLICATIONS

Farmer, Robert et al., "2012 GTW Handbook", Gas Turbine World, 2012, pp. 3, 10, 48, 79, vol. 29, Pequot Publishing Inc., Fairfield CT, US.

(Continued)

*Primary Examiner* — Lindsay Low
*Assistant Examiner* — Charles Brauch

(57) ABSTRACT

An expansion system utilizes external combustion of its residual warm exhaust air, in order to heat incoming compressed air. The heat of this external combustion is communicated to the incoming compressed air through a heat exchanger. The expansion system may be incorporated into an energy storage device also featuring a compressed air storage unit supplied by a compressor. Where the stored supply of compressed air is depleted, the energy storage device may continue to supply electricity on demand through operation as a heat engine, with the compressor being driven directly (e.g. on a same rotating shaft) or indirectly (via generated electrical power) by the expansion system. Multiple expanders of the same or different types (e.g. rotating, reciprocating), may be utilized in parallel and/or in series (e.g. multiple stages) depending upon the particular application. Multi-stage embodiments featuring internal combustion in low pressure stages, may be particularly suited for placement in vehicles.

26 Claims, 22 Drawing Sheets

(56) References Cited

U.S. PATENT DOCUMENTS

| | | | |
|---|---|---|---|
| 4,893,466 | A | 1/1990 | Egnell et al. |
| 5,076,067 | A | 12/1991 | Prenger et al. |
| 5,195,874 | A | 3/1993 | Odagiri |
| 5,311,739 | A * | 5/1994 | Clark .............................. 60/39.6 |
| 5,491,969 | A | 2/1996 | Cohn et al. |
| 5,537,822 | A | 7/1996 | Shnaid et al. |
| 5,634,340 | A | 6/1997 | Grennan |
| 5,934,065 | A | 8/1999 | Bronicki et al. |
| 5,934,076 | A | 8/1999 | Coney |
| 6,141,953 | A | 11/2000 | Mongia et al. |
| 6,199,363 | B1 | 3/2001 | Frutschi |
| 6,206,660 | B1 | 3/2001 | Coney et al. |
| RE37,603 | E | 3/2002 | Coney |
| 6,817,185 | B2 | 11/2004 | Coney et al. |
| 6,840,309 | B2 | 1/2005 | Coney et al. |
| 6,874,453 | B2 | 4/2005 | Coney et al. |
| 6,883,775 | B2 | 4/2005 | Coney et al. |
| 7,770,376 | B1 | 8/2010 | Brostmeyer |
| 7,802,426 | B2 | 9/2010 | Bollinger |
| 7,832,207 | B2 | 11/2010 | McBride et al. |
| 7,833,126 | B2 | 11/2010 | Venter |
| 7,874,155 | B2 | 1/2011 | McBride et al. |
| 7,958,731 | B2 | 6/2011 | McBride et al. |
| 8,117,842 | B2 * | 2/2012 | McBride et al. ................ 60/613 |
| 2003/0180155 | A1 | 9/2003 | Coney et al. |
| 2004/0244580 | A1 | 12/2004 | Coney et al. |
| 2005/0279296 | A1 | 12/2005 | Coney et al. |
| 2007/0044478 | A1 * | 3/2007 | Kashmerick ................... 60/776 |
| 2008/0006032 | A1 | 1/2008 | Robinson |
| 2008/0044296 | A1 * | 2/2008 | Wood et al. ................... 417/234 |
| 2008/0163618 | A1 * | 7/2008 | Paul ............................... 60/407 |
| 2009/0114195 | A1 * | 5/2009 | Hall et al. ................. 123/559.1 |
| 2009/0211252 | A1 * | 8/2009 | Tani et al. ........................ 60/645 |
| 2010/0059005 | A1 * | 3/2010 | Stone et al. ................ 123/90.16 |
| 2010/0089063 | A1 | 4/2010 | McBride et al. |
| 2010/0229544 | A1 | 9/2010 | Bollinger et al. |
| 2010/0307156 | A1 | 12/2010 | Bollinger et al. |
| 2011/0056368 | A1 | 3/2011 | McBride et al. |
| 2011/0115223 | A1 | 5/2011 | Stahlkopf et al. |
| 2011/0131966 | A1 | 6/2011 | McBride et al. |
| 2013/0074949 | A1 | 3/2013 | McBride et al. |

OTHER PUBLICATIONS

Farmer, Robert et al., "New Solutions for Energy Storage and Smart Grid Load Management", Gas Turbine World, Apr. 2009, pp. 22-26, vol. 39, No. 2, Pequot Publishing Inc., Fairfield CT, US.

Igoe, Brian et al., "Improvements in power, efficiency and environmental benefits equip the SGT-100 gas turbine for the increased demands of distributed generation", Apr. 2010, pp. 1-15.

Nakhamkin, M. et al., "Second Generation of CAES Technolog—Performance, Operations, Economics, Renewable Load Management, Green Energy", Dec. 10, 2009, pp. 1-12.

Neuenschwander, Peter et al., "New turbochargers for more powerful engines running under stricter emissions regimes", International Council on Combustion Engines, 2010, pp. 1-12, Paper No. 128, CIMAC Congress, Bergen.

Solar Turbines, "Taurus 70, Gas Turbine Generator Set", 2012, pp. 1-2, Solar Turbines Incorporated, San Diego CA, US.

Tanimura, Kazuhiko et al., "Development of an 8MW-Class High-Efficiency Gas Turbine, M7A-03", Proceedings of GT2007, ASME Turbo Expo, May 17, 2007, pp. 1-9, ASME.

Coney, Michael et al., "First Prototype of the High-Efficiency Isoengine", Institution of Diesel and Gas Turbine Engineers (IDGTE), Nov. 20, 2003, pp. 1-13, London.

Takahashi, Motoyuki et al., "Study of Exhaust Gas Separation (EGS) System on 2-stroke Engine", International Council on Combustion Engines, 2010, pp. 1-12, Paper No. 108, CIMAC Congress, Bergen.

Jolly, David, "Compressing Gas for a Cheaper, Simpler Hybrid", The New York Times, Mar. 3, 2013, pp. 1-6, The New York Times Company, US.

Woschni, G., "A Universally Applicable Equation for the Instantaneous Heat Transfer Coefficient in the Internal Combustion Engine", Society of Automotive Engineers, Inc., Feb. 1, 1967, pp. 1-13, SAE Technical Paper 670931.

Woschni, Gerhard et al., "The Influence of Soot Deposits on Combustion Chamber Walls on Heat Losses in Diesel Engines", Technische University, München, Feb. 1, 1991, pp. 1-8, SAE Technical Paper 910297.

Patton, Kenneth et al., "Development and Evaluation of a Friction Model for Spark-Ignition Engines", International Congress and Exposition, Feb. 27, 1989, pp. 1-24, SAE Technical Paper Series 890836.

Sandoval, Daniel et al., "An Improved Friction Model for Spark-Ignition Engines", Sloan Automotive Laboratory, Massachusetts Institute of Technology, 2003, pp. 1-12, SAE International Jan. 29, 2013.

Office Action for U.S. Appl. No. 13/645,327 dated Jan. 29, 2013.

Victor De Biasi, "New solutions for energy storage and smart grid load management", Gas Turbine World, Mar.-Apr. 2009, pp. 22-26, vol. 39 No. 2, Pequot Publishing, Inc, Fairfield, CT, USA.

U.S. Appl. No. 13/645,327, filed Oct. 4, 2012.

U.S. Appl. No. 14/037,217, filed Sep. 25, 2013.

* cited by examiner

US 8,851,043 B1

ENERGY RECOVERY FROM COMPRESSED GAS

BACKGROUND

Recently, approaches employing compressed gas as an energy storage medium, have emerged. In particular, compressed air is capable of storing energy at densities comparable to lead-acid batteries. Moreover, compressed gas does not involve issues associated with a battery such as limited lifetime, materials availability, or environmental friendliness.

SUMMARY

An expansion system receives hot compressed air at high pressure, expands it to a lower pressure and lower, but still high temperature, exhausts the hot air, then utilizes external combustion of fuel in the hot exhaust air, in order to heat incoming compressed air to a high temperature. The heat of this external combustion is communicated to the incoming compressed air through a heat exchanger, which may be of a tubular type. The expansion system may be incorporated into an energy storage device also featuring a compressed air storage unit supplied by a compressor. Where the stored supply of compressed air is depleted, the energy storage device may continue to supply electricity on demand through operation as a heat engine, with the compressor being driven directly (e.g. on a same rotating shaft) or indirectly (via generated electrical power) by the expander. Multiple expanders of the same or different types (e.g. rotating, reciprocating), may be utilized in parallel and/or in series (e.g. multiple stages) depending upon the particular application. Multi-stage embodiments featuring internal combustion may be particularly suited for placement in vehicles in addition to static applications.

DESCRIPTION

Compressed air energy storage during off-peak periods can efficiently utilize surplus power from renewable and other sources. According to embodiments, during periods of peak demand, heat may be applied to the compressed air to generate much more mechanical or electrical energy than was originally stored.

Embodiments relate to recovery of energy stored as compressed air, utilizing an expansion system. According to certain embodiments, an expansion system utilizes external combustion of fuel in its relatively warm residual exhaust air, in order to heat incoming compressed air before expansion. The heat of this external combustion is communicated to the incoming compressed air through a heat exchanger, which may be of a tubular design. The expansion system may be incorporated into an energy storage device also featuring a compressed air storage unit supplied by a compressor. Where the stored supply of compressed air is depleted, the energy storage device may continue to supply electricity on demand through operation as a heat engine, with the compressor being driven directly (e.g. on a same rotating shaft) or indirectly (via generated electrical power) by the expander. Multiple expanders of the same or different types (e.g. rotating, reciprocating), may be utilized in parallel and/or in series (e.g. multiple stages) depending upon the particular application.

Figure 1:
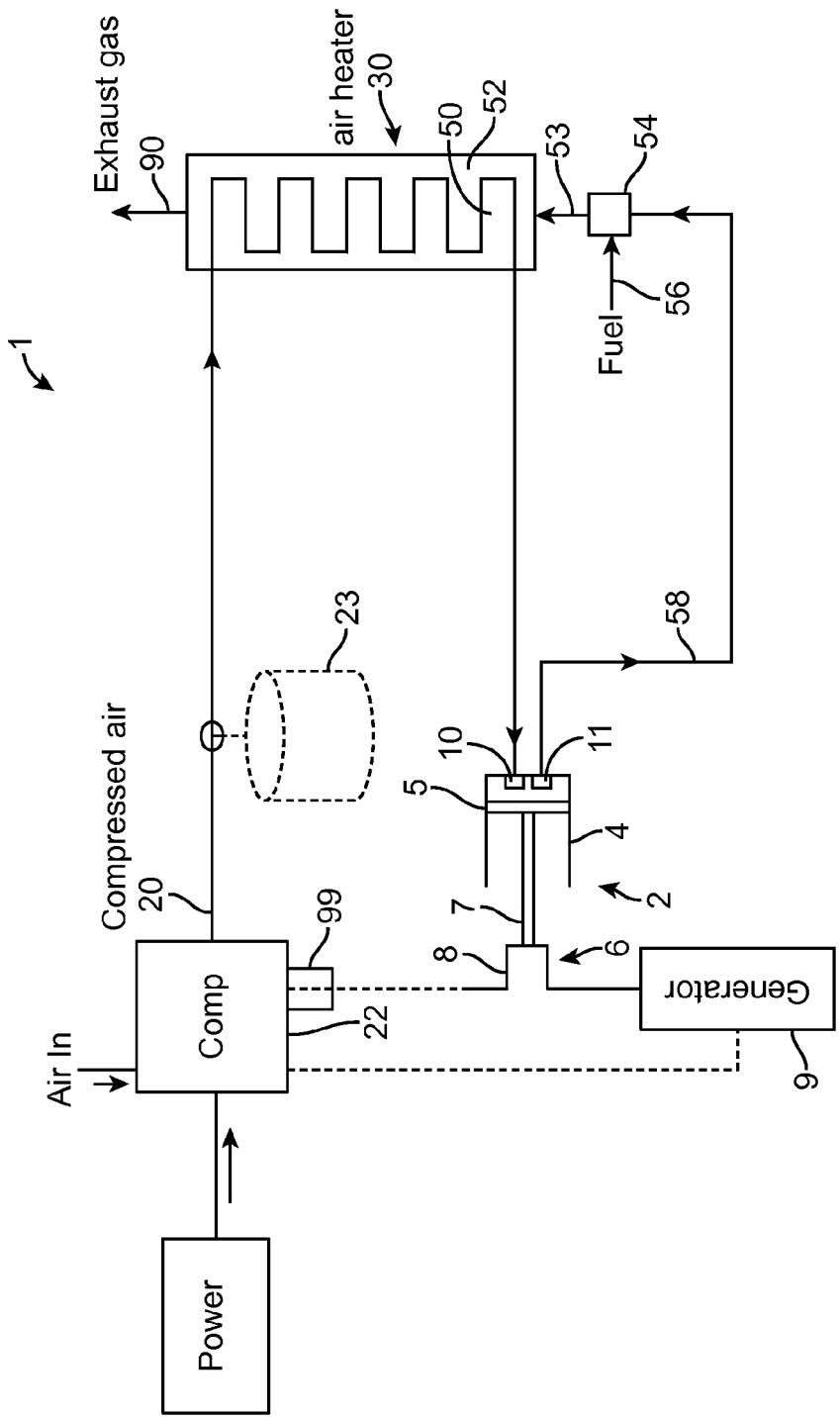
FIG. 1 is a simplified view of an example of an air expansion system with external combustion heating.

FIG. 1 is a simplified view of one embodiment of an air expansion system with external combustion heating. In particular, the air expansion system 1 comprises a reciprocating-type expander 2 comprising cylinder 4 housing a reciprocating piston 5. A mechanical linkage 6 comprising a piston rod 7 and a crankshaft 8, is configured to allow the piston to transmit power of expanding air out of the cylinder to an electrical generator 9. An outlet valve 11 is configured to flow the expanded air from the cylinder.

The cylinder 4 is configured to receive heated compressed air through an inlet valve 10. Specifically, compressed air 20 is generated by a compressor 22. As discussed at length below, depending upon the particular embodiment this compressor may be of various designs, operating for example based upon rotary or reciprocation action, with or without liquid injection for heat exchange.

In certain embodiments the compressor may be operated by the expander (e.g. by selective mechanical communication with the crankshaft—e.g. via a clutch 99, and/or by electrical communication with the generator). In some embodiments the compressor may be operated by a power source, for example a turbine (e.g. combustion, steam, wind, or combined cycle).

In certain modes of operation, the compressed air from the compressor may be flowed directly to the air heater 30 for heating prior to expansion in the expander. More typically, however the compressed air is flowed from the compressor to a compressed air storage unit 23 (such as a tank) for storage, prior to being flowed to the heat exchanger.

Prior to entering the expander cylinder, the gas is heated by exposure to the thermal energy of combustion of heated gas. In particular, the compressed air is flowed through a tube 50 within a shell 52 heat exchanger receiving combustion products 53 from a burner 54. This burner receives a fuel 56, and the heated exhaust 58 output from the expansion cylinder through outlet valve 11.

Having transferred the bulk of its heat to the incoming compressed air via the heat exchanger, the combustion products exit the heat exchanger as an exhaust gas 90.

FIG. 1 shows a highly simplified view of a system according to one particular embodiment, and alternative embodiments may differ in certain respects. Thus while the embodiment of FIG. 1 utilizes an expander operating based upon reciprocating motion, this is not required and various embodiments feature expanders of other types.

For example, an expander according to an embodiment could be driven in rotational motion. Examples of expanders that may be driven to rotate by expanding air, may comprise screws, vanes, lobes, rotors, scrolls, quasi-turbines, turbines, or gerotors.

Figure 1A:
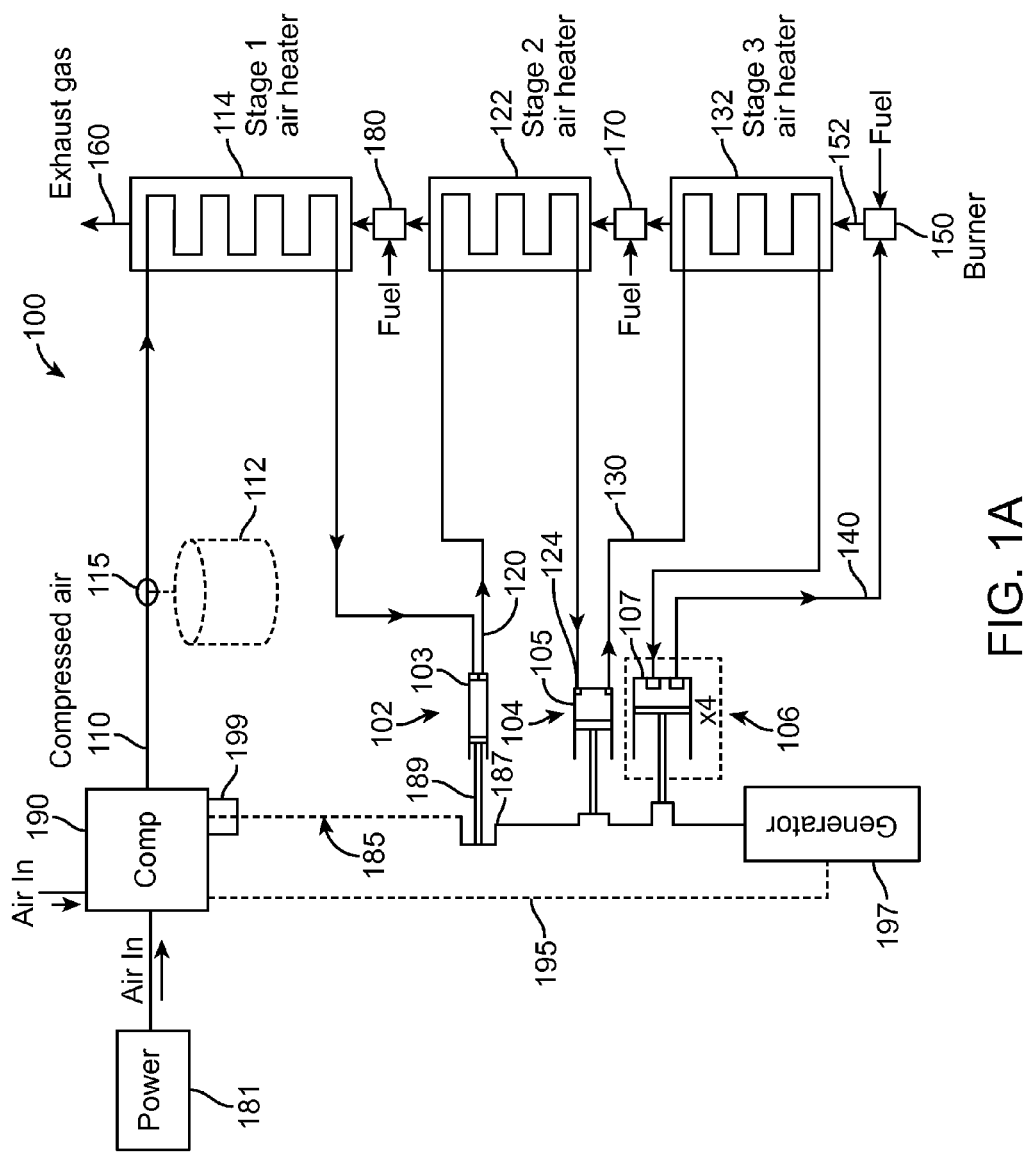
FIG. 1A is a schematic view showing an embodiment of a multi-stage air expansion system with external combustion heating.

Moreover, while the simplified system of FIG. 1 shows heating and expansion occurring in a single stage, alternative embodiments may conduct such heating and expansion over several stages, in order to achieve greater efficiency of operation. FIG. 1A shows a specific embodiment of an air expansion circuit comprising three stages.

In a particular embodiment of a three stage configuration, a 250 kW expansion system heating air to about 700° C., may exhibit a fuel efficiency of about 75% if supplied by stored compressed air at 200 bar. With a compressor efficiency of about 85%, the energy output ratio (electrical energy output/electrical energy input) of such an energy storage system could be around 1.78. This performance is predicted by a computer model of the system, which has also been used to predict temperatures and pressures around the circuit shown in FIG. 1. In addition to energy storage/recovery, systems according to embodiments may also provide some thermal output (e.g. for space heating and/or hot water needs). In certain contexts, embodiments could be implemented with renewable energy systems, for example wind and/or solar. Once an available store of compressed air is depleted, embodiments may be operated as an engine to provide electrical power.

Specifically, the air expansion circuit 100 of FIG. 1A comprises three successive piston expansion Stages 1 (102), 2 (104), and 3 (106) respectively. As indicated by the diagram, this expansion circuit would utilize a single cylinder 103 for Stage 1, a single cylinder 105 for Stage 2, and four cylinders 107 in parallel for Stage 3.

The following table summarizes pressures and temperatures appropriate to a particular example of a multi-stage expansion system according to FIG. 1A, in which compressed air 108 is supplied at 200 bar and is heated to 700° C.

| Inlet Compressed Air | Pressure (bar) | 200 |
|---|---|---|
|  | Temperature (° C.) | 30 |
| Combustion Gas Input Temperature of All Stage Air Heaters (° C.) |  | 750 |
| Stage 1 Heater Air Output | Pressure (bar) | 194 |
|  | Temperature (° C.) | 700 |
| All Stage Cylinders | Stroke (mm) | 120 |
|  | Speed (rpm) | 1200 |
|  | Total Power (kWe) | 269 |
| Stage 1 Expander | No. of Cylinders | 1 |
|  | Cylinder Bore (mm) | 80 |
| Stage 2 Heater Air Input | Pressure (bar) | 37.2 |
|  | Temperature (° C.) | 334 |
| Stage 2 Heater Air Output | Pressure (bar) | 36.1 |
|  | Temperature (° C.) | 700 |
| Stage 2 Heater Exhaust Gas Temperature (° C.) |  | 403 |
| Stage 2 Expander | No. of Cylinders | 1 |
|  | Cylinder Bore (mm) | 186 |
| Stage 3 Heater Air Input | Pressure (bar) | 6.91 |
|  | Temperature (° C.) | 351 |
| Stage 3 Heater Air Input | Pressure (bar) | 6.63 |
|  | Temperature (° C.) | 700 |
| Stage 3 Heater Exhaust Temperature (° C.) |  | 413 |
| Stage 3 Expander | No. of Cylinders | 4 |
|  | Cylinder Bore (mm) | 206 |
| Final Outlet Exhaust Gas | Pressure (bar) | 1.02 |
|  | Temperature (° C.) | 88 |

As shown in FIG. 1A, high pressure air 110 is provided from a source of compressed air. The original source of this compressed air may be a compressor 190. As is disclosed below, the compressor 190 may operate to compress gas within a temperature range (e.g. isothermal or quasi-isothermal) in order to realize certain thermodynamic efficiencies.

As used herein, the terms "near-isothermal" or "quasi-isothermal" indicate a process in which the temperature of the air or other gas is controlled during compression or expansion to remain within a certain temperature range. One way that this may be accomplished is by the injection of water or other liquid, which exchanges heat with the gas simultaneously with the compression or expansion process. In certain embodiments the temperature range in which the gas remains, may be within 100° C. of the injected liquid temperature. In some embodiments, the temperature range may lie within 50° C. of the liquid temperature.

In some embodiments, such a compressor may achieve this temperature performance through gas-liquid heat exchange between gas being compressed. Particular embodiments may introduce liquid droplets directly into the compression chamber for this purpose, for example via a spray nozzle or even by bubbling in high pressure environments.

The compressor may be driven by one or more sources of power 181. In certain embodiments, a power source could comprise an associated turbine (e.g. wind, combustion, steam, combined cycle etc.) or a motor (e.g. diesel) or motor-generator. As shown in FIG. 1A, in certain embodiments the compressor may operate in whole or in part based upon the power of the expanding compressed air.

For example, an electrical linkage 195 may be present to communicate electricity from the generator 197 to the compressor. Alternatively, a physical linkage 185 may be present between the compressor and the expanders, for example as shown here the compressor may be connected selectively (e.g. via a clutch 199) to the rotating crankshaft 187 that is being driven by the reciprocating expanders.

And while FIG. 1A specifically shows power being communicated from the reciprocating expanders to the generator via a piston rod 189 and a crankshaft 187, this represents only one particular embodiment. Alternative embodiments might employ various forms of mechanical linkages.

A wide variety of mechanical linkages are possible. Examples include but are not limited to multi-node gearing systems such as planetary gear systems. Examples of mechanical linkages include shafts such as crankshafts, chains, belts, driver-follower linkages, pivot linkages, Peaucellier-Lipkin linkages, Sarrus linkages, Scott Russel linkages, Chebyshev linkages, Hoekins linkages, swashplate or wobble plate linkages, bent axis linkages, Watts linkages, track follower linkages, and cam linkages. Cam linkages may employ cams of different shapes, including but not limited to sinusoidal and other shapes. Various types of mechanical linkages are described in Jones in "Ingenious Mechanisms for Designers and Inventors, Vols. I and II", The Industrial Press (New York 1935), which is hereby incorporated by reference in its entirety herein for all purposes.

Moreover, while the specific embodiment of FIG. 1A shows a mechanical linkage between the reciprocating piston and a generator, alternative embodiments could employ other types of linkages. Possible examples include but are not limited to those operating based upon hydraulic, pneumatic, magnetic, electro-magnetic, or electrostatic principles.

Many embodiments will also include a compressed air energy store 112 that is configured to receive air through a valve 115. This store 112 is configured to receive compressed air from the compressor, and to maintain same at an elevated pressure until such time as it is desired to recover the energy stored therein.

While the compressed air store can comprise a man-made structure such as a pressure vessel (as shown in FIG. 1) or even an underground structure such as a mine, this is not required. Various embodiments could rely upon a naturally-occurring geological formation (e.g. salt dome, etc) in order to store the compressed air at elevated pressure.

The compressed air 110 (whether stored or arriving directly from the compressor) is fed to the Stage 1 air heater 114. Heater 114 may be of tubular design (e.g. tube in shell), with high pressure air inside the tubes and low pressure exhaust gas on the outside. Other examples of possible air heater designs include but are not limited to plate heat exchangers, plate-in-shell heat exchangers, finned tube heat exchangers, tube-in-tube heat exchangers, plate-fin heat exchangers, rotary regenerators, and packed bed regenerators. A useful reference book on heat exchangers is "Compact Heat Exchangers" by W. M. Kays and A. L. London. McGraw-Hill, 3rd Ed. (1984), which is incorporated herein by reference in its entirety for all purposes.

In this particular example, the Stage 1 air heater heats incoming compressed air from about 30° C. to about 700° C. This is a larger temperature increase than is required of the air heaters of the remaining stages. Accordingly, the Stage 1 air heater is shown as slightly larger than the air heaters of the other stages.

After heating by the Stage 1 air heater, the hot air enters the Stage 1 cylinder and is expanded to a pressure of 37.2 bar abs. The actual pressure ratio of the expansion according to particular embodiments, may depend upon such factors as the existing pressure in the compressed air storage system.

The partially expanded compressed air 120 then enters the Stage 2 air heater 122 at 334° C. and is reheated to 700° C., before entering the inlet 124 of the Stage 2 cylinder 104. In that cylinder, the partially expanded compressed air is expanded to 6.9 bar.

The air 130 from the Stage 2 cylinder then enters the Stage 3 air heater 132, and is reheated to 700° C. before entering the four (4) Stage 3 cylinders 106. This third and final expansion results in the air 140 leaving the cylinder at a pressure of 1.26 bar abs and temperature of 350° C.

By leveraging the residual heat remaining in the expanded air, the efficiency of the system can be improved significantly over unheated expansion systems. In particular, the air 140 is then fed to a burner 150 associated with the Stage 3 air heater, where fuel is added sufficient to increase the temperature to 750° C.

According to the principles of the $2^{nd}$ Law of Thermodynamics, heat should be applied to a thermodynamic cycle at a high average temperature, and in a manner to avoid large temperature differences during combustion and heat exchange, since this creates entropy and degrades the cycle efficiency. For this reason, the proposed cycle maximizes the preheating of air prior to combustion, and aims to limit the heat exchanger temperature differences to about 50° C.

Specifically, the combustion products 152 in turn flow to the Stage 3 air heater and provide heating for the compressed air which is supplied to the Stage 3 cylinder. In this particular embodiment, temperature differences within the heat exchanger are ~50° C., since to fall below this level of temperature difference would imply large and expensive heat exchangers and/or high pressure drops in the air and gas flowing through them.

The combustion products leave the Stage 3 air heater at 413° C. and enter another burner 170, which supplies hot gas at 750° C. to the Stage 2 air heater. The hot gases leave the Stage 2 air heater at 403° C. and then reheated to 750° C. in the burner 180 supplying the Stage 1 air heater.

After transferring nearly all their heat in the Stage 1 air heater, the exhaust combustion gases 160 are released to the atmosphere at a temperature of 88° C.

In particular embodiments, one or more of the burners may be duct burners in which additional fuel is burned in the low pressure exhaust air of the third expansion stage. Here, it may be that the fuel is diesel fuel, but a wide range of alternative fuels could be used instead, particularly given that the combustion occurs external to the expansion cylinders and hence is able to be carefully controlled.

For most other gaseous or liquid hydrocarbon fuels there could be some differences in the composition of the combustion gas, which could have an effect on the heat capacity, thermal conductivity and other properties of the combustion gases. However, the effect of this on the performance of the cycle would be expected to be relatively small.

Again, because combustion occurs external to the expansion chamber, the demands of the combustion environment are not as rigorous as an internal combustion configuration, allowing fuels with relatively poor ignition properties and solid fuels to possibly be used. This represents a potential advantage of expansion cycles using external combustion as compared to internal combustion.

A listing of possible fuels for the combustion process include but are not limited to diesel fuel, kerosene, gasoline, gas oil, heavy fuel oil, naphtha, ethanol, natural gas, propane, butane, biogas, coal gas, producer gas, wood, coal, coke, anthracite, domestic waste, various types of cultivated energy biomass and very many types of agricultural waste. Some of these fuels, such as domestic waste and agricultural waste, may have low calorific value. Other fuels such as heavy fuel oil, low grade coal and domestic waste, may have poor ignition properties. Some of the fuels listed cannot be used in an internal combustion system, and several of them can be difficult to burn. However, these fuels could be used in a suitably designed external combustion system.

In embodiments configured to utilize fuels with corrosive contaminants and/or fuels exhibiting particularly low calorific value, it may be appropriate to limit the temperature of the hot gases. While such an adjustment may impact the efficiency of the system, acceptable performance may be still be achievable.

The heat exchangers shown in the particular embodiment of FIG. 1A have hot combustion gas at near atmospheric pressure as the heat source. Compressed air serves as the heat sink.

One configuration could be to have the compressed air flowing inside tubes. These tubes could comprise a serpentine shape, with short parallel sections each followed by a 180° bend. Each serpentine tube could have a number of bends, and could be supported on narrow shelves in the side-walls of an insulated rectangular container.

A number of such serpentine tubes could be stacked vertically inside the container. The hot gas would flow around the outside of the tubes in a direction which is perpendicular to the straight section of the serpentine tubes. Thus the mode of heat transfer could be cross-flow, but the overall flow direction of the compressed air inside the tubes would be in counter-flow to the direction of the hot gas outside the tubes. Such counter-flow is efficient for the purposes of maximizing heat transfer, while keeping the temperature difference between the two streams to a minimum.

The particular design of heat exchangers may reflect their performance, including such aspects as number of tubes, tube diameters, tube length, etc. Here, target figures for temperature differences and pressure drops are assumed in the calculation and used for the calculation of overall system performance.

Air in the heat exchangers could be heated to between about 600-700° C. in some embodiments. The heat transfer tubing should be capable of containing the high pressure air at the chosen maximum temperature.

In some embodiments, a cost of the heat exchangers could be reduced by constructing the serpentine tubes by joining different materials. For example, ferritic or austenitic stainless steel could be used at moderate temperatures (which arise near the exits of the various heat exchangers), reserving the use of more expensive nickel alloys for the highest temperatures (which occur where the hot combustion gas from the burners enters the heat exchangers).

In particular embodiments, the inlet and the exhaust valves of the cylinders of all three stages could be poppet valves. Poppet valves seal well, can open and shut quickly, can have controlled timing, and can be used in a high temperature environment.

Incorporated by reference herein for all purposes, is the U.S. Nonprovisional patent application Ser. No. 13/552,580 filed Jul. 18, 2012, which discloses various valve embodiments. Also incorporated by reference herein for all purposes, is the U.S. Nonprovisional patent application Ser. No. 13/655,380 filed Oct. 18, 2012, which discloses certain valve embodiments.

In some embodiments, the valves in stages 2 and 3 could be operated by cams. Cam actuation allows some measure of control, while not consuming so much energy and being in general cheaper.

According to some embodiments, a cam or cam and spring system could also be used on the exhaust valves of Stage 1. However, particular embodiments may employ hydraulically or pneumatically operated inlet valves in order to achieve a level of flexibility of operation. Such hydraulically/pneumatically actuated valves could allow the operator to vary the closing time of the valve, without changing the opening time. While hydraulically/pneumatically operated valves may consume more power in operation than a camshaft, for the inlet to the Stage 1 cylinder(s), the improved flexibility in valve operation may be worth the increased power consumption.

The expansion system may function efficiently over a range of air source pressures. Ideally, the power output would be maintained within a certain permissible range.

This implies that the mass flow of air should at least be kept constant or increase as the source pressure declines. If there is no storage of air between stages, the mass flow in all the stages must be the same at any one time.

There are different approaches to dealing with this issue. One is to maintain substantially constant inlet pressures with constant or possibly increasing mass flow in Stages 2 and 3. As the source pressure declines, there will be a reduction in the inlet pressure of Stage 1 and it may be necessary to change the timing of the Stage 1 air inlet valve to maintain the air flow in this stage.

A cam system with phase control can provide some adjustment of the inlet valve timing. However, if the closing time of the valve is significantly delayed, the corresponding delay in the opening time may cause a substantial loss of performance.

Accordingly, certain embodiments may use a hydraulic inlet valve for the $1^{st}$ stage cylinder. This could allow the closing time of the valve to be significantly delayed, without changing the opening time.

Mechanical systems may provide both variable phase and variable dwell time. For example, incorporated herein by reference for all purposes are the following patent applications: U.S. patent application Ser. No. 13/552,580, and U.S. patent application Ser. No. 13/655,380. Certain embodiments of the expansion system may utilize one or more of these mechanical valve actuation systems, which can vary both phase and dwell time. Such embodiments may offer greater complexity and expense than those employing traditional mechanical valve actuation systems.

An alternative approach would be to use a gear to change the speed of the $1^{st}$ stage, while maintaining constant speed on the other stages. This could allow a cam system to be used on the $1^{st}$ stage inlet valve.

There are various other possible ways of maintaining the power output of the expansion system while the air source pressure is declining. Some of these techniques may also allow flexible adjustment of the power output over a range at various source pressures. These methods, which can be used in combination, include variable frequency generation, adjustable mechanical gearing (which can allow different speeds for the expansion system as a whole or for individual stages), and control of valve timing.

To achieve rapid opening and closing of the valves and reduce pressure losses, in certain embodiments the inlet valves on stages 2 and 3 may be operated by overhead camshafts. Such a configuration avoids use of push-rods to communicate movement from the cam to the valves and allows the valves to open and close more quickly and to achieve higher lift. This could be desirable according to various embodiments, by allowing a higher rotational speed without causing large flow losses.

The use of an overhead camshaft could be particularly relevant to operation of the inlet valves, since the duration of opening is shorter and fast operation is employed. The adverse consequences of having slow-acting valves may be greater for the inlet valves than for the exhaust valves. If an overhead camshaft is used for the exhaust valves in a particular embodiment, this camshaft could be separate from that of the inlet valves, and could have a fixed profile and phasing.

Mechanical systems which can adjust the phasing of a camshaft are sometimes used in reciprocating engines. This allows changing the phase of the operation of a cam-operated valve, but may not permit a change in the duration or the height of the valve lift.

According to embodiments of the energy storage and recovery system, a change in phase of the opening of the inlet valve could allow the operator to adjust the crank-angle at which the inlet valve closes. However, there may also be a corresponding change in the opening crank-angle of the valve, which may be less desirable. Thus a practical range of variation of the inlet valve phasing may be limited.

A calculational model was developed to investigate this effect, and to determine consequences of various adjustments to timing of both the inlet and exhaust valves. This is done by calculating the flow rate and pressure drop of the air, as it flows into and out of the cylinders as a function of crank angle.

The particular multi-stage system for handling expansion of air as shown and described in FIG. 1A, represents only one specific embodiment. Other embodiments could employ alternative configurations.

For example, Although FIG. 1A shows a three-stage system, a number of stages different than three (e.g. 2, >3) could be used. If the number of stages is reduced, the pressure ratio of the expansion in each stage is increased. This could result in the final temperature of the expansion stage being lowered.

The efficiency of the overall system is influenced by the average temperature of heat addition to the working fluid. If the final temperature is lowered, the average temperature of heat addition is lowered, so the efficiency is reduced.

As a result, the use of fewer stages makes the system simpler, but perhaps less efficient. Conversely, the addition of more stages may improve the efficiency of operation, but add cost in the form of complexity and maintenance.

In certain embodiments, it might prove desirable to replace a final reciprocating stage with an air turbine expander, retaining the external combustion feature. Such an alternative configuration could prove attractive because the friction and valve losses in the 3rd reciprocating stage are relatively high, since the friction forces are not reduced in proportion to the reduction in the operating pressure of the $3^{rd}$ stage relative to the $1^{st}$ and $2^{nd}$ stages.

Such an air turbine expander could possibly exhibit lower overall frictional losses, as well as avoiding losses associated with valve operation. However, such an air turbine expander would likely be configured to rotate at a higher speed than a reciprocating expander. Some sort of speed-reduction gear could be used to compensate for this aspect, allowing all three stages to run off of the same rotating shaft.

As just mentioned, a reciprocating expander such as those shown in FIG. 1A, may be subject to friction. Such friction may arise between the piston seals and the cylinder liner, in the main bearings, connecting rod bearings, crank-shaft seals and in various parts of the valve train. In addition there are auxiliary systems such as oil and water pumps that are powered by the reciprocating system itself, or by external power. Either way the load of these auxiliary systems should be accounted for in the overall performance calculation.

In addition to the frictional losses, the computer model calculates heat losses. A magnitude of the heat loss may depend on the operating temperatures of the surfaces inside the cylinder.

The surface of the piston and/or the cylinder head can comprise materials withstanding high air temperatures. In this way the heat losses through these surfaces can be reduced, potentially avoiding a need for water or air cooling of these components.

It is noted that this situation is different to that occurring in an internal combustion engine. There, the maximum temperature of the gases inside the cylinder may be well above the level able to be withstood by conventional materials without intensive cooling by water or other medium.

On the other hand, the cylinder liner of an external combustion system may still need to be cooled even in the absence of internal combustion. This is because movement of the piston seals over the liner, calls for lubrication with oil which may not be feasible if the liner temperature is above about 180° C. The model developed herein calculates the heat losses through the liner and indeed through the piston and cylinder head also, based on assumed surface operating temperatures, which are chosen by the user of the computer model.

Operation of embodiments of the energy recovery system is now described. The power output and efficiency of the expansion system may depend on factors relating to the design.

Once the design is fixed and the expansion system is built, however, variables affecting the output and efficiency may be reduced to the following:

air source pressure;
temperatures of air delivered by the heat exchangers;
closing angles of the air inlet valves; and
operating speed in rpm.

As pressure in the air storage system falls, the pressure available to the expansion cylinders declines, and the mass flow may be reduced. The power output therefore falls.

To some extent, it may be possible to adjust the inlet valve timing to compensate for the reduction in mass flow. However, calculations shown below indicate that there may be a limit as to what can be done by such approaches.

If hydraulically operated inlet valves are used in the stage 1 cylinder, calculations according to the model show that it is possible to maintain constant power between 200 bar and 70 bar. But, if substantially constant power output is to be maintained over a wider range of air source pressures (e.g. from about 200-50 bars), it may be desirable to have some way of varying the rotational speed.

This can be done using a gearbox or a frequency converter, which can convert the generator output to the desired frequency of 50 or 60 Hz. In either case, some losses will be experienced in the mechanical or electrical conversion.

Here, it is assumed that the rotational speed is fixed, so that neither a gearbox nor a frequency converter is required. The modeling seeks to identify a configuration which can give good performance in terms of expansion system efficiency, both in terms of the consumption of fuel and in terms of the consumption of stored air. This performance may be maintained as far as possible over the full range of source pressures.

Use of hydraulically operated intake valves on stage 1 cylinder according to certain embodiments, allows the mass flow to be held constant or to be increased as the source pressure reduces. As the source pressure falls to 100 bars, the inlet temperature to the stage 1 cylinder may be reduced in order to admit sufficient air into the stage 1 cylinder.

In this scenario, the pressure and temperature conditions of the stage 2 and 3 cylinders are not changed as the source pressure falls. However, the phasing of the inlet valves on the stage 2 and 3 cylinders may be changed in order to allow an increased mass flow at low source pressures. The effect of this on the performance of the expansion system is described below.

If the compressed air store is depleted, in principle the expander can drive a compressor which is able to maintain a continuous supply of air for its own use, and generate surplus power for export in the process.

In this scenario, the expansion system and the compressor together comprise an engine. Even if the expansion system is not actually working in this mode, the compressor power can be subtracted from the expansion power in order to determine a net power output and an effective electrical efficiency for the notional power generator. This can be a useful parameter for comparison with other systems, such as diesel engines and gas turbines (which may not store mechanical energy).

It might also be desirable for the net power generated by the expansion system, to equal that of the expansion system alone in its "normal" operation using stored air. However, this could be unrealistic for a system working at fixed speed. The calculations shown here indicate that an expansion system powering its own compressor, could achieve approximately half the power output of the expansion system which is using stored compressed air.

Details of the model used in calculating properties of a reciprocating expansion system, are now discussed in detail.

The calculational model was developed using an Excel spreadsheet. One worksheet models the following four parts of the 2-stroke cycle occurring in the cylinder:

1) the opening and closing of the inlet valve, together with the intake of hot air;
2) the expansion of the air with all valves closed;
3) the opening and closing of the exhaust valve, together with the exhausting of the air; and
4) a short period when all valves are closed, after the closing of the exhaust valve but before the opening of the inlet valve. It is assumed that the inlet valves and exhaust valves are not opened at the same time.

Figure 2:
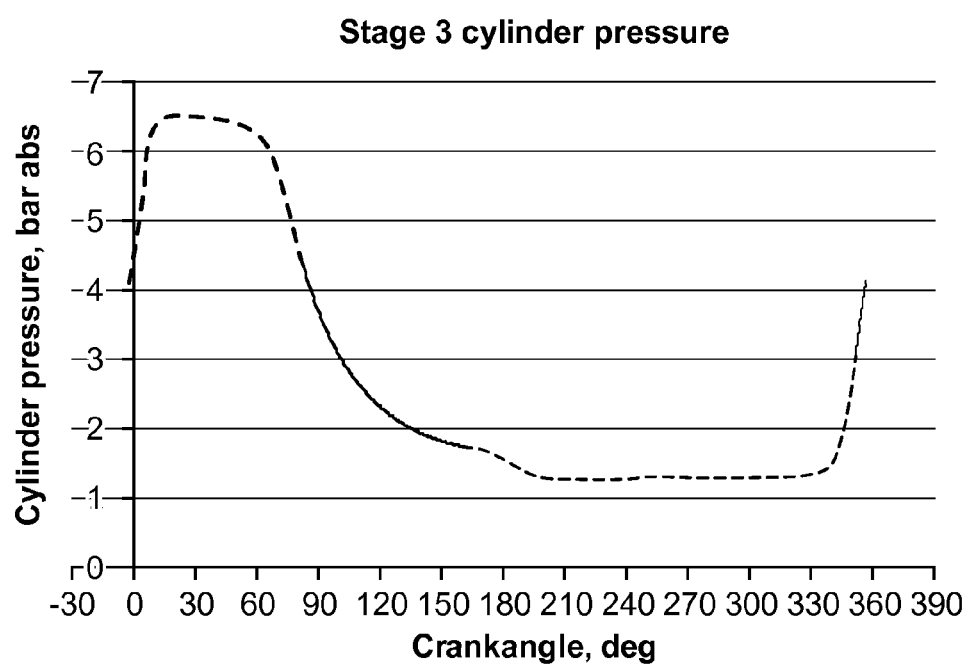
FIG. 2 shows an example of the pressure profile in the stage 3 cylinder.

FIG. 2 shows an example of a calculated pressure profile for a Stage 3 cylinder. In particular, FIG. 2 shows an example of pressure profile in Stage 3 cylinder operating at 1200 rpm with a bore of 206 mm and stroke of 120 mm.

The profiles arising from each of the four parts 1)-4) of the calculation, are shown in different line styles. The opening times, and durations of opening of the inlet valves and exhaust valves, are specified by the user.

If either of the inlet or the exhaust valves is open, the calculations at each crank-angle interval include the following steps:
1. calculation of the total cylinder volume;
2. determination of valve lift and flow area;
3. determination of the flow direction through the valve;
4. determination of whether the flow through the valve is sonic (i.e. choked) or not;
5. initial estimation of the velocity and mass flow rate through the valve based on the flow area and assumed valve discharge coefficient;
6. calculation of the instantaneous heat transfer between the air and the piston, cylinder head and cylinder liner;
7. a revised calculation of the instantaneous pressure, temperature and mass of air within the cylinder using a mass and energy balance; and
8. calculation of the piston work.

The method of calculation of the instantaneous conditions in the step 7., may be relevant to success of the model. If this calculation is not done satisfactorily, it may become unstable, with successive time-steps indicating a non-physical oscillation in the flow direction.

The property calculations in the model of the cylinders, is performed for dry air using the NIST Reference Fluid Thermodynamic and Transport Properties Database (REFPROP) package. This includes calculations of enthalpy, entropy, pressure, temperature, speed of sound, and density.

If air coming from the compressed air store is not dry, then there could be some effect upon performance. Calculations of the model involving the flow of hot combustion gas through the heat exchangers, take into account the presence of carbon dioxide and water vapor. The spreadsheet calculation includes checks of the energy balance for each part of the expansion and for the cycle as a whole. A spreadsheet also calculates the valve lift and heat transfer as a function of time. These models are described below. A friction model is also implemented as described below.

An aspect of the overall calculation, is matching of the intake and exhaust conditions of each of the stages. In addition, the air mass flow in all stages should be the same.

However, for a fixed geometry, the mass flow is mainly determined by the closing crank-angle of the inlet valves. The valve timing is specified by the user. The calculation is performed for each stage in turn.

If the user needs to adjust the mass flow for a particular stage, then it may be necessary to adjust the timing of the inlet valves in that cylinder. The spreadsheet provides an estimate of the change in valve timing required to achieve the desired mass flow, but a few iterations may be needed to achieve the necessary convergence.

Another iteration may be required to ensure that the conditions in the cylinder at the end of a 360° rotation of the crank are the same as at the beginning. The start and end of each cycle is assumed to be at the first opening of the inlet valve.

Finally, there is an iteration to determine the equivalence ratio of the fuel consumed in the burners. The composition of the combustion gas must be consistent with the heat released during combustion.

A model for operation of the valves is now described. This model is based on the assumption that the valves are operated by an overhead camshaft.

The same method is applied to determine the valve profile as a function of its lift, for both the cam-operated and the hydraulically actuated valves. In practice, it could be possible to achieve a more rapid opening and closing with a hydraulic system, at the cost of increased power consumption.

A difference in the treatment of hydraulic valves, is firstly the freedom to vary the valve opening and closing time independently of each other. Secondly, higher power consumption is calculated in the case of the hydraulic valves. Methods used to calculate mechanical friction and hydraulic power consumption, are described below.

The user specifies a number of inlet and exhaust valves and their respective lifts, opening crank-angle, and duration of opening and closing (also in terms of crank-angle degrees). The valve port diameters are specified in terms of the ratio of the valve port diameter to the cylinder bore. The input worksheet of the spreadsheet includes a check on the total valve area as a proportion of the bore area. In calculations as reported here, it is assumed that there are two inlet valves and two exhaust valves per cylinder and that the port diameters are all equal to 0.22 times the cylinder bore.

Incorporated by reference herein for all purposes, is U.S. Pat. No. 6,817,185 describing the "isoengine". This concept is a 2-stroke cycle with fast acting valves to admit a quantity of hot air prior to combustion with fuel, followed by internal combustion and expansion. The isoengine concept did not include separate burners with external combustion.

In some embodiments of the reciprocating air expansion system that is the subject of the instant patent application, there is no combustion of fuel inside the cylinder. In other embodiments of the present application there is internal combustion, but with important differences from that applied in the isoengine concept.

A prototype isoengine tested in the UK and Japan during 2002-2004, was equipped with hydraulically operated inlet valves and camshaft operated exhaust valves. However, other embodiments may employ phase-controlled overhead cam-driven inlet valves, in order to avoid the power losses associated with hydraulic operation.

Figure 4:
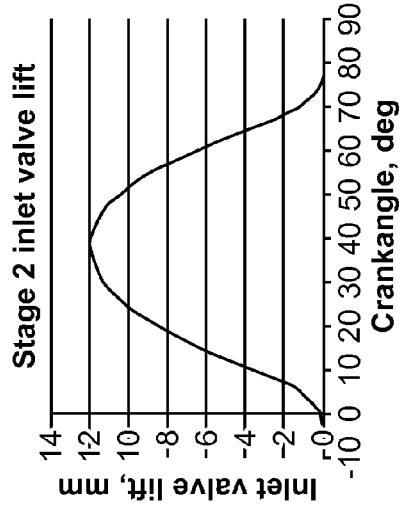
FIGS. 3-4 show inlet valve lift profiles for stage 1 and 2 expanders, respectively.

FIG. 4 shows a valve lift profile similar to that considered for the isoengine air inlet valve. It is seen that the profile has a linear ramp at both the opening and closing of the valve.

During the closed period, the valve is held tightly shut by a powerful spring. As the cam rotates, it initially comes into contact with the cam follower at some point along the first linear ramp. The exact point of contact on the linear ramp can vary over time due to wear and is usually adjustable by tappet screws.

From the initial point of contact on the first linear ramp to the final point of contact on the second linear ramp, the position of the valve is controlled by the cam. For the case of the inlet valve of the isoengine, it was desirable that the valve should be lifted as quickly as possible to a maximum level, and then immediately lowered down quickly to the second linear ramp.

In the case of the isoengine, there was no plateau at the maximum lift position. Since the inlet air in the isoengine was heated to a high temperature by internal combustion, the volume of inlet air required for the expansion was less than in the present cycle. Thus the opening duration of the inlet valve was short compared to the present cycle.

In the calculations which are described below, there are some situations where the external combustion system requires a profile similar to that for the isoengine (i.e. without a plateau at the maximum lift position). In other situations, it is appropriate to have a plateau.

In practical design it is found that if the valve lift is higher, the minimum valve open period increases as well, so there is a trade-off between valve lift and minimum valve open period. It is found in practice that the relationship between valve lift and minimum valve open period is approximately linear.

There are a number of design rules which may be followed in the design of a reliable and efficient cam and spring system. There should be no valve bounce on closing, and no separation of cam and follower during valve lift. It is found that in order to achieve satisfactory dynamics such that valve bounce and cam/follower separation can be avoided, there should be a certain minimum number of vibrations of the valve train at its natural frequency during each cam acceleration/deceleration period.

The natural frequency of vibration of the valve train is dependent on the mass and flexibility of the components. If it is assumed that the natural frequency is inversely proportional to the valve lift ($h_v$), then a linear relationship between valve lift and open period is obtained.

In the calculational model the minimum open period $\theta_{min}$ was determined from the equation $$\theta_{min} = \frac{\theta_{ref} N_{rpm} h_v}{N_{ref} h_{vref}} \qquad \text{Eq. (1)}$$

Where $h_v$ is the valve lift, $N_{rpm}$ is the rotational speed and $h_{vref}$ and $N_{ref}$ are the corresponding quantities in a reference system.

If a suitable reference system is available, the minimum opening period $\theta_{min}$ corresponding to any specified lift $h_v$ can be determined. These values of $\theta_{min}$ and $h_v$ can be used to scale the valve lift profile to a different rotational speed and valve open duration.

As mentioned above, the valves are assumed to be poppet valves, which are forced by a spring onto a circular seat. The seat of the valve is inclined at a specified angle (e.g. 45°).

When the valve lifts, a gap is opened up between the two surfaces. The minimum flow area of the valve is assumed to be determined by the minimum of the area of the gap between the valve and the seat and the cross-sectional flow area of the penetration into the cylinder. Thus, as the valve lifts there comes a point where additional valve lift does not increase the flow area. In this situation, no purpose is served by specifying a higher lift, since there is no improvement in the flow area.

Even if the inlet valve is at its maximum useful lift, the minimum valve open period may be shorter than is required to achieve a particular air mass intake into the cylinder. In this case, the profile without a plateau may be modified to insert a plateau of constant lift at the maximum lift position, so that the period of valve opening and closing is extended to the required amount.

The process of scaling the valve profile to the specified valve open duration and valve lift, including insertion of a plateau where appropriate, is carried out by the calculational model. The same method is used to determine the lift profile for the exhaust valves as for the intake valves, but in practice the exhaust valve profile usually has a plateau.

Figure 3:
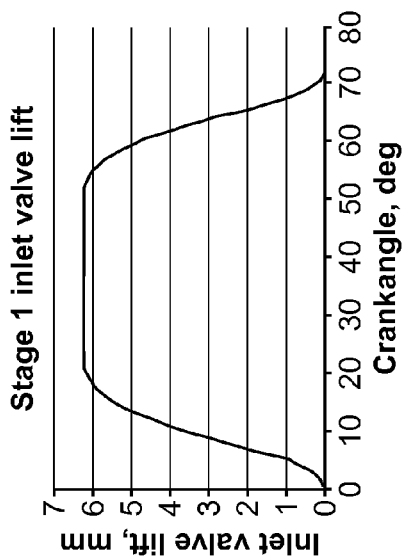

FIGS. 3-4 show the lift profiles of stage 1 and 2 inlet valves, for an expansion system operating at 1200 rpm and developing 269 kWe, and otherwise under the conditions shown in FIG. 1A. FIG. 3 shows the lift of the stage 1 valve is about 6 mm, since the bore of this cylinder is 81 mm and the diameter of the valve port is only about 18 mm. According to the method described above, it is possible to achieve this small lift very rapidly and consequently, there is quite a large plateau in the profile.

FIG. 4 shows that this is not the case in the stage 2 profile, where the lift is increased to 12 mm. There, essentially no plateau exists.

Figure 6:
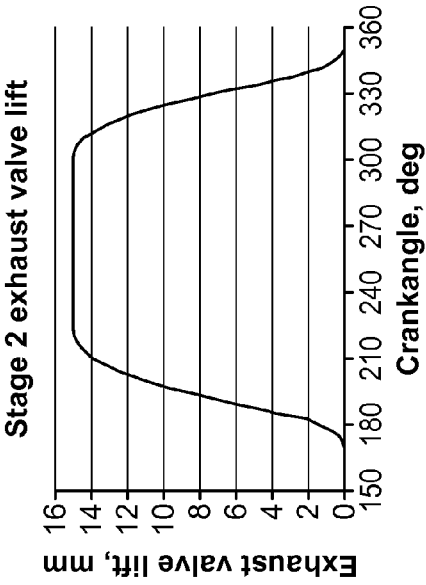
FIGS. 5-6 show exhaust valve lift profiles for stage 1 and 2 expanders, respectively.
Figure 5:
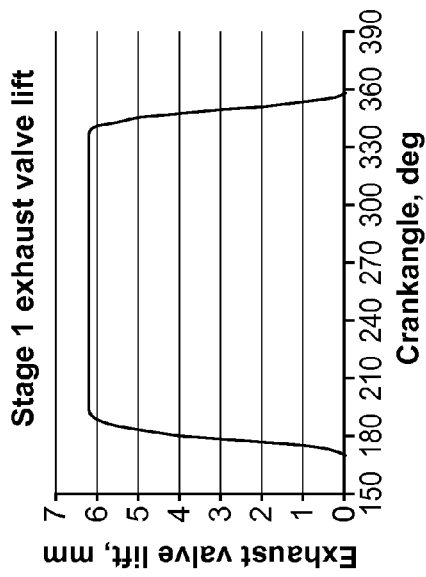

FIGS. 5-6 show the corresponding exhaust valve profiles for the same embodiment of FIG. 1A. As mentioned earlier, all exhaust valve profiles were considered have a plateau. However comparison of FIGS. 5-6 shows the Stage 1 profile as having a steeper rise and fall, since the exhaust valve lift in the stage 1 cylinder is much less than in Stage 2.

A model for friction of the system was also developed. Friction losses can be important in any reciprocating machine, particularly if some of the cylinders are operating at relatively low pressure (as is the case here).

The friction model used in the calculation spreadsheet is based on the original work of Patton, K. J., Nitschke, R. G., & Heywood, J. B., *Development and Evaluation of a Friction Model for Spark-Ignition Engines*, SAE Technical Paper 890836 (1989) (hereafter "Patton, Nitschke, & Heywood"), which is hereby incorporated by reference in its entirety for all purposes. The friction model also reflects some revisions and improvements by Sandoval, D., & Heywood, J. B., "An improved friction model for spark-ignition engines", *Society of Automotive Engineers* SAE-01-0725 (2003) (hereafter "Sandoval & Heywood"), which is also incorporated by reference in its entirety herein for all purposes.

The friction model is intended for use with 4-stroke spark-ignited engines. Accordingly, some modification allows for the fact that a 2-stroke cycle is considered here for expansion systems with external combustion.

Many other friction models are simply empirical in nature, and seek to include all friction mechanisms into one single expression. However, the paper by Patton, Nitschke, & Heywood identifies several different frictional loss mechanisms, identifies the dependency on mean piston speed, bore, stroke etc, then proposes an appropriate relationship, and then uses empirical information to determine a coefficient as a multiplier.

The derived term for each friction mechanism was then compared with experimental data over a range of conditions. Although this approach results in a large number of terms, the mechanistic approach seems to offer the best chance of dealing with a wide range of conditions arising with the expansion systems used for energy recovery.

The improvements described by Sandoval & Heywood take into account actual improvements in engine design over a period of years, which have led to a reduction in engine friction.

In addition, Sandoval & Heywood take into account the effect of oil viscosity, which can vary not only with the choice of oil, but also with the operating temperature. For example, Sandoval & Heywood comment that the total mechanical friction predicted by their model at 20° C. is about twice that predicted at 90° C. They say that this ratio is comparable to limited data from firing engine warm-up tests.

The original work of Patton, Nitschke, & Heywood was done with a 10W30 oil at engine operating temperatures. Sandoval & Heywood give data for a range of oils, and show how certain terms in the overall friction model are modified by a factor if the actual oil viscosity is different from that used in the original work. However, it is stated that the original 10W30 oil is mid-range in terms of viscosity, so no correction for oil viscosity was made in the calculational model described here.

In common with most other methods for predicting friction, the results of the friction model are expressed in terms of a friction mean effective pressure ($F_{mep}$). For a 4-stroke engine, the friction power loss ($P_{fric}$) is:

$$P_{fric} = \frac{1}{2} F_{mep} \frac{\pi B^2}{4} S \frac{N_{rpm}}{60} \qquad \text{Eq. (2)}$$

where S is the stroke of the piston and B is the cylinder bore.

The factor ½ in the right hand side of Eq.(2) arises in the 4-stroke cycle, because there is only one power stroke for two revolutions. The factor ½ is absent in the definition of $F_{mep}$ applied to a 2-stroke expander. Thus for the same nominal value of $F_{mep}$, the power consumed by friction in a 2-stroke cycle would be twice that of a 4-stroke cycle.

This is compensated for by halving the constants quoted by Patton, Nitschke, & Heywood, or by Sandoval & Heywood for those terms relating to rotation of the crankshaft and movement of the piston. However, the valves operate once in every revolution in the 2-stroke cycle, but only once in two revolutions in the 4-stroke cycle. Therefore those constants derived for friction of the valve mechanisms in the 4-stroke cycle are applied to the 2-stroke expander without modification.

Crankshaft friction is considered to be made up of three components, all expressed in terms of mean effective pressure and expressed in kPa. In this case Sandoval & Heywood made no changes to the equations given by Patton, Nitschke, & Heywood, other than with regards to oil viscosity effects (not considered here).

The components of crankshaft friction (expressed in kPa) are:
i) main bearing seals ($F_{mbs}$);
ii) main bearing hydrodynamic friction ($F_{mbh}$);
iii) main bearing turbulent dissipation—which refers to the work done in pumping oil through flow restrictions ($F_{mbtd}$)/

Next to be considered is reciprocating friction, split into the following components by Patton, Nitschke, & Heywood. Once again, the following components are expressed as a mean effective pressure (kPa).
i) Hydrodynamic friction of the piston (excluding piston rings), $F_{hpf}$.
ii) Mixed friction (i.e. partly hydrodynamic, partly boundary lubricated) of the piston rings without the effect of gas pressure, $F_{prm}$.
iii) The increase in piston ring friction due to gas pressure, $F_{prg}$.
iv) Friction in the connecting rod bearings, $F_{crb}$.

Next considered is friction of the valve train, which is separated into the following components expressed as mean effective pressures (kPa):
i) Friction of the camshaft bearing, $F_{cmshft}$
ii) Cam follower friction if a flat cam is used, $F_{flatcam}$
iii) Cam follower friction if a roller cam is used, $F_{rollcam}$
iv) Oscillating hydrodynamic friction within the valve actuation mechanism, $F_{valvhyd}$
v) Oscillating mixed friction within the valve actuation mechanism, $F_{valvmix}$ The number of valve operations per cycle is the same as for the 2-stroke expander as it is for a 4-stroke spark-ignited engine. So, for this group of friction terms, the values of the constants proposed by Patton, Nitschke, & Heywood is left unchanged.

The auxiliary component losses estimated by Patton, Nitschke, & Heywood were the sum of oil pump, water pump and non-charging alternator friction. The equation given for the auxiliary component mean effective pressure ($F_{aux}$) was:

$$F_{aux} = C_1 + C_2 N_{rpm} + C_3 N_{rpm}^2 \qquad \text{Eq.(3)}$$

Sandoval & Heywood proposed a new set of coefficients for Eq.(3) to replace those proposed by Patton, Nitschke, & Heywood. The new coefficients of Sandoval & Heywood are reduced by half for the 2-stroke energy recovery expansion.

The spreadsheet model allows the specification of hydraulic actuation as an alternative to a flat cam or roller cam system for any of the valves. However, hydraulic actuation is only used for the Stage 1 inlet valves in the calculations. The hydraulic power consumption is estimated from the following equation:

$$P_{hyd} = \frac{n_v h_v A_v \Delta p_v}{\eta_{hyd}} \frac{N_{rpm}}{60} \quad \text{Eq. (4)}$$

Where $n_v$ is the number of valves per cylinder, $h_v$ is the valve lift, $A_v$ is the area of the valve (using the valve port diameter), $\Delta p_v$ is the assumed pressure difference across the valve, and $\eta_{hyd}$ is the efficiency of the hydraulic actuation system (taken to be 50%). It is assumed that $\Delta p_v$ is equal to the design maximum cylinder pressure in the case of the inlet valves and is half the design maximum cylinder pressure if hydraulic actuation should be applied to the exhaust valves.

Eq.(4) ostensibly considers the work in opening the valve, but not closing it. This is because it is envisaged that this work could be performed against a spring which would close the valve. A damper may be needed so that the valve does not reseat with too high a velocity, which might damage both the valve and the seat.

Table 1 below shows a breakdown of the components of friction for the 2-stroke expansion system base case of FIG. 1A.

| COMPONENTS OF FRICTION FOR THE 2-STROKE EXPANSION SYSTEM (BASE CASE), | Stage 1 (kPa) | Stage 2 (kPa) | Stage 3 (kPa) |
| --- | --- | --- | --- |
| Main bearing seal friction | 5.04 | 0.93 | 0.36 |
| Main bearing hydrodynamic friction | 2.13 | 0.40 | 0.02 |
| Crankshaft turbulent dissipation | 0.59 | 0.59 | 0.13 |
| Piston hydrodynamic friction | 8.82 | 3.79 | 3.43 |
| Piston ring without gas pressure | 4.49 | 0.83 | 0.68 |
| Effect on gas pressure on piston friction | 155.32 | 28.86 | 5.31 |
| Connecting rod bearing | 5.76 | 1.08 | 0.05 |
| Camshaft bearing hydrodynamic friction | 4.88 | 8.52 | 8.47 |
| Flat cam follower friction (if used) | 0.00 | 0.00 | 0.00 |
| Roller cam follower friction (if used) | 0.10 | 0.20 | 0.20 |
| Hydraulic equivalent friction (if used) | 200.05 | 0.00 | 0.00 |
| Oscillating hydrodynamic valve train friction | 0.06 | 0.15 | 0.16 |
| Oscillating mixed valve train friction | 1.57 | 6.82 | 7.33 |
| Auxiliary component losses | 5.81 | 5.81 | 5.81 |
| TOTAL FMEP (kPa) | 394.62 | 57.99 | 31.94 |
| FRICTION POWER LOSS - all cylinders (kW) | 4.76 | 3.78 | 10.22 |
| FRICTION POWER LOSS - OF STAGE INDICATED POWER (%) | 4.71 | 3.84 | 10.62 |

It is seen that the main components of the friction loss in Stage 3 are the piston friction, camshaft bearing, valve train and the auxiliaries. However, the piston friction dominates the losses in Stages 1 and 2.

Looking at the friction loss in terms of the mean effective pressure (FMEP) is useful in comparing the effects of different mechanisms. However, the friction power losses are an important parameter. It is seen that friction power losses are relatively small in the case of Stage 1 and Stage 2, but become larger in Stage 3.

Although FMEP is useful to compare the friction effects of different mechanisms it provides less insight in comparing cylinders of different sizes operating at different pressures. In terms of FMEP, the Stage 1 appears to have the highest friction. In terms of power losses, Stage 3 seems to be the most affected.

A calculation was also performed for the base case of FIG. 1A, with the difference that the cam followers were specified to be flat, rather than rollers. The total frictional power loss increased from 18.8 kW to 21.1 kW. The power loss for the three separate stages was increased to 4.80, 4.18 and 12.17 kW respectively.

A heat loss model was also employed. In the modeling, heat losses were calculated at every time-step in the calculational model using a method described by Woschni, G., "A universally applicable equation for the instantaneous heat transfer coefficient in the internal combustion engine", *Society of Automotive Engineers*, paper 670931 (1967) (hereafter "Woschni"), which is incorporated by reference in its entirety herein for all purposes.

Like the friction model, the heat transfer model was derived for the purpose of analyzing internal combustion engines. This equation was found to give good agreement with the measured engine heat balance in the case of both diesel and spark-ignited engines.

However, some modifications to the model were published later by Woschni, G., & Huber, K., "The influence of soot deposits on combustion chamber walls on heat losses in diesel engines", *Society of Automotive Engineers*, paper 910297 (1987) (hereafter "Woschni & Huber"), which is also incorporated by reference in its entirety herein for all purposes.

These modifications of Woschni & Huber arose once it became apparent that the original model was significantly affected by a layer of soot formed inside the engine at medium and high engine loads. The soot provides an insulating layer inside the engine. If the soot layer is not present (for example at low engine loads, or if the engine is not fired but simply motored) then the measured heat transfer can be much higher than predicted by the original equation.

This observation may have relevance to the instant expander, since soot is not expected to be present therein (combustion occurs externally). The modified equation for heat transfer coefficient proposed by Woschni & Huber is not so easily applied to the 2-stroke piston expander, since it depends on a compression volume, which does not exist in the expander. However it was noted by Woschni & Huber that the heat transfer coefficient for motored engines at a range of speeds and with a variety of piston shapes, could be represented very well by multiplying the original correlation of Woschni by a factor of 1.7. Therefore this is the approach that has been followed here.

The equation given by Woschni is converted to give the heat transfer coefficient $h_{tc}$ in units of $Wm^{-2}K^{-1}$ $$h_{tc} = 129.9 k_{tc} B^{-0.2} p_{cb}^{0.8} T_K^{-0.53} (C_1 S_p)^{0.8} \quad \text{Eq.(5)}$$

The equation is expressed in terms of the cylinder bore B (mm), cylinder pressure $p_{cb}$ (bar), absolute temperature $T_K$ (° K) and mean piston speed $S_p$ (m/s). Terms relating to a fired engine are omitted since they are not relevant here.

The constant $C_1$ has a value of 6.18 when either the inlet or the exhaust valves are open. $C_1$ reduces to 2.28 when all the valves are closed. Eq.(5) includes the multiplier $k_{tc}$ which is made equal to 1.7.

The heat transfer coefficient varies through the cycle. But at any instant, the same heat transfer coefficient is applied to all the internal surfaces of the cylinder.

A uniform air temperature in the cylinder is assumed. The heat loss to the walls is calculated at each time interval, and is equal to the (heat transfer coefficient)×(temperature difference between the air and the surface)×(surface area).

The temperatures of the top of the piston, the cylinder head, and the cylinder liner are specified by the user. The cylinder liner is to be kept below about 180° C. because it is lubricated with oil. The top of the piston and cylinder head on the other hand can endure higher temperatures, depending on the choice of material and thermal fatigue considerations.

In the instant expander for energy recovery, it is envisaged that the piston and the cylinder head can be essentially adiabatic, with no applied cooling. However the cylinder may need to be cooled.

Table 2 below presents a summary of thermal and other losses for the base case expansion system of FIG. 1A.

| Stage | 1 | 2 | 3 | Total |
|---|---|---|---|---|
| No. of cylinders | 1 | 1 | 4 | 6 |
| Cylinder bore (mm) | 80 | 186 | 206 | |
| Stroke (mm) | 120 | 120 | 120 | |
| Speed (rpm) | 1200 | 1200 | 1200 | |
| Air inlet pressure (bar abs) | 194.0 | 36.1 | 6.6 | |
| Air inlet temp (° C.) | 700 | 700 | 700 | |
| Cylinder head temp (° C.) | 500 | 500 | 500 | |
| Piston temp (° C.) | 500 | 500 | 500 | |
| Cylinder liner, temp (° C.) | 150 | 150 | 150 | |
| Cylinder head heat loss (kWth) | 0.8 | 1.1 | 1.4 | 3.3 |
| Piston heat loss (kWth) | 0.8 | 1.1 | 1.4 | 3.3 |
| Liner heat loss (kWth) | 12.4 | 6.7 | 8.2 | 27.4 |
| Total heat loss (kWth) | 14.0 | 8.9 | 11.0 | 34.0 |
| Total friction loss (kW) | 4.8 | 3.8 | 10.2 | 18.8 |
| Electrical loss (kW) | 2.9 | 2.8 | 2.6 | 8.3 |
| Net electrical power (kWe) | 93.5 | 91.8 | 83.4 | 268.7 |

It is seen that the heat losses in the cylinder head and piston are small because the surface temperature of these components is allowed to reach 500° C. Nearly all the heat loss is to the cylinder liner, which must be cooled to maintain lubrication.

Since the thermal efficiency of the expansion system is about 75% in the base case of FIG. 1A, it is estimated that 1 kW(th) of heat loss is equivalent in importance to about 0.75 kW of mechanical or electrical power. This indicates that the heat losses are more important than the friction losses in Stages 1 and 2, but the situation is reversed in Stage 3.

It is seen from Table 2 that the total heat losses from the expansion system are calculated at 34 kW. This heat will be transferred into the cooling system which would probably be operating at around 80° C. This heat will be available for use in space heating or heating of hot water.

A discussion of input data and a method of running the spreadsheet calculation for the modeling is now described. Unless otherwise stated, the examples of input data given in the tables of the present section of the report relate to the base case of FIG. 1A. Values indicated with an asterisk (*) are the values input by the user. Other values are calculated by the spreadsheet from the input data.

Table 3 (below) shows input data relating to source air conditions, fuel composition etc. as in FIG. 1A.

| | |
|---|---|
| Assumed efficiency of compression | *85.0% |
| Source air pressure (bar) | *200 |
| Source air temperature (° C.) | *30 |
| Final exhaust pressure (bar) | *1.02 |
| LHV calorific value of fuel at 15° C. (kJ/kg) | *42.9 |
| Fuel density at 1 atm and 15.6° C. (kg/m³) | *840 |
| Hydrogen mass fraction in fuel (%) | *13.20% |
| Sulfur mass fraction in fuel (%) | *0.30% |
| Carbon mass fraction in fuel (%) | *86.50% |

The fuel composition is that of diesel fuel. Although a sulfur fraction is shown, for the purpose of the thermodynamic calculations, the sulfur is treated as carbon. This is done because REFPROP does not contain properties of the sulfur dioxide produced by combustion.

For these calculations, it is assumed that the stored air is produced by near-isothermal compression at 30° C. with an efficiency of 85%. This information is not required to calculate the performance of the expansion system alone, but is used to calculate the overall performance of the expansion system in combination with the compressor.

Of the data shown in Table 3, all the conditions other than the source air pressure are kept the same in the present calculations. The source air pressure is varied between 200 bar and 50 bar as described below.

Table 4 shows pressure ratios and volume factors.

| Stage | 1 | 2 | 3 |
|---|---|---|---|
| Stage pressure ratio (incl HX) | 5.2200 | *5.22 | *5.2485 |
| Cylinder volume factor | | *1.000 | *0.900 |

As indicated in Table 4, the spreadsheet user can specify pressure ratios and volume factors for Stages 2 and 3. The pressure ratio is simply the ratio of pressure at the inlet valve to the pressure just downstream of the exhaust valve. The pressure ratio for Stage 1 is determined by the air source pressure, the final exhaust pressure and the various pressure losses in the heat exchangers and burners and of course the specified pressure ratios in Stages 2 and 3. This information is used to define the pressure distribution around the system.

The volume factor is the ratio of the total volume of the stage relative to that of Stage 1, allowing for the different pressures in the stages. The volume factor for Stage 1 is therefore unity by definition.

By specifying a volume ratio of 0.9 in Stage 3, the user is specifying that there should be a bigger relative depressurization of the cylinder (i.e. "blowdown") when the exhaust valve opens. The effect of friction on a reciprocating engine is such that the last part of the expansion may not produce any additional net power (owing to friction). In this case, it may be better to have a smaller volume than would be necessary to expand the air fully down to the specified exhaust pressure.

Table 5 provides a specification of cylinder dimensions, air and gas temperatures and pressure losses.

| Stage | 1 | 2 | 3 |
|---|---|---|---|
| Cylinder bore (mm) | *80.00 | *186.00 | *206.00 |
| Number of cylinders | | *1 | *4 |
| Piston stroke (mm) | | | *120 |
| Rotational speed (rpm) | | | *1200 |
| Heat exchr secondary pressure loss (%) | | 3% | 4% |
| Combustion gas temp at HX inlet (° C.) | | | *750 |
| Air temp at cylinder inlet valve (° C.) | | | *700 |
| Ratio L/R | | | *4.3 |
| Residual volume fraction | | | *0.02 |
| Burner pressure loss (%) | | | *4% |
| Heat exchr primary pressure loss (%) | | | *3% |

-continued

| Stage | 1 | 2 | 3 |
|---|---|---|---|
| Design maximum cylinder pressure | *200 | *37.16 | *6.906 |
| Pressure at HX secondary inlet (bar) | 200 | 37.16 | 6.906 |
| Air pressure at cylinder inlet valve (bar) | 194 | 36.05 | 6.630 |
| Cylinder air exhaust pressure (bar abs) | 37.16 | 6.906 | 1.263 |
| Burner exit gas pressure (bar) | 1.052 | 1.129 | 1.213 |
| Burner inlet gas pressure (bar) | 1.095 | 1.176 | 1.263 |

Table 5 shows that the user defines the bore, stroke, rotational speed and number of cylinders directly. The pressure ratios and volume factors shown in Table 4 are not used to directly determine these input parameters, but they are used to suggest appropriate diameters for the cylinders for stages 2 and 3, which is compatible with the specified bore diameter for stage 1. The user may modify these or choose other bore diameters as desired.

The ratio L/R in Table 5, refers to the ratio of the length of the connecting rod to the radius of the crank rotation. These lengths refer to the distance between the centers of rotation. This radius is, of course, equal to half the stroke length.

The design maximum cylinder pressure is needed in the friction calculation to determine the size of the main bearings and connecting rod bearings. Those pressures given in Table 5 which are not indicated with an asterisk, are not directly entered by the user but are calculated by the spreadsheet.

Table 6 below, shows input data for the valves as applied to the base case.

| Stage | 1 | | 2 | | 3 | |
|---|---|---|---|---|---|---|
| Valves | Inlet | Exhaust | Inlet | Exhaust | Inlet | Exhaust |
| Diameter of valve port (mm) | 17.6 | 17.6 | 40.92 | 40.92 | 45.32 | 45.32 |
| Number of valves/cylinder | | | *2 | | | |
| Diameter ratio of valve port to cylinder bore | | | *0.22 | | | |
| Valve open period (CA°) | *72.319 | *188 | *80.289 | *180 | *84.897 | *192 |
| Valve opens at CA° | *0 | *170 | *−3 | *170 | *−3 | *160 |
| Valve lift (mm) | *6.2 | *6.2 | *12 | *15 | *12.5 | *16.5 |
| Valve seat angle to vertical (°) | | | *45 | | | |
| Valve discharge coefficient | | | *0.7 | | | |
| Hydraulic (HY) or roller (RC) cam followers | *HY | *RC | | | | |
| Max design speed for valves (rpm) | | | *1200 | | | |

The diameter of the valve port is input in the form of a diameter ratio relative to the cylinder bore, as indicated in the 5$^{th}$ row of the table. This is why the valve port diameters in the 3$^{rd}$ line are not shown as user input parameters.

The ratio of 0.22 is an estimate of the diameter ratio for a cylinder having four valves of equal port size. The period of the valve opening, which is specified by the user, refers to the whole duration from the start of lifting to final re-seating.

In the case of the cam-operated valves, the valve open period is kept constant while the source pressure is changed. In the case of the hydraulically operated valves, the user may vary either or both of the valve open period and the crank-angle at which opening begins.

The maximum design speed of the valve operation is needed to determine the valve lift profile. The cam must be capable of operating at this maximum speed.

Table 7 shows the input of heat transfer parameters and the mechanical-electrical conversion efficiency.

| Stage | 1 | 2 | 3 |
|---|---|---|---|
| Multiplier for Woschni equation | | | *1.7 |
| Cylinder head surface temp (° C.) | | | *500 |
| Piston surface temp (° C.) | | | *500 |
| Liner surface temp (° C.) | | | *150 |
| Mechanical-electrical conversion efficiency (%) | | | *97.0% |

In the base example of FIG. 1A, it is envisaged that the expansion system would drive a generator at a fixed speed of 1200 rpm. In this case, a mechanical-electrical conversion efficiency of 97% is applied.

If the expansion system is required to run at different speeds, then it would be necessary to have a gearbox or frequency converter. Such an embodiment may specify a lower value for the conversion efficiency.

The effect of rotational speed at constant source pressure is now examined. If the expander design is fixed such that the stroke of the piston is defined, then changes in the rotational speed affect the mean piston speed.

The mean piston speed plays a role in determining the performance of the expander, with regard to friction. The mean piston speed also determines expander performance in connection to the volumetric flow rate of air through the valves and hence the pressure drop in the valves.

The calculational model predicts that these mechanisms may cause a reduction in efficiency, if the mean piston speed is increased above a threshold level (e.g. about 7 m/s). If, however, the rotational speed and the piston stroke are both varied to maintain the mean piston speed at a constant, the effect of increasing rotational speed becomes smaller.

One effect is that the aspect ratio (i.e. bore-to-stroke ratio) becomes large. While this may be undesirable from the standpoint of constructing the expander, in principle there is little effect on the calculated performance.

Another effect is on the valves. In particular, the valves may be constrained to a lower lift, because of the high rotational speed.

Figure 7:
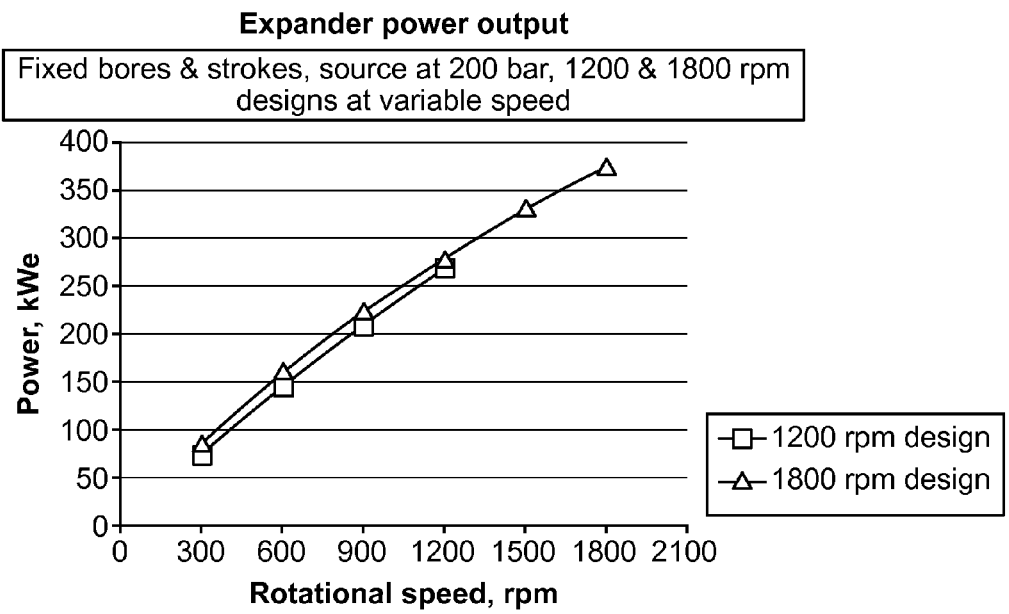
FIG. 7 shows expansion system power variation as a function of speed, for two systems with the same bore and stroke but different maximum design speeds.

FIG. 7 shows expansion system power variation as a function of speed, for two expansion systems with the same bore and stroke (that of FIG. 1A), but different maximum design speeds. One system design runs at 1200 rpm; the other design runs at 1800 rpm.

The 1200 rpm expansion system has the same valve lift as shown in Table 6. The 1800 rpm system has reduced lift of 8.1 mm and 8.6 mm for the Stage 2 and Stage 3 inlet valves respectively. Other valve lifts are the same as for the embodiment of FIG. 1A.

The variation with speed, shows slightly less than a linear increase in power with speed. This non-linearity is due to the increased friction and valve losses as the rotational speed and the mean piston speed increases.

Both the 1200 rpm and 1800 rpm expansion system designs, show nearly the same variation in power output with rotational speed. The reason for the slightly higher power output in the 1800 rpm design, is that the Stage 1 air inlet valve closes slightly later than in the case of the 1200 rpm design. Consequently in this particular case the air flow rate is slightly higher, even when both designs are running at the same speed.

The expansion system efficiency $\eta_{exp}$, the cycle efficiency, $\eta_{cycle}$, and the energy output ratio, $\eta_{ratio}$, are useful indications of the performance. The expansion system efficiency is the expansion system energy output relative to the fuel energy input. The energy output ratio is the ratio of expansion system energy output to the compressor energy input. The energy output ratio indicates the efficiency of the expansion system with respect to the consumption of air and the associated work of air compression. Thus the expansion system efficiency concerns the fuel consumption while the energy output ratio concerns the air consumption. The cycle efficiency is the net energy output (i.e. after subtracting the energy input of the compressor) relative to the fuel energy input. The cycle efficiency expresses the efficiency with regard to both the fuel and the air. There is a relationship between these efficiencies:

$$\eta_{cycle} = \eta_{exp}\left(1 - \frac{1}{\eta_{ratio}}\right).$$

Figure 8:
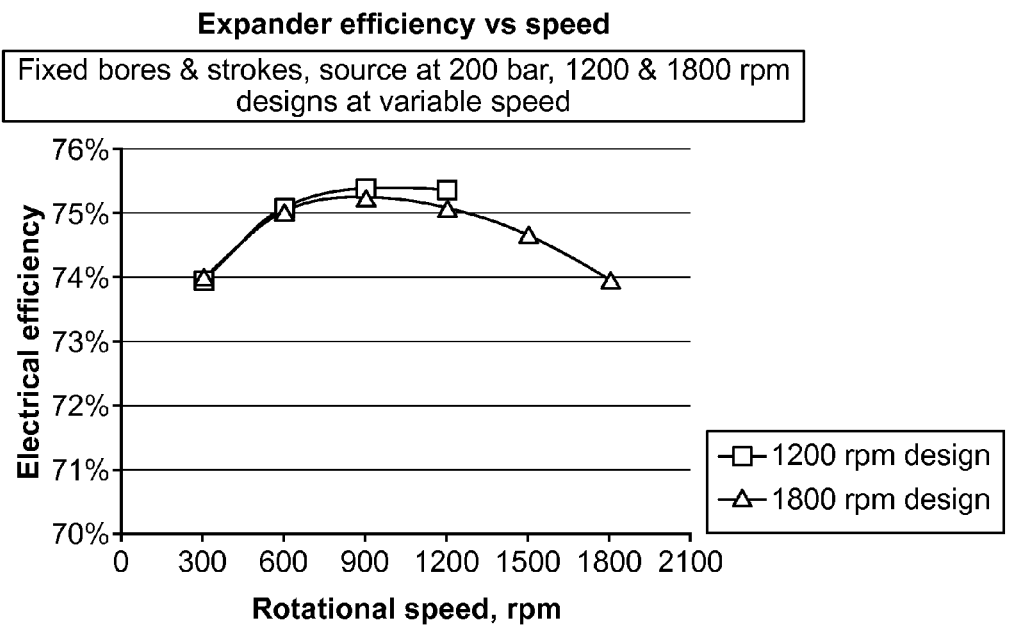
FIG. 8 shows expansion system efficiency as a function of speed, for two different systems with the same bore and stroke but different maximum design speeds

FIG. 8 shows expansion system efficiency as a function of speed, for two different systems with the same bore and stroke but different maximum design speeds. It is seen that there is a maximum efficiency at about 900 rpm, but there is little difference between the efficiencies calculated at 900 rpm and at 1200 rpm for the case of the expander with the 1200 rpm maximum design speed. The reduced efficiency at low rotational speed may be due to the higher heat loss per unit of air flow.

Figure 9:
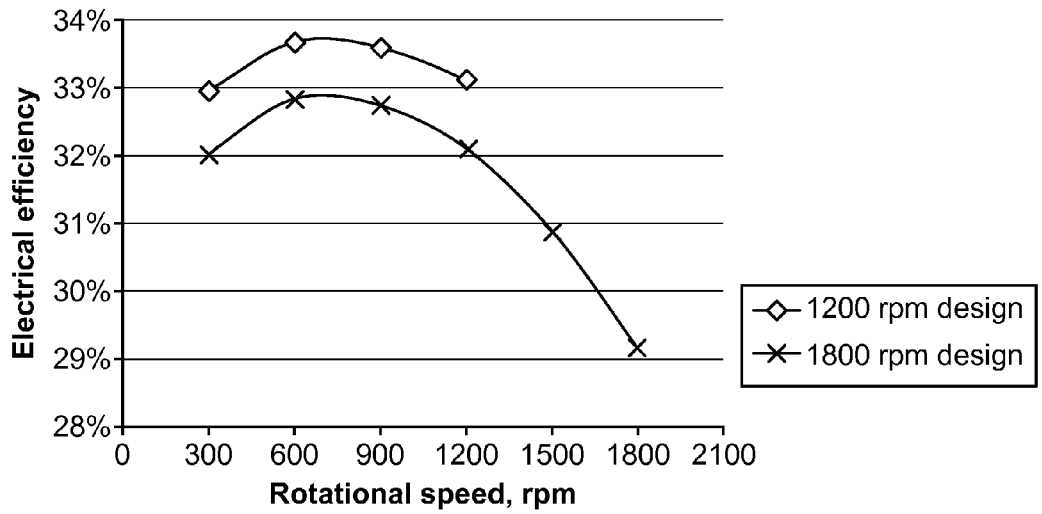
FIG. 9 shows cycle efficiency as a function of speed, for two different expansion systems with the same bore and stroke but different maximum design speeds

FIG. 9 shows how the cycle efficiency varies with rotational speed, for the same two expansion system designs described in FIGS. 7 and 8. This cycle efficiency takes into account the compression work, so the efficiency becomes dependent on the optimum use of air as well as on the optimum use of fuel.

Figure 10:
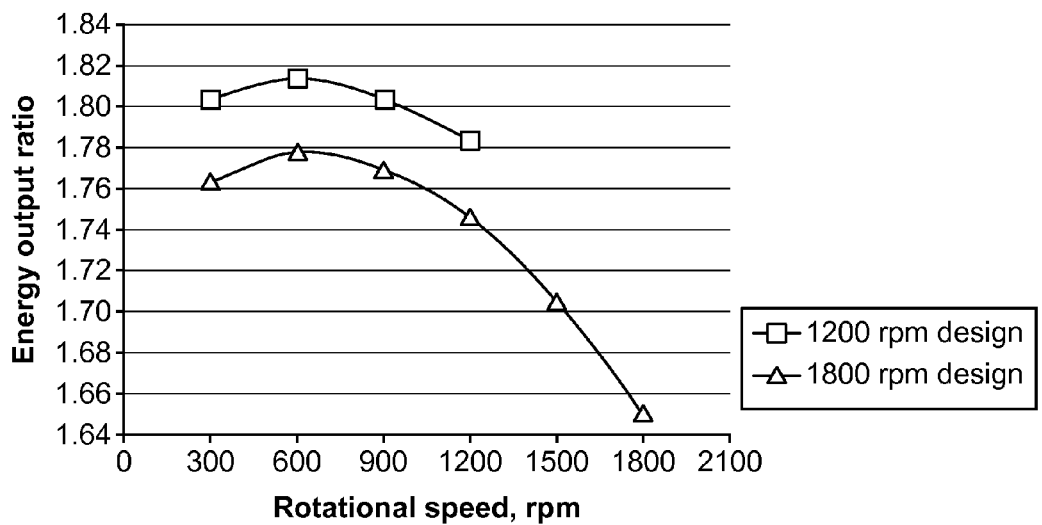
FIG. 10 shows expansion system energy output ratio as a function of speed, for two different systems with the same bore and stroke but different maximum design speeds.

FIG. 10 shows the energy output ratio as a function of rotational speed, for the same two expansion systems as in the previous FIGS. 7-9. This parameter emphasizes the optimum use of air, rather than fuel.

FIG. 10 shows highest energy output ratio at about 600 rpm. The ratio at 1200 rpm is only slightly lower. Here, the 1200 rpm design gives better performance than the 1800 rpm design.

The use of modeling calculations allows prediction of performance for energy recovery at various source pressures. Table 8 shows performance of the expansion system in the base case calculation of FIG. 1A, which is done for a source pressure of 200 bar.

| | |
|---|---|
| Air mass flow (kg/s) | 0.2787 |
| Total expansion system thermal input (kWth) | 356.6 |
| Expansion system electrical power output (kW) | 268.7 |
| Electrical efficiency of complete expansion system (%) | 75.36 |
| Compression power (kW) | 150.6 |
| Net electrical output of compressor & expansion system (kW) | 118.1 |
| Electrical efficiency of compressor & expansion system (%) | 33.12 |
| Energy output ratio (electrical) | 1.784 |
| Electrical energy output per mass of air (kWh/kg) | 0.268 |

In particular, it is noted that electrical efficiency of the expansion system calculated relative to the thermal input is over 75%. The energy output ratio is predicted to be about 1.78.

This ratio can be compared to a ratio of 0.7 which may represent a type of energy storage and recovery system featuring an expansion system in which air is expanded from ambient temperature and the temperature drop during expansion is limited by spraying water which is also initially at ambient temperature. This is also referred to herein as an "unheated expansion system". Thus the power output of the externally heated expansion system is predicted to be 2.5× larger than that of an unheated expansion system using the same amount of compressed air at 200 bar.

The electrical energy output of the heated expansion system per kg of compressed air at 200 bar is calculated to be 0.268 kWh per kg of air. The equivalent figure for an unheated expansion system is expected to be 0.105 kWh/kg, which is again a factor of 2.5 smaller.

Table 8 also shows the calculated electrical efficiency expected if the expansion system and the compressor are running together as an engine. In this case the net power output is 118 kWe, and the calculated efficiency is 33%. This compares with an electrical efficiency of around 40% which could be achieved with a diesel engine of similar size.

A number of calculations were also performed around the base case, by reducing the source pressure from 200 bar abs down to 50 bar abs. This was done by allowing the pressure ratio of the expansion to be reduced from 5.2 at 200 bar source pressure down to 1.3 at 50 bar source pressure. The pressure and temperature conditions of stages 2 and 3 were unchanged.

Two strategies were considered. In a first series of calculations, the air mass flow was maintained at a constant level throughout the pressure range. In a second series of calculations, the air mass flow was increased at lower air pressures in order to try to maintain a nearly constant power output.

The method used to control the air mass flow is a combination of controlling the closing time of the hydraulic air inlet valve on the Stage 1 cylinder, and adjusting the air temperature at the inlet of the cylinder. Reduction of the air temperature allows more air into the cylinder at each stroke, so this increases the mass flow.

Figure 11:
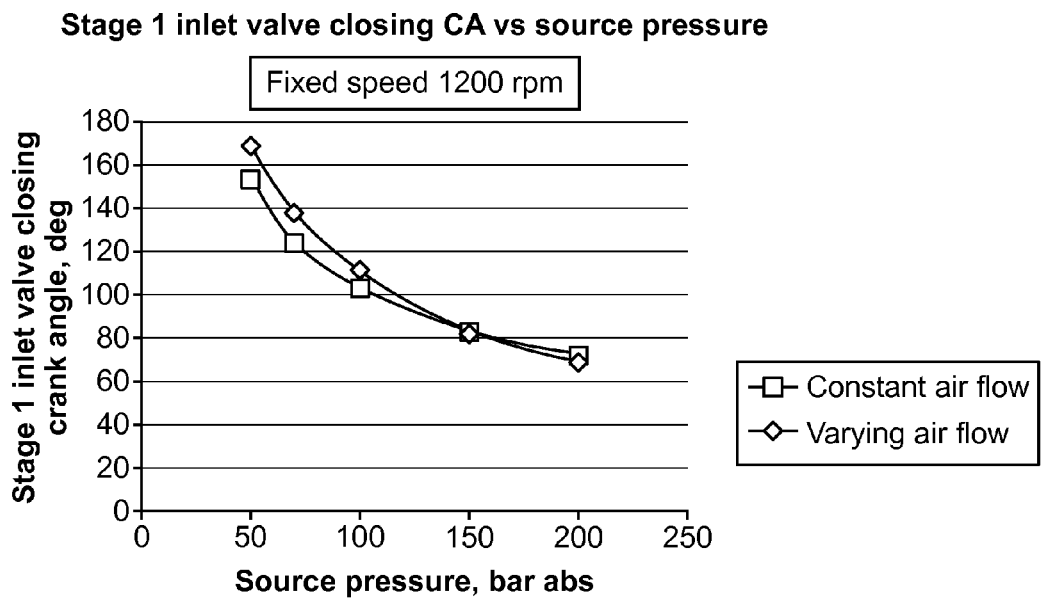
FIG. 11 shows variation of the inlet valve closing crank angle as the air source pressure changes.

FIG. 11 shows how the closing crank angle was varied in the two series of calculations. In particular, FIG. 11 shows variation of the inlet valve closing crank angle as the air source pressure changes.

Since it is assumed that the Stage 1 air inlet valve is operated hydraulically, there was no need to change the opening crank angle of this valve.

Figure 12:
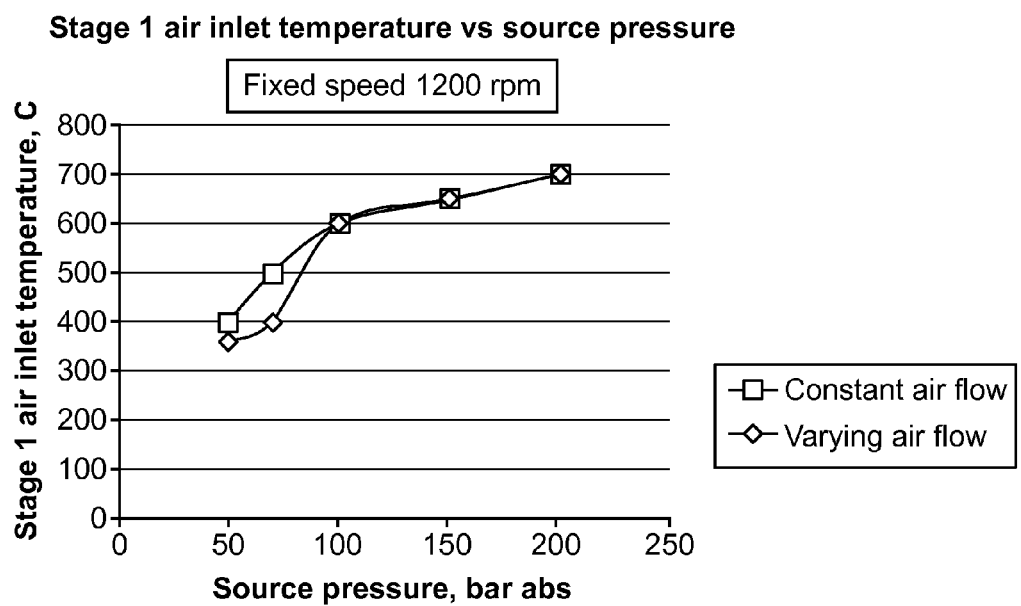
FIG. 12 shows variation of the stage 1 air inlet temperature as the source pressure changes

FIG. 12 shows how the air inlet temperature for the Stage 1 cylinder was controlled to assist the process of either maintaining a constant air flow or increasing it as the source pressure falls. In particular, FIG. 12 shows variation of the Stage 1 air inlet temperature as the source pressure changes. Since there is a separate burner and heat exchanger for each of the three stages in the particular embodiment shown in FIG. 1A, it is possible to reduce the temperature at the Stage 1 inlet, while maintaining a constant temperature at the inlets of Stages 2 and 3.

In the case where the air mass flow is maintained constant, it is not necessary to change the phasing of the camshaft on stages 2 and 3, since the inlet pressures and temperatures at the inlets of these stages are unchanged. If the mass flow is varied then the phasing in Stages 2 and 3 may be adjusted. However, the inlet pressures and temperatures of these stages were not changed from the base case.

Figure 13:
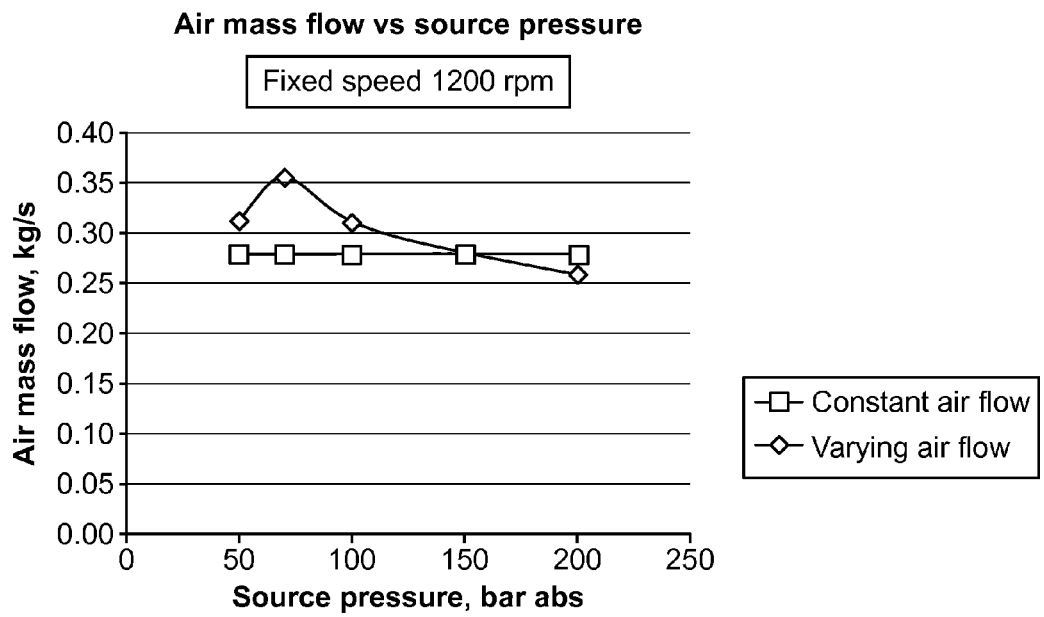
FIG. 13 shows variation of air mass flow with source pressure.

FIG. 13 shows the resulting air mass flow as a function of air source pressure. In the series of calculations where mass flow is being varied, it is seen that the mass flow at the lowest source pressure of 50 bar falls relative to that at 70 bar. This occurs because the Stage 1 air inlet temperature has been lowered to the point where the Stage 1 burner would be turned off. Also there is no more scope for increasing the closing crank angle of the Stage 1 air inlet valve.

Figure 14:
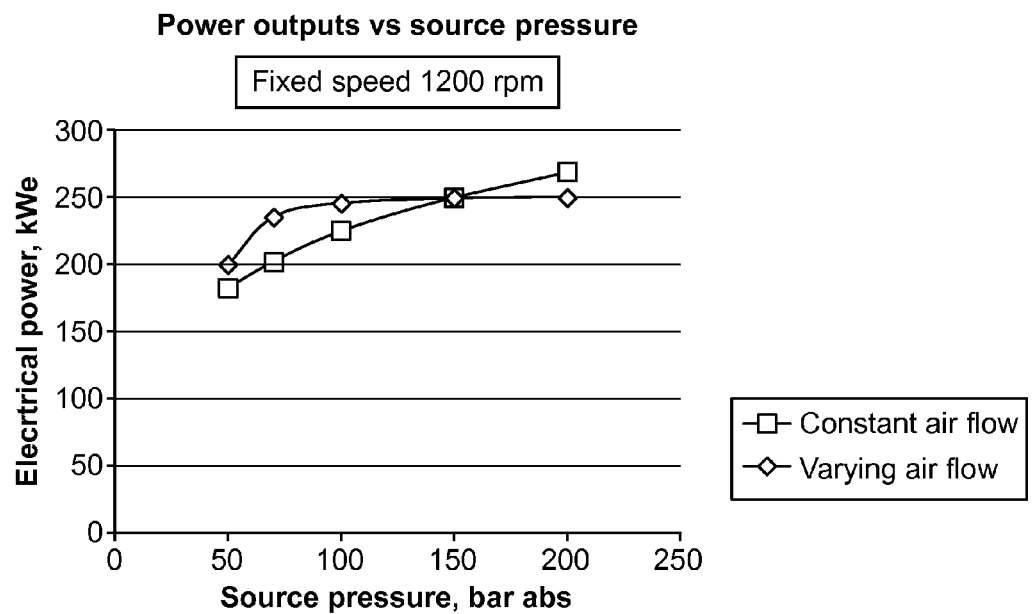
FIG. 14 shows variation of power output versus air source pressure.

FIG. 14 shows the resulting power output for the two series of calculations. In particular, FIG. 14 shows variation of power output versus air source pressure.

It is seen that if the air mass flow is maintained constant, the power output of the expansion system varies from 269 kW at 200 bar down to 183 kW at 50 bar. If, however, the air mass flow is adjusted, it is possible to maintain a constant power output at 250 kW until the source pressure drops to about 70 bar. Below this pressure, the expansion system power output drops falling to about 200 kW at 50 bar source pressure.

This performance may be useful in certain applications. However, if more flexibility is desired to vary the expansion system power output, then a gearbox or frequency converter could be used to allow the operator to vary the speed of the expansion system.

Figure 15:
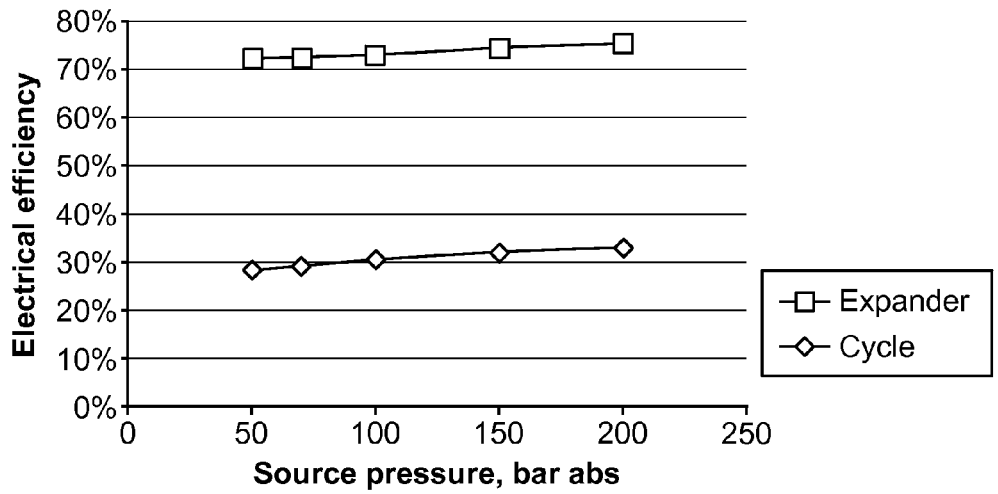
FIG. 15 shows expansion system efficiency and complete cycle efficiency at constant air flow.
Figure 16:
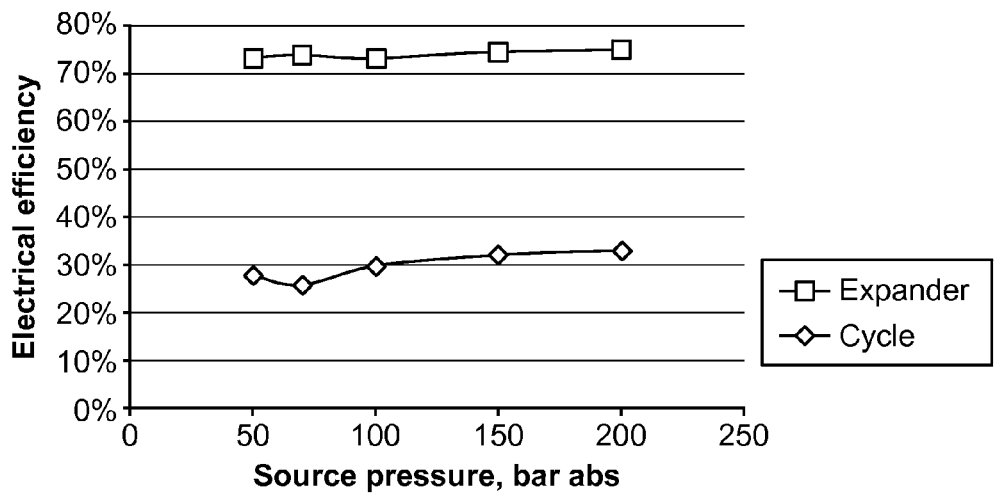
FIG. 16 shows expansion system and complete cycle efficiency with varying air flow.

FIG. 15 shows expansion system and cycle efficiency at constant air flow. FIG. 16 shows expansion system and cycle efficiency with varying air flow. FIG. 15 and FIG. 16 show that the efficiency of the expansion system regarding the consumption of fuel is maintained between 70% and 75% over the range of source pressures from 200 bars down to 50 bars.

The total cycle efficiency, which allows for the consumption of power by the near-isothermal compressor, drops from 33% at 200 bar down to 28.4% at 50 bar air source pressure in the case where the mass flow is constant. When the mass flow is varied in order to maintain a constant power output, there is a drop in complete cycle efficiency to 25.8% when the air source pressure is 70 bar. The recovery to 27.8% at 50 bar source pressure is achieved at the expense of a reduction in power output as shown in FIG. 14.

Figure 17:
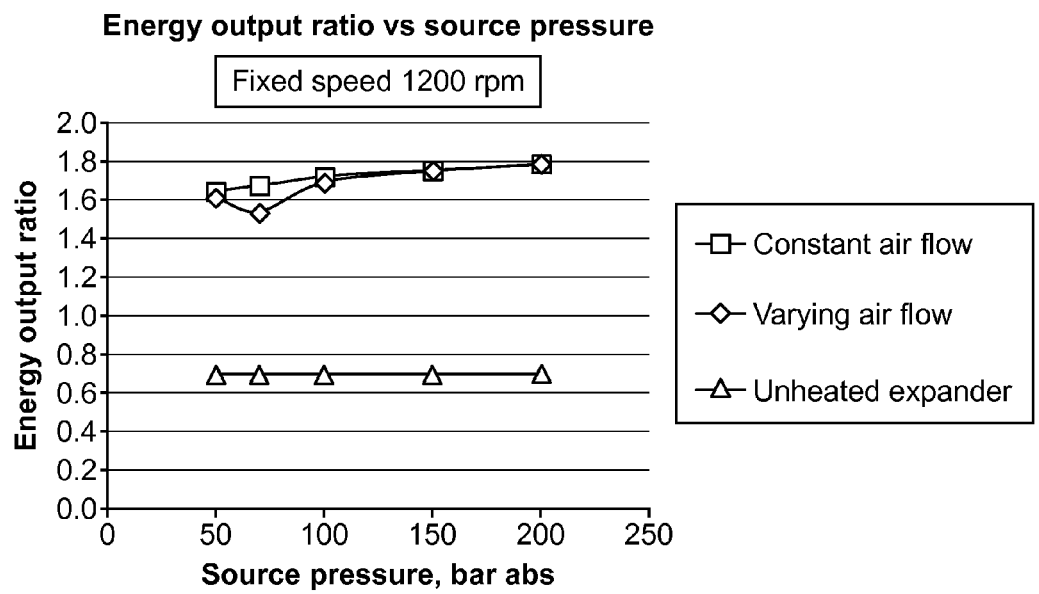
FIG. 17 shows energy output ratio versus air source pressure.

FIG. 17 plots energy output ratio versus air source pressure. In particular, FIG. 17 shows the variation of the energy output ratio, which is the ratio of electrical energy recovered to electrical energy used in storage. The addition of heat to the expansion system allows this ratio to be maintained in the range of about 1.6 to 1.8 except at 70 bar source pressure, in the case where the mass flow is increased to a high level of 0.35 kg/s.

FIG. 17 also shows the energy output ratio for the unheated expansion system, which is predicted to be 0.7. For the sake of this comparison, it is assumed that the unheated expansion system will be able to maintain the ratio of 0.7 over the full pressure range.

Figure 18:
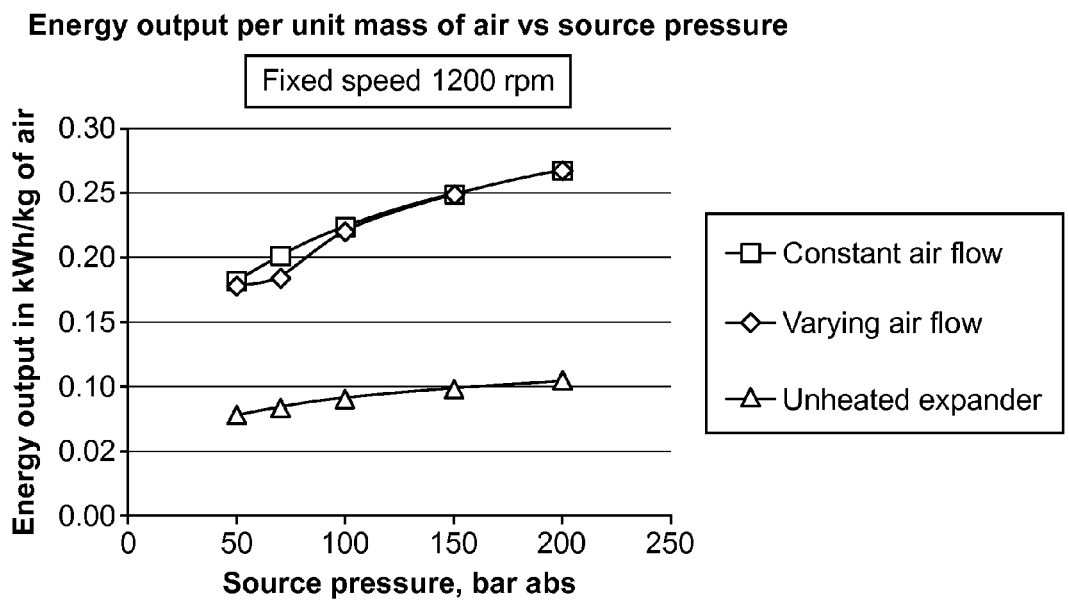
FIG. 18 shows expansion system energy output per unit mass of air versus source pressure.

FIG. 18 shows expansion system energy output per unit mass of air versus source pressure. It is seen that this falls from 0.268 kWh/kg at 200 bar source pressure, down to 0.178 at 50 bar. In the case of an unheated expansion system, the energy output per unit mass of air may fall from 0.105 kWh/kg at 200 bar down to 0.077 kWh/kg at 50 bar.

Integrated performance over a complete storage and recovery cycle was investigated. A calculation was performed for a complete cycle of compressed air storage and recovery for the case of the expansion system shown in FIG. 1A, working together with an isothermal compressor with an efficiency of 85%.

Table 9 shows integrated performance over a complete storage and recovery cycle.

|  | Unheated | Heated |
| --- | --- | --- |
| Mass flow rate (kg/s) | 0.2787 | 0.2787 |
| Mass of air compressed/expanded (kg) | 16394 | 16394 |
| Electrical energy consumed (kWh) | 2199 | 2199 |
| Electrical energy generated (kWh) | 1539 | 3803 |
| Energy output ratio | 0.700 | 1.729 |
| Total time of generation (hrs) | 16.3 | 16.3 |
| Total diesel fuel consumed (kg) | — | 431.7 |
| Total diesel fuel consumed (L) | — | 514.0 |
| Average power output (kW) | 94.2 | 232.8 |
| Thermal energy input as fuel (kWh) (LHV) | — | 5145 |
| Average expansion system efficiency (%) | — | 73.9% |
| Average cycle efficiency including compression (%) | — | 31.2% |

The expansion system ran at a fixed speed of 1200 rpm, and the mass flow was constant at 0.2787 kg/s. The compressed air storage system had a volume of 100 m³, and the cycle involved compression from 50 bar abs up to 200 bar abs, followed by expansion from 200 bar abs back down to 50 bar abs. The air temperature of the compressed air store was constant at 30° C. The fuel for the heated case was diesel fuel.

Table 9 shows the results of the integrated performance calculation compared with the unheated system, for which it is assumed that the energy output ratio is 0.7. It is seen that the 100 m³ volume gives a total generation time of 16.3 hours in both cases. But, the average power output in the heated case is 232.8 kWhe compared to 94.2 kWhe in the unheated case. The mass of air compressed is the same in both cases. The consumption of diesel fuel in the heated case was calculated to be 431.7 kg.

Figure 19:
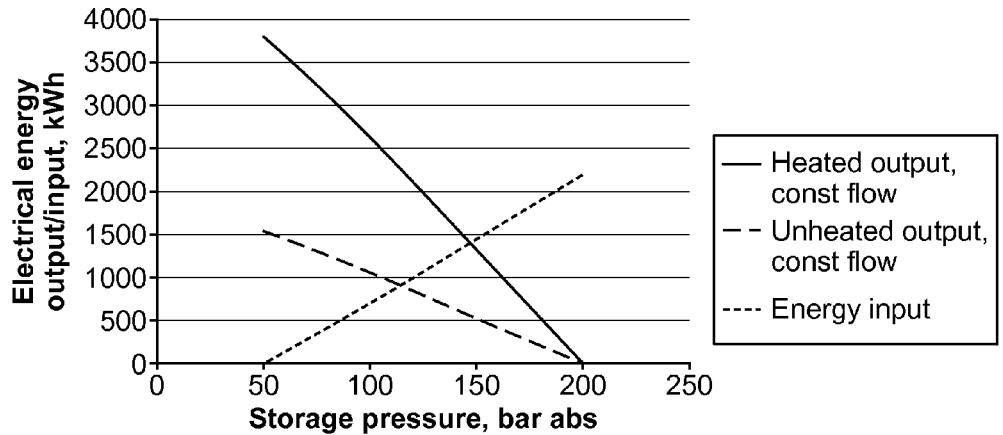
FIG. 19 shows integrated energy output/input versus air storage pressure for 100 m$^3$ volume.
Figure 20:
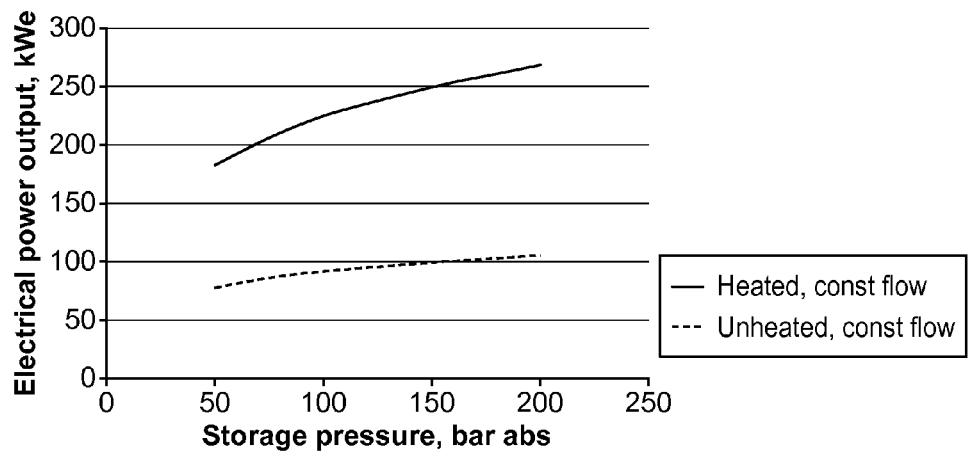
FIG. 20 shows expansion system power output versus air storage pressure.

FIG. 19 shows the integrated variation of the energy outputs and inputs versus the air storage pressure. FIG. 20 shows the variation in the power output with air storage pressure.

Since the air mass flow is constant and the stored air mass is almost exactly proportional to the pressure, the air storage pressure varies linearly with time. The time taken for the storage pressure to decrease from 200 bars to 50 bars is 16.3 hours, as shown in the Table 9.

Modeling calculations may also provide predictions for the expansion system and compressor working as an engine. Specifically, if the stored air pressure falls below 50 bar, then it may be difficult to run the expansion system using stored air.

Under these conditions, it is possible for the expansion system to continue running by simultaneously compressing the air that it needs to function. The compressor and expansion system would thus effectively be working together as an engine, and power generation could continue for as long as necessary. Such a configuration would avoid the need to have a separate diesel engine to take over power generation, when the stored air is depleted.

In certain embodiments, a compressor could compress air to 200 bar and then deliver it directly to the expander, without passing through a storage volume.

According to some embodiments, the expander would not be mechanically connected to the compressor, but instead would generate electrical power, some of which would be diverted to operate the compressor. The excess power would be available for export.

In such a scenario, the expansion system and compressor would not necessarily be situated together, as long as power could be transmitted from the expansion system to the compressor, and air transmitted from the compressor to the expansion system. Under this scenario, the expansion system and compressor would not necessarily need to be run at the same speed, as long as the output frequency of the expansion system generator is the same as the required input frequency of the compressor drive system.

In an absence of a mechanical connection between the compressor and expansion system, there could be power losses in the conversion of mechanical to electrical power at the expansion system and the reverse conversion at the compressor. These power conversion losses are included in the calculations described here.

To investigate this operational configuration, calculations were done to examine how much power could be produced by the same expansion system (with a nominal output of 250 kW) and compressor working together as an engine. This process involved increasing the air flow through all the stages.

Table 10 shows performance of the expansion system and compressor working as an engine. Here, CASE 2 represents the base case of FIG. 1A.

|  | CASE 1 | CASE 2 | CASE 3 |
|---|---|---|---|
| Expansion system rotational speed (rpm) | 1200 | 1200 | 1200 |
| Air inlet temperature at all cylinders (° C.) | 700 | 700 | 700 |
| Air mass flow (kg/s) | 0.259 | 0.279 | 0.326 |
| Total thermal input (kWth) | 332.6 | 356.6 | 406.8 |
| Expansion system electrical power output (kW) | 249.8 | 268.7 | 306.6 |
| Isothermal compression power input (kW) | 139.9 | 150.6 | 176.2 |
| Net electrical output of cycle (kW) | 109.8 | 118.1 | 130.5 |
| Net electrical efficiency of cycle (%) | 33.02 | 33.12 | 32.07 |

Table 10 shows the results assuming constant rotational speed of the expansion system. The air temperature is also maintained at a constant level. Some calculations were done in which the inlet air temperature was reduced, but it was found that although the expansion system power output was increased, the compressor power demand increased also. The result was a fall in efficiency, such that the net power output hardly changed.

Table 10 shows that the 250 kWe expansion system may run continuously in combination with the compressor at an efficiency of 32% and a net electrical power output of 130 kW.

According to certain embodiments, a three-stage expansion system may include a third stage in the form of a turbine. Specifically, it was seen in Table 1 that the $3^{rd}$ stage of the 3-stage reciprocating expansion system, suffered a friction loss of 10.2 kW as compared to friction losses of 4.8 and 3.8 kW in the $1^{st}$ and $2^{nd}$ stages. Expressed as a proportion of the stage output, the friction loss of the $3^{rd}$ stage is over 10% as compared to less than 5% in stages 1 and 2.

Accordingly, it may be desirable to use a turbine expander in the $3^{rd}$ stage. This is because turbines tend to exhibit less friction and lower heat loss than reciprocating machines.

On the other hand, turbines offer some aerodynamic losses in the blading, and leakage losses around the tips of the blades. Also, a turbine expander would result in a speed of rotation being higher than 1200 or 1800 rpm (e.g. ~40,000 rpm). Thus some sort of mechanism (e.g. gearing) would likely be used reconcile the speeds of the rotating and reciprocating stages of the expansion system.

Since the turbine and gear would replace four low pressure expansion cylinders in this embodiment, an overall expansion system size could be significantly reduced. The turbine expander could use the same heated air supply at 700° C. as that proposed for the reciprocating expander.

Also, since it would be operated as the $3^{rd}$ stage, the turbine expander could run at fixed mass flow rate, inlet pressure, and temperature over the full range of air source pressures, so there would not be a need for flexibility in its operating conditions.

Calculations were performed to assess the potential performance of a mixed system featuring a turbine expander in place of a $3^{rd}$ stage reciprocating expander. For the purpose of the assessment, it was assumed that the turbine expander would have an isentropic efficiency of 87% and that 1% of the mechanical output would be lost to friction in the turbine itself and in the speed reduction gearing. In addition it was assumed that there would be a heat loss of 1% of the mechanical output.

Figure 21:
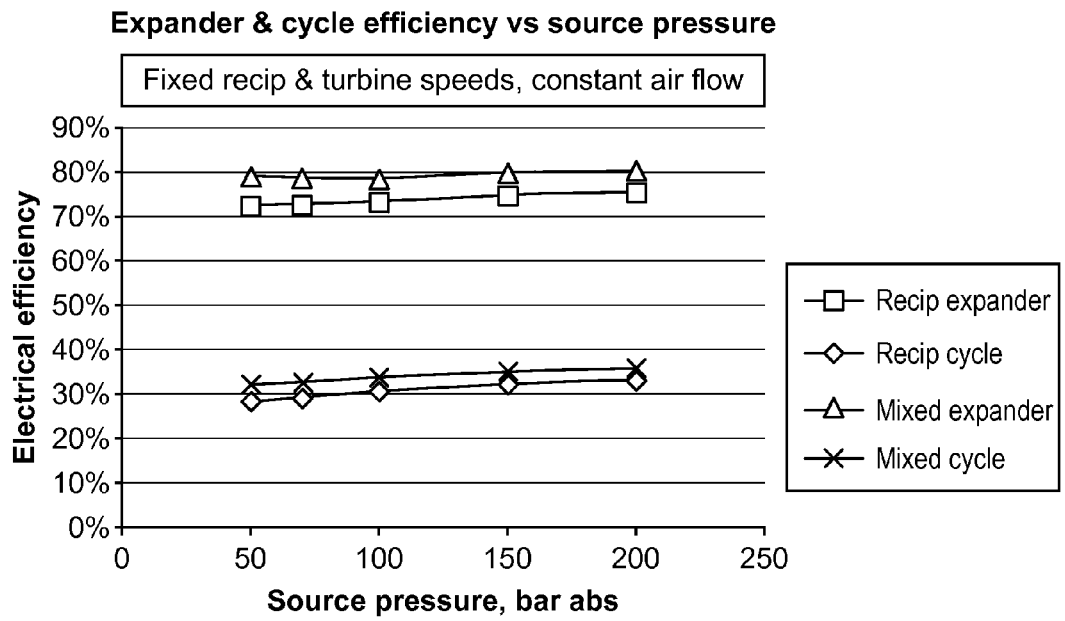
FIG. 21 compares expansion system and cycle efficiency of a 3-stage mixed reciprocating expansion system with a mixed system having a turbine expander in the 3$^{rd}$ stage.

FIG. 21 shows a comparison of the expansion system and cycle efficiencies of the exclusively reciprocating, and mixed systems. It is seen that the expansion system efficiency is increased by 5 to 6 percentage points. The overall cycle efficiency is improved by about three percentage points if a turbine expander is used.

The effect is enhanced at lower pressure. This is because when air source pressure is low, the stage 3 expander is responsible for a larger fraction of the total expansion system output.

Figure 22:
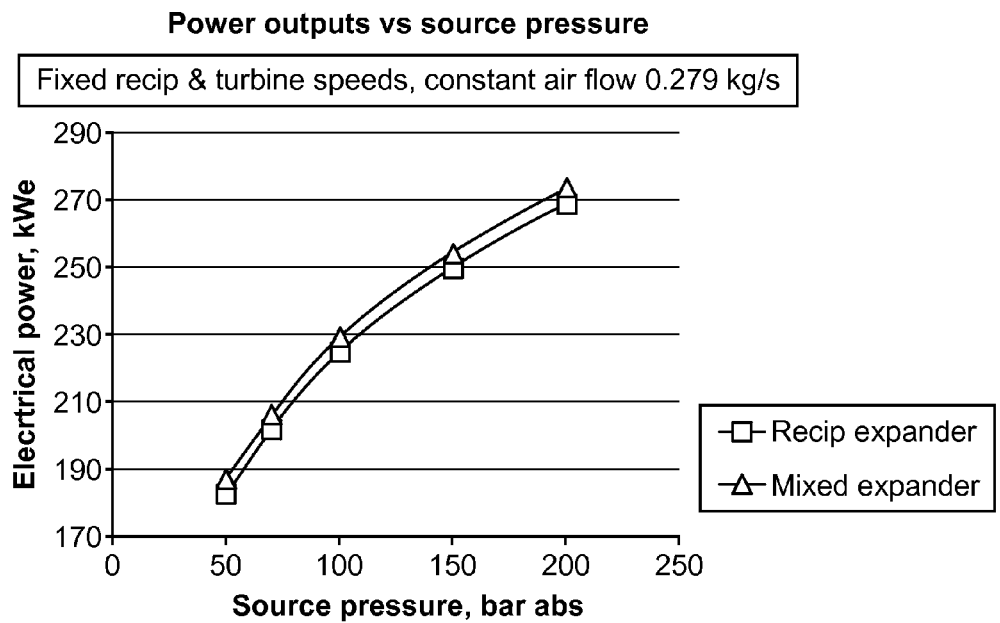
FIG. 22. Comparison of electrical power output of a 3-stage reciprocating expansion system with a mixed system having a turbine expander in the 3$^{rd}$ stage.

FIG. 22 shows comparison of electrical power output of a 3-stage reciprocating expansion system, with a mixed expansion system having a turbine expander in the $3^{rd}$ stage. The mixed expansion system has an increased power output of about 4 kWe over the range of source pressures.

As mentioned above, systems according to embodiments may operate with a number of expansion stages different from three. In particular, an apparatus featuring two expansion stages may be attractive by virtue of its compact size and performance.

Figure 23:
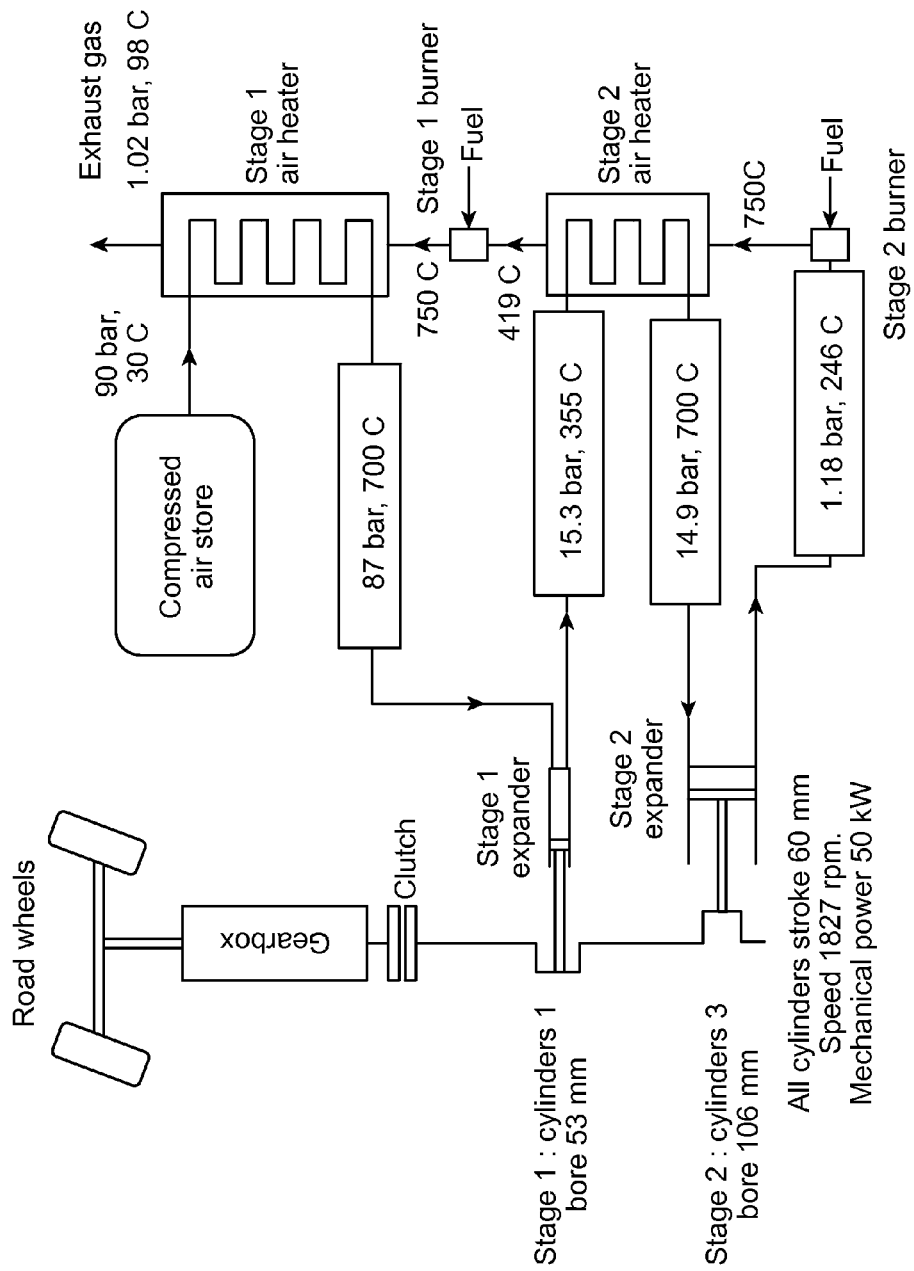
FIG. 23 shows an embodiment of a 2-stage air expansion system with external combustion.

FIG. 23 shows an embodiment of an air expansion circuit comprising two piston expansion stages. This figure shows the conditions at a particular intermediate pressure between 200 bars and 50 bars. This system may be suited for a light, compact power unit as might be used in a moving vehicle (e.g. motorcycle, automobile, bus, truck, ship, train, etc.)

As indicated in the diagram of FIG. 23, this expansion system could have single cylinders for Stage 1, with three (3) cylinders in parallel in Stage 2. In an embodiment, the range of source pressures could be from 200 bar down to 50 bar, or possibly lower.

A number of calculations were performed using the calculation model described above. Calculations for this embodiment were aimed at a notional engine which would produce a minimum of 50 kW of mechanical power, over the pressure range of 200 bar down to 50 bar.

A maximum engine speed of 2400 rpm was chosen for the modeling. This choice of maximum speed defined certain characteristics of valve performance.

When the air source pressure is at 200 bar, the engine can produce significantly more power than it can when the air source pressure is at 50 bar. Therefore, the size of the cylinders is determined by its performance at the lowest source pressure.

FIG. 23 shows the conditions for a particular configuration where the air source pressure has fallen to 90 bar. In this case, the desired output of 50 kW is achieved with an engine speed of 1827 rpm.

As shown in FIG. 23, air stored at 90 bar is fed from the compressed air energy store to the Stage 1 air heater. That air heater may be of tubular design, with high pressure air inside the tubes and low pressure exhaust gas on the outside.

The Stage 1 air heater heats the compressed air to 700° C. The hot air then enters the Stage 1 cylinder and is expanded to a pressure of 15.3 bar abs (in this particular embodiment).

The partially expanded compressed air then enters the Stage 2 air heater at 355° C. and is reheated to 700° C. before entering the inlet of the Stage 2 cylinder. Therein, it is expanded to 1.18 bar.

The air from the Stage 2 cylinder is then fed to the Stage 2 burner, where fuel is added sufficient to increase the temperature to 750° C. The combustion products flow into the Stage 2 air heater and provide heating for the compressed air, which is supplied to the Stage 2 expander.

The combustion products leave the Stage 2 air heater at 419° C. and enter another burner which supplies hot gas at 750° C. to the Stage 1 air heater. After transferring most of their heat in the Stage 1 air heater, the combustion gases are exhausted to the atmosphere at a temperature of 98° C. (in this particular embodiment).

In this embodiment, both burners are duct burners in which additional fuel is burned in the low pressure exhaust air of the 2nd expansion stage. In the calculations reported here, it is assumed that the fuel is diesel fuel, but a wide range of alternative fuels could be used instead.

The heat exchangers shown in FIG. 23 use hot combustion gas at near atmospheric pressure as the heat source, and use compressed air as the heat sink. Heat exchanger performance can be designed according to factors such number of tubes, tube diameters, tube length etc. Target figures for temperature differences and pressure drops are assumed in the calculation, and these are used for the calculation of overall system performance.

The inlet and exhaust valves on the expanders are assumed to be poppet valves. No adjustment is made of the timing of the exhaust valves in the Stage 1 expander or of the inlet and exhaust valves in the Stage 2 expander.

Valves whose timing is controlled are the air inlet valves for the Stage 1 expander, which may have hydraulic actuation. Mechanical valves may be operated by overhead camshafts as has been previously discussed.

Owing to their compactness, embodiments such as that shown in FIG. 23 may find particular use in mobile environments. For the purpose of mobile applications (such as a road vehicle), there may be no requirement to maintain a fixed engine rotational speed. This affords the driver more flexibility in controlling the power output, and can be helpful in compensating for the effect of the varying air source pressure as the compressed air store is depleted.

The torque of the engine can be controlled by adjusting the timing of the hydraulic air inlet valves on the Stage 1 cylinder.

Fuel flow to the Stage 1 and Stage 2 burners may be automatically adjusted in proportion to the air flow. It may be necessary to override this control, if the temperatures in the air heaters exceed specified limits.

To apply the externally heated expansion system in the context of a road vehicle, a mechanism allowing continued operation upon depletion of the stored compressed air, may be provided. Thus the vehicle can continue its journey, as long as it has enough fuel. In this manner, the stored compressed air may provide the most economical approach to powering the vehicle, but the driver is not dependent upon that stored compressed air.

In order to distinguish the various modes of operation, the mode where the vehicle is consuming stored compressed air is referred to herein as the "normal mode". The mode where the vehicle is no longer consuming stored compressed air, is referred to herein as the "extended range" mode.

Both these modes of operation may exhibit a "regenerative braking" functionality. This refers to the ability to store excess kinetic energy of the vehicle for future use. Regenerative braking may be accomplished using essentially the same system but with additional components, as described below.

Figure 24:
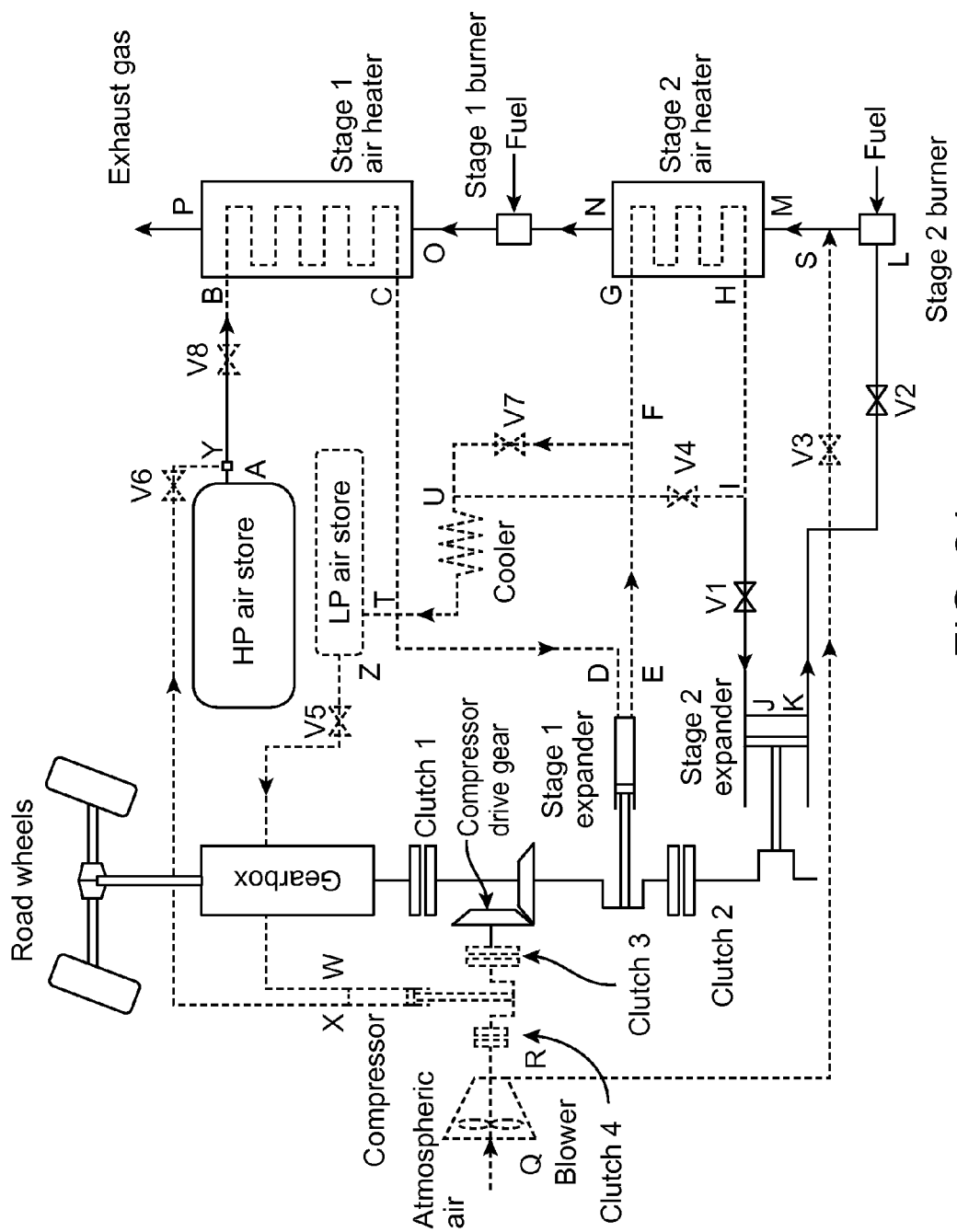
FIG. 24 is a diagram of an embodiment of a 2-stage expansion system adapted for application in a road vehicle and incorporating "extended range" capability and regenerative braking.

FIG. 24 shows how a 2-stage expansion system can be adapted for application in a road vehicle. The system of FIG. 24 has "extended range" capability and also utilizes regenerative braking.

FIG. 24 shows components and pipelines in solid and some in outline. The components and pipework in solid are the same as those shown in FIG. 23. The components and pipework shown dashed are those which are used to provide the additional capability for extended range motoring and for regenerative braking.

Table 11 shows a summary of the positions of the valves and clutches during the different modes of operation. The symbol O denotes an open valve, X denotes a closed valve, E denotes an engaged clutch and D denotes a disengaged clutch.

| | V1 | V2 | V3 | V4 | V5 | V6 | V7 | V8 | C1 | C2 | C3 | C4 |
|---|---|---|---|---|---|---|---|---|---|---|---|---|
| Using stored air, not braking | O | O | X | X | X | X | O | O | E | E | D | D |
| Using stored air, braking | O | O | X | X | O | O | O | X | E | E | E | D |
| Extended range driving, not braking | X | X | O | O | O | O | X | O | E | D | E | E |
| Extended range driving, braking | X | X | O | O | O | O | X | X | E | D | E | E |

During normal operation utilizing stored compressed air, the clutch 2 connecting the two expander cylinders is engaged. If the vehicle is not braking, the compressor drive clutch (shown dashed) is disengaged, and the valves V5 and V6 (shown dashed) are closed. Valve V3 (shown dashed) is closed, whether the vehicle is braking or not.

The high pressure air leaves the HP air store at point A, and flows to the secondary side inlet of the Stage 1 air heater at point B. The high pressure air is heated to a temperature, such as 700° C., and leaves the secondary side of the Stage 1 air heater at point C.

The air then flows to the inlet of the Stage 1 expander at point D. The air is expanded in the Stage 1 expander doing work on the piston and on the crank shaft.

The air at a reduced pressure and reduced temperature leaves the Stage 1 expander and flows to the secondary side inlet of the Stage 2 air heater at point G. The air is then reheated to about 700° C. in the Stage 2 air heater and leaves the secondary side of the Stage 2 air heater at point H.

The air then flows through the open valve V1 to the inlet of the Stage 2 expander at point J. A further expansion is performed in the Stage 2 expander and the air leaves the Stage 2 expander at point K.

This air then flows to the inlet of the Stage 2 burner at point L. Fuel is added to the burner, combustion occurs and the combustion products enter the primary side of the Stage 2 air heater at point M.

The combustion gases on the primary side of the Stage 2 air heater, transfer heat to the secondary side. The combustion gases then leave the Stage 2 air heater primary side at point N.

These combustion gases then enter the Stage 1 burner. More fuel is added, and the combustion gases are heated again to a temperature of about 750° C.

The combustion gases enter the primary side of the Stage 1 air heater at point O. Once again, heat is transferred to the secondary side of the heat exchanger and the combustion gases finally exhaust to the atmosphere at point P. This mode of operation is essentially the same as that illustrated in FIG. 23.

The mode of operation just described, provides mechanical power to the crankshaft. This power is transmitted to the drive wheels via clutch 1, which is normally engaged during motion.

If this clutch is disengaged, then the expansion system can continue running without the drive wheels turning. This is the same as a conventional vehicle powered by an internal combustion engine.

If, however, the clutch 1 is disengaged, it may be necessary to reduce to a low level, the air flowing into the Stage 1 expander. Otherwise, the engine will rapidly gain speed.

The function of the gear box in this system is similar to that of a conventional vehicle employing internal combustion. The gear box allows the expanders to run at a suitable speed depending on the required power, while the road wheels are turning at a speed depending on the linear velocity of the vehicle.

As in a conventional internal combustion engine, the required ratio of engine speed to road wheel speed, varies according to many factors. Examples of such factors can include but are not limited to whether the vehicle is going up or down hill, or whether the vehicle is accelerating or not.

The control of the fuel flow to the Stage 1 and 2 burners can mainly be determined by measurements of the air flow rate to the respective burners. However, there could also be temperature measurements and possibly other signals which might override the signal indicated by the air flow.

An objective of the fuel control system is to achieve a combustion gas temperature at the burner outlet, of about 750° C. and to achieve a compressed air temperature of about 700° C. The fuel flow will thus generally be proportional to the air flow.

During extended range motoring, the fuel flow to the Stage 2 burner may be shut off completely. This extended range mode of operation is used when the pressure of air in the HP air store has fallen to the point where no more air may be released.

In this situation the Stage 2 clutch is disengaged, and the valves V1, V2, and V7 are closed. Valves V3, V4, V5 and V6 are open. This allows the Stage 2 expander and its connected crank shaft to remain stationary, so that the vehicle is powered by the Stage 1 expander only.

In this mode of operation, the Stage 1 expander operates as a closed cycle system using air at a high pressure. This allows the use of a compact single-stage adiabatic compressor operating with a pressure ratio of about 3:1.

Operation during extended range driving is as follows. Cool air at about 16 bar is extracted from the LP air store at point Z, and flows through the open valve V5 to the inlet of the compressor at point W.

This air is compressed up to the pressure of HP air store (~50 bar) and exits the compressor at point X. The compressed air at a pressure of about 50 bar flows via the open valve V6 to the point Y. From the point Y, the compressed air flows to the secondary inlet of the stage 1 air heater at point B.

The air is heated to about 700° C. and leaves the secondary side of the Stage 1 air heater at point C. The air then flows to the inlet of the Stage 1 expander at point D.

It is noted that a reduction in the temperature may reduce efficiency, leading to higher air consumption and a higher fuel consumption. This is a double effect: the expander produces less power output, and the compressor requires more power input.

The hot compressed air is expanded doing work on the piston. The expanded air leaves the Stage 1 expander at point E at a temperature of about 400° C.

The expanded air then flows to the Stage 2 air heater at point G.

During extended range motoring, the Stage 2 air heater is operated as an air cooler, and no fuel is burned in the Stage 2 burner. Instead, a blower driven from the compressor drive gear blows a controlled flow of atmospheric air to the normal primary inlet of the Stage 2 air heater at S.

This cold atmospheric air cools the air at about 17 bar, which is exhausted from the Stage 1 expander and at the same time recovers heat from it. The atmospheric air is heated to about 300° C. in this process and it leaves the primary side of the Stage 2 air heater at point N.

This hot air at near atmospheric pressure then passes to the Stage 1 burner, where fuel is added heating the combustion gas to around 750° C. These hot gases provide the heat required from the high pressure (50 bar) passing through the Stage 1 air heater from point B to point C.

Meanwhile, cooled air at about 17 bar leaves the Stage 2 air heater at point H and flows to the junction I. From junction I, the air flows through the open valve V4 to the point U at the inlet of the cooler. This cooler is included because it is needed during regenerative braking (described later).

Moreover, the cooler can also perform a useful function during extended range driving. That is, the cooler can cool the air still further before it enters the LP air store at point T. It may prove advantageous that the air in the LP air store is cooled as much as possible, since this increases the output and efficiency of the system during extended range driving. The cooler may be cooled by natural or forced convection, either directly by atmospheric air or indirectly using a water cooling system connected to a radiator.

After leaving the cooler at about 16 bar, the air returns to the LP air store at point T. This air has therefore completed a closed circuit and has in the process generated a work output to the vehicle drive system. The circuit operates in a pressure range of about 16 to 50 bar, so it can be reasonably compact and still deliver a useful power output.

Clearly the output may be significantly less than that achieved by the system during normal operation consuming stored compressed air. However, the reduction in power output during extended range driving can be compensated for to some degree, by running the system at near maximum speed (i.e. by using a low gear on the gearbox).

Operation of embodiments in conjunction with regenerative braking is now discussed. While driving a conventional gasoline or diesel-powered vehicle, a driver often decelerates by partially lifting his/her foot on the accelerator pedal, without touching the brake pedal. This reduces the fuel flow in a diesel engine or fuel/air mixture in a gasoline engine.

Most of the kinetic energy of the vehicle is absorbed in friction within the engine and in pumping air through the engine. This process is referred to herein as "engine braking". Some kinetic energy is also absorbed in air resistance and the rolling resistance of the tires on the road.

Such engine braking can be particularly effective if the driver changes into a lower gear (recommended practice when the vehicle descends a long hill by avoiding over-heating of the brake pads/discs).

The change to a lower gear causes the engine speed to increase relative to the vehicle speed. The frictional torque of the engine is approximately constant at low engine speeds, becoming proportional to engine speed as the engine speed increases. Thus the frictional power dissipation is approximately linear with engine speed at low engine speeds, but varies approximately with the square of the engine speed when the engine speed is increased. Such engine braking can be a very effective method of reducing speed, particularly if the engine speed is relatively high.

The driver may also use the foot-brake, particularly if the vehicle is required to stop or reduce speed very suddenly. In this case, the vehicle's kinetic energy is absorbed by friction and generation of heat in the brake pads or brake discs. Both during engine braking and when the foot-brake is used, the excess kinetic energy of a conventional gasoline or diesel-powered vehicle is dissipated as heat, and is lost.

By contrast, according to embodiments the excess kinetic energy of the vehicle during engine-braking is recovered and stored in the form of compressed air. A conventional braking system using brake pads or discs could still be fitted for bringing the vehicle to a complete stop or for an emergency stop.

Operation of the regenerative braking system according to embodiments may be somewhat different depending on whether the vehicle is operating in the normal mode (i.e. consuming stored air) or in the extended range mode. The regenerative braking process in the extended range mode is now discussed.

Engine braking may be performed very simply by reducing or stopping the flow of air into the stage 1 expander. This could be done by adjusting the valves (which may be hydraulically controlled) on the inlet to the Stage 1 expander, so that little or no air is admitted to the cylinder.

The operation of the hydraulic valves could be controlled by the driver using an accelerator pedal. Thus from the perspective of the driver, engine braking according to embodiments would be similar to that of a conventional vehicle, with one difference being that the excess kinetic energy of the vehicle would be stored as compressed air and not simply dissipated.

A result of stopping/restricting the air flow into the Stage 1 expander, is that the compressor will continue to pump air from the LP air store into the HP air store. This increases the pressure difference available to the expansion process.

During an extended range driving cycle, the pressure difference between the HP and LP air store may vary depending on the setting of the inlet valve (e.g. hydraulic) on the Stage 1 expander. This in turn depends on the driver's foot position on the accelerator pedal and on the amount of regenerative braking.

A certain valve open duration of the (hydraulic) inlet valves may exist in which the difference in air pressures would remain constant. At lower valve open durations, the pressure difference will tend to increase. At higher valve open durations, the pressure difference will decrease.

The system may tolerate an imbalance for a certain time. If the imbalance persists, however, the pressure difference could become too large or too small and some form of corrective action will be needed.

The driver can avoid the pressure difference going outside acceptable limits, by moderate use of the accelerator pedal, and using the gears and changes in engine speed in order to achieve a reasonable balance over time, while still delivering the required engine power. Conversely control of the pressure difference during extended range driving could be performed automatically, so that the driver would not have to be concerned about the pressure difference.

For example, if the pressure difference becomes too low and the driver demands more power, the automatic system would change to a lower gear. If the pressure difference becomes too large, the automatic system may change to a higher gear, or possibly take another action such as reducing the temperature of the air supplied to the Stage 1 expander by reducing the fuel flow to the Stage 1 burner.

It may be desirable to include a valve V8 in the high pressure line between point Y (near the secondary side inlet to the Stage 1 air heater) and point D (on the inlet to the Stage 1 expander). This additional valve could be used to first throttle, and then shut off, the air flow to the stage 1 expander. Thus the maximum braking effect could be applied by the engine.

If such a valve is fitted, then the accelerator pedal could still allow some air flow to the expansion system even if it is not depressed at all. This would allow the engine to keep running at tick-over speed if the driver removes his/her foot from the pedal.

The valve V8 could be operated by the driver putting his/her foot on the brake pedal with light pressure. Further depression of the brake pedal could then activate the conventional non-regenerative brake disc/pad system, if more rapid braking was needed.

Action of the regenerative braking system during normal driving (consuming stored air) is now described. Specifically, as the driver takes her foot off the accelerator pedal, the hydraulic air inlet valves on the Stage 1 expander progressively reduce the air flow rate to the expander.

When the driver puts her foot on the brake with light to moderate pressure, valve V8 is closed, shutting off air flow to the expansion system. Clutch C3 is engaged, and the valves V5 and V6 are opened.

This causes the compressor to pump air from the LP air store into the HP air pressure line at Y. This action reduces the pressure in the LP air store and increases the pressure in the HP air store.

Once the braking action stops air flow through the Stage 1 expander resumes. The pressure in the LP air store recovers to the pressure at the outlet of the Stage 1 expander.

As with the extended range mode of operation, if the driver depresses the brake pedal further the conventional brake disc/pad system may be activated in addition to the engine braking system.

In addition to achieving economical performance at the nominal maximum power, an engine is desirably efficient at low power as well. This is because a motor vehicle may spend most of its time with the engine running at a power output that is well below the maximum. The overall performance (kWh per liter of fuel, or kWh per kilogram of stored air) may thus depend on the efficiency over a wide range of power outputs.

Calculations were performed using the model for a 2-stage reciprocating expansion system able to produce a mechanical power of 50 kW at source pressures between 200-50 bar. To achieve this performance, the system summarized by the data given in Table 12 and Table 13 (respectively below) were considered.

| Stage | 1 | 2 |
|---|---|---|
| Cylinder bore* (mm) | 53.00 | 106.00 |
| Number of cylinders* | 1 | 3 |
| Piston stroke* (mm) | 60 | 60 |
| Heat exchr secondary pressure loss* (%) | 3% | 3% |
| Combustion gas temp at HX inlet* (° C.) | 750 | 750 |
| Air temp at cylinder inlet valve* (° C.) | 700 | 700 |
| Ratio L/R* | 4.3 | 4.3 |
| Residual volume* | 0.02 | 0.02 |
| Burner pressure loss* (%) | 4% | 4% |
| Heat exchr primary pressure loss* (%) | 3% | 3% |
| Design maximum cylinder pressure* | 200 | 37.16 |
| Pressure at HX secondary inlet (bar) | 90 | 15.34 |
| Air pressure at cylinder inlet valve (bar) | 87 | 14.88 |
| Cylinder air exhaust pressure (bar abs) | 15.34 | 1.176 |
| Burner exit gas pressure (bar) | 1.052 | 1.129 |
| Burner inlet gas pressure (bar) | 1.095 | 1.176 |

| Valves | Inlet | Exhaust | Inlet | Exhaust |
|---|---|---|---|---|
| Diameter of valve port, mm | 11.66 | 11.66 | 23.32 | 23.32 |
| Number of valves/cylinder* | 2 | 2 | 2 | 2 |
| Diameter ratio of valve port to cylinder bore* | 0.22 | 0.22 | 0.22 | 0.22 |
| Valve open period* (CA°) | 95.332 | 188 | 68.8 | 180 |
| Valve opens at CA°* | 0 | 170 | −3 | 170 |
| Valve lift* (mm) | 3.1 | 3.1 | 5.2 | 6.2 |
| Valve seat angle to vertical* (°) | 45 | 45 | 45 | 45 |
| Valve discharge coefficient* | 0.7 | 0.7 | 0.7 | 0.7 |
| Hydraulic (HY) or roller (RC) cam followers* | HY | RC | RC | RC |
| Max design speed for valves* (rpm) | 2400 | | 2400 | |
| Multiplier for Woschni equation* | 1.7 | | 1.7 | |
| Cylinder head surface temp* (° C.) | 500 | | 500 | |
| Piston surface temp* (° C.) | 500 | | 500 | |
| Liner surface temp* (° C.) | 150 | | 150 | |

This is the same system as illustrated diagrammatically in FIG. 23. Values shown with an asterisk in the Tables 12-13 are input data to the model. The remaining values are calculated from the input data supplied by the user.

Figure 25:
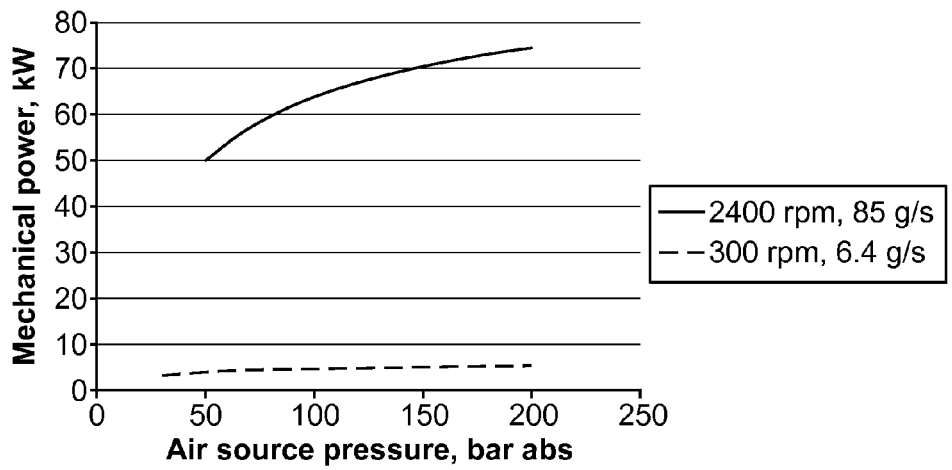
FIG. 25 plots variation of mechanical power with air source pressure at two fixed speeds and fixed air mass flows.

Using the expansion system shown in FIG. 23 and summarized in Table 12 and Table 13, two series of calculations were performed. In the first series, the rotational speed was held constant at 2400 rpm and the air mass flow was kept constant at 85 grams/second while the air source pressure was varied between 200 bar and about 50 bar. The air mass flow was controlled by adjusting the closing time of the hydraulic air inlet valves on the Stage 1 expander. FIG. 25 shows the resulting variation in the mechanical power output.

A second series of calculations was then performed in which the rotational speed was reduced to 300 rpm and the air mass flow was reduced to 6.4 grams/second. The speed of 300 rpm was chosen since it could possibly be regarded as a minimum practical speed for the system. This might be a suitable minimum speed for a small conventional engine, since such an engine could mis-fire or fail to complete the compression stroke in a 4-stroke cycle. However, the type of expansion system considered here does not have a compression stroke (except when operating in "extended range" mode), so it would be much less likely to stop. It is seen that the power output of the expansion system can be reduced to about 5 kW, by adjusting the speed and the air flow accordingly.

Figure 26:
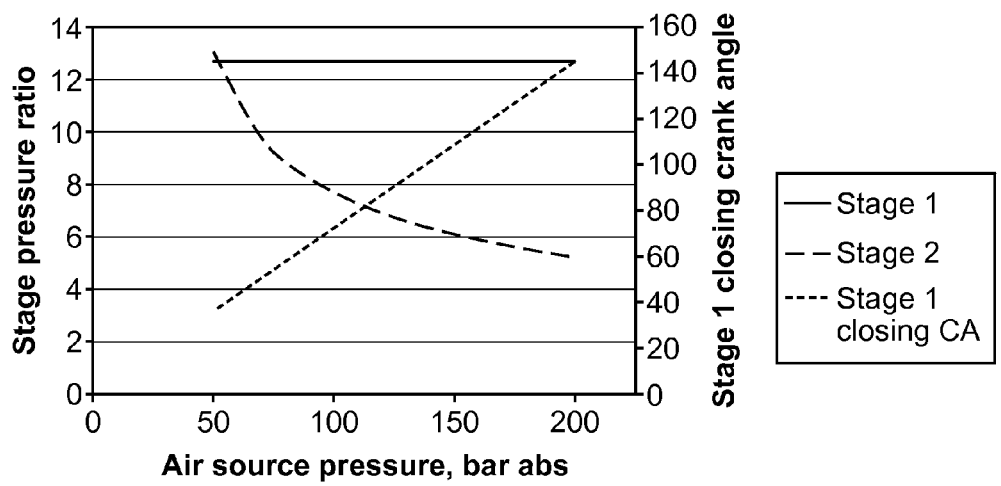
FIG. 26 plots variation in stage pressure ratios and closing crank-angle of the Stage 1 inlet valves at 2400 rpm.
Figure 27:
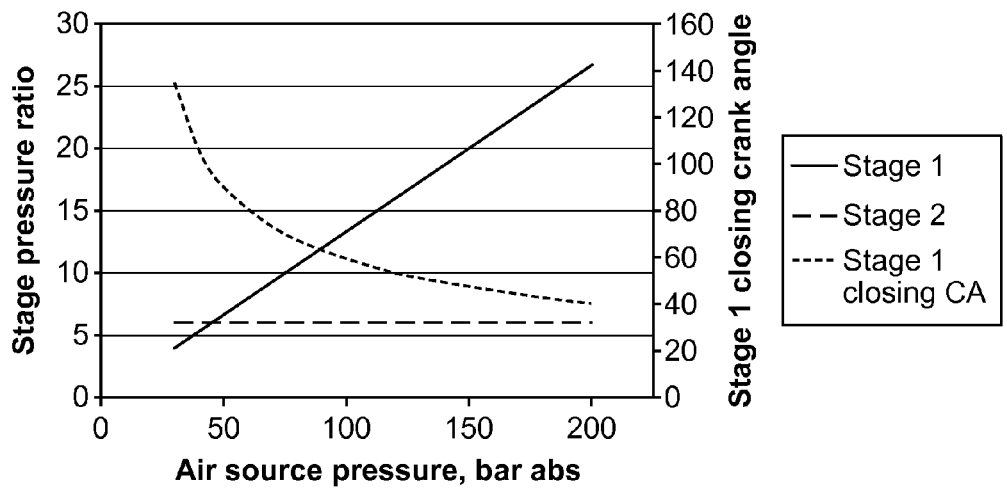
FIG. 27 plots variation in stage pressure ratios and closing crank-angle of the Stage 1 inlet valves at 300 rpm.

FIG. 26 and FIG. 27 show the variation in the stage pressure ratios and the closing crank-angle of the Stage 1 air inlet valve for the expansion system operating at 2400 rpm and 300 rpm, respectively. The pressure ratio of Stage 1 varies linearly with air source pressure in both cases, while the pressure ratio of Stage 2 is constant in both cases. The pressure ratio in Stage 2 stays constant, because the opening and closing crank-angles of the Stage 2 expander inlet valves is fixed by the shape and angular position of the cam, which is assumed to be fixed.

The closing crank-angle of the Stage 1 inlet valves shown in FIG. 26, is ~60° at 200 bar air source pressure. By contrast the corresponding value in FIG. 27 is about ~40°. This is because a low power output is sought in FIG. 27, whereas high power output is sought in FIG. 26.

It is also seen that the maximum Stage 1 inlet valve closing angle is about 140° in both cases. This is near to the maximum closing angle that can be achieved, without overlapping the opening of the inlet and exhaust valves and thereby bypassing air directly from the inlet to the exhaust.

It is also noted that this limiting value of the closing crank-angle occurs when the source pressure is 50 bar in FIG. 26, but the same limit is not reached until the source pressure falls to 30 bar in the case of FIG. 27. Thus while it may prove possible to operate this particular embodiment at lower source pressures than 50 bar, it would not be possible to maintain the minimum target output of 50 kW below 50 bar source pressure.

Figure 28:
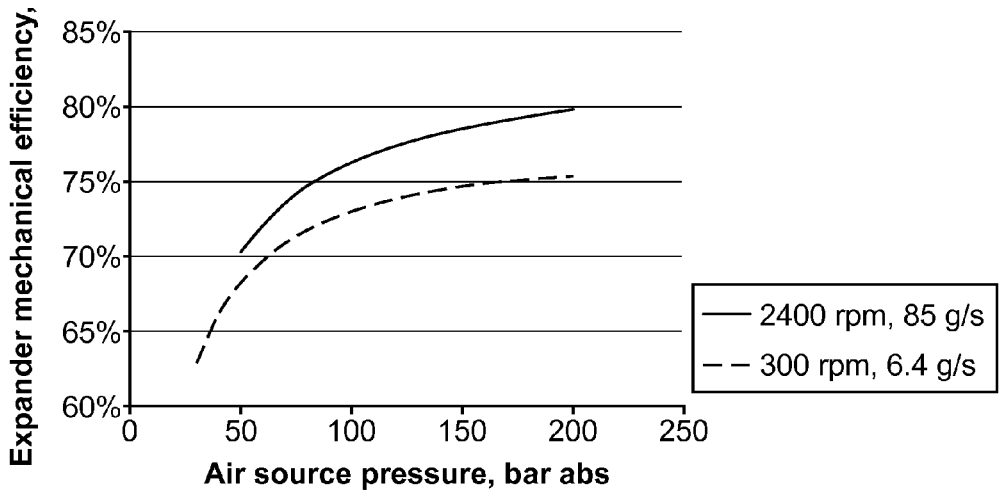
FIG. 28 plots expansion system mechanical efficiency at constant speed and air flow.

FIG. 28 shows that the expansion system mechanical efficiency (with respect to fuel LHV thermal input) is maintained over a wide range of source pressure, engine speed, and air mass flow. This efficiency does not fall below 60% at any point of the considered range of operation. Indeed, the efficiency is above 70% for nearly all of the envisaged conditions.

Here, the energy output ratio is defined as the energy output of the expansion system divided by the energy input of a quasi-isothermal compressor. The quasi-isothermal compressor is assumed to operate with an efficiency of 85% relative to that of an ideal isothermal compressor.

For the purpose of the instant embodiments, the mechanical energy output of the expansion system is used as there is no generator. The energy output ratio is a useful measure of the efficiency of the system relative to the consumption of air as opposed to consumption of fuel.

Figure 29:
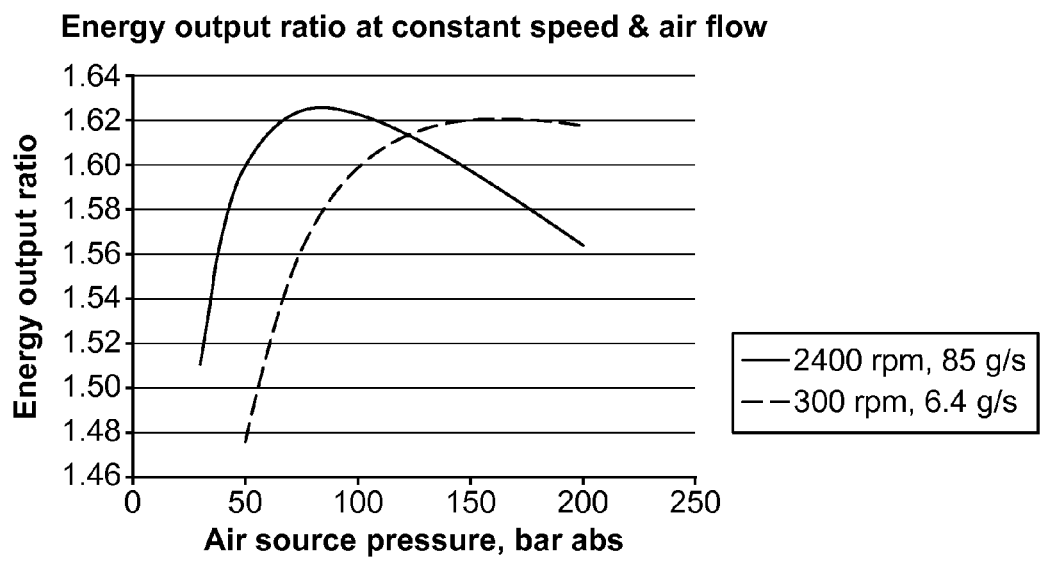
FIG. 29 plots energy output ratio at constant speed and air flow.

As with some schemes involving a heated expansion system, the energy output is more than the energy input, so the ratio is above unity. In the case of a quasi-isothermal expansion system operating with heat supplied at ambient temperature, the energy output ratio would probably be 0.7 or less. FIG. 29 shows energy output ratio is generally close to 1.6 over most of the range of interest, and does not drop below 1.46 anywhere in this range.

The overall cycle efficiency shows the net mechanical power output (allowing for compression work) as a ratio with the fuel input.

Figure 30:
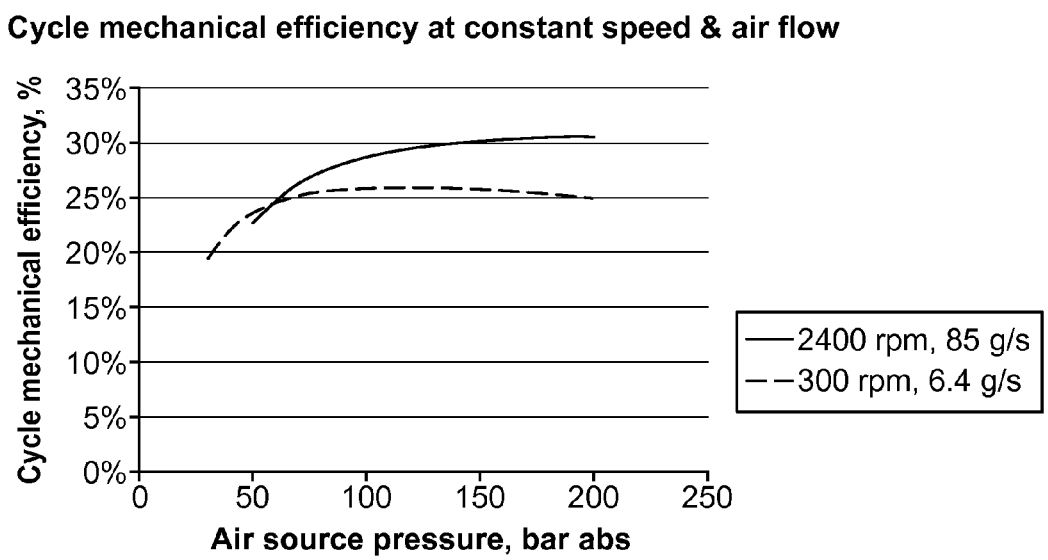
FIG. 30 plots cycle mechanical efficiency at constant speed and air flow.

FIG. 30 shows that the cycle efficiency is between 25% and 30% over most of the range of interest. However, it can drop to about 20% at low air source pressure.

Integrated performance over a complete storage and recovery cycle is now discussed. A calculation was performed for the same 2-stage expansion system as described above, operating over a complete energy storage and recovery cycle from 200-50 bar.

The power output was held constant at 50 kW over the whole cycle. While possibly not typical of a road vehicle (where power demand may vary considerably and would be less than 50 kW for much of the time), it has been seen that efficiencies both regard to air consumption and fuel consumption do not vary much over a wide range of power output.

For the purpose of this calculation, it has been assumed that the total required energy output is 25 kWh. This is derived from typical capacity ratings of electric vehicles batteries claiming a range of 100 km. This figure reflects total power requirements, not only as mechanical energy transmitted to the drivetrain, but also as electrical energy to power the car electrical and climate control systems. This figure also includes the non-usable battery capacity since most electric vehicles include battery management systems that limit the degree of discharge of the batteries to approximately 20% of the total battery capacity. For at least this latter reason, 25 kWh represents conservative figure for the total energy output if the same vehicle was powered by a hybrid air fuel engine as described herein.

Using this target figure, the volume of the air tank is calculated. Table 14 shows integrated performance of the 2-stage expansion system running at constant power of 50 kW

| | |
|---|---|
| Volume of air tank (liters) | 700 |
| Air tank maximum pressure, bar abs | 200 |
| Air tank minimum pressure, bar abs | 50 |
| LHV calorific value of fuel at 15C (MJ/kg) | 42.9 |
| Fuel density at 1 atm and 15.6° C. (kg/m3) | 840 |
| Average air mass flow rate (kg/s) | 0.0648 |
| Mass of air consumed (kg) | 115 |
| Electrical energy consumed (kWh) | 15 |
| Total energy generated (kWh) | 25 |
| Energy output ratio | 1.612 |
| Total time of generation (hrs) | 0.49 |
| Total fuel consumed (kg) | 2.7 |
| Total fuel consumed (liters) | 3.2 |
| Average power output (kW) | 50.4 |
| Thermal energy input as fuel (kWh) (LHV) | 32 |
| Ave expansion system efficiency (%) | 77.3 |
| Ave cycle efficiency including compression (%) | 29.3 |

As shown in Table 14, it is found that a volume of 700 liters is required. This results in a mileage of about 73 miles per gallon (i.e. more than double the mileage of conventional gas powered automobiles). Assuming that the electricity to charge up the air tanks is produced from renewables, this indicates that carbon emissions can be reduced by 50% or more when the vehicle is in compressed air mode. With a fuel cost of $4/gal and an electricity cost of $0.15/kWh, the compressed air vehicle car would achieve savings of more than 40% on the cost of energy as compared with a conventional automobile having a mileage of 25 mpg.

The volume of fuel required was 3.2 liters. These values do not take into account potential contribution of regenerative braking. It has been estimated that about 50% of the mechanical energy transmitted to the drivetrain could be recovered in an urban driving cycle, resulting in the reduction of the air tank and the cost of energy by 25% if it is assumed that the power to the drivetrain represents about 50% of the total power generated by the engine, the rest being parasitic losses and auxiliary systems.

Table 14 also shows that averaged over the cycle, the expansion system efficiency is 77%, the energy output ratio is 1.6, and the average cycle efficiency is 29.3%. These values are consistent with FIG. 28, FIG. 29 and FIG. 30.

It is noted that the predicted expansion energy density is 35.7 kWh/m3. As compared with a larger 3-stage 250 kW expansion system, the result in this case was only slightly higher at 38.0 kWh/m3.

It is also possible to make an approximate comparison with the expansion energy density for the case of a much larger 3-stage expansion system comprising two (2) high pressure air turbines, and a modified conventional gas turbine acting as the low pressure stage. Such a configuration is described in U.S. patent application Ser. No. 13/645,327, which is incorporated by reference in its entirety herein for all purposes. This has the advantage of introducing internal combustion into the system, which allows much higher temperatures during expansion.

It was found that the typical energy output ratio was about 2.3 compared to the average of 1.61 for the externally heated system considered in the present report. The corresponding expansion system energy density may be expected to be in proportion to the energy output ratio, giving an estimated value of 51 kWh/m3.

If this energy density could be achieved by a small reciprocating system utilizing internal combustion, then an expansion system with an output of 25 kWh would imply an air tank of just under 500 liters.

While the above description has focused upon systems utilizing external combustion exclusively, alternative embodiments could employ internal combustion alone or in combination therewith. An advantage of such use of internal combustion, is that it is possible to heat the working fluid to a much higher temperature prior to expansion, since heat no longer has to be transmitted through a solid surface.

An incentive to strive for a high temperature at the start of the expansion, is the fact that the thermodynamic efficiency is strongly affected by the average temperature of heat addition to the cycle.

Materials suitable for a heat transfer surface at high temperatures become more and more expensive as the temperature increases. When the heat transfer surface temperature reaches about 800° C., effectively no available materials have the properties of strength, flexibility, and resistance to thermal fatigue that are called for. For this reason, the maximum temperature of the externally heated air system discussed above was taken as 700° C.

By contrast, internal combustion systems can operate with maximum gas temperatures of 1500-2000° C. Issues may arise in cooling the materials used, but these problems are dealt with by maintaining the solid materials of the system at much lower temperatures than the maximum gas temperature.

For example, gas turbine blades are cooled by allowing compressed air to flow along the insides of the blades, and then out through many small holes into the main gas stream. Reciprocating diesel and gasoline engines are intensively cooled by water flowing through passages in the cylinder wall and in the cylinder head. Pistons may be cooled by an internal oil shaker system.

An internal combustion system according to embodiments may differ from the isoengine discussed previously, in at least three respects. First, the internal combustion expansion system proposed here operates on a 4-stroke cycle rather than a 2-stroke cycle.

Secondly, an expansion system according to embodiments may incorporate a 2-way valve in the exhaust pipework. This 2-way valve diverts flow to/from an exhaust gas cooler, during part of the 4-stroke cycle. Alternatively, instead of using an exhaust gas cooler, the 2-way valve may be used to draw in and then expel cool atmospheric air.

Thirdly, an expansion system according to an embodiment may involve at least 2-stages of expansion. Internal combustion can be performed in just one of these stages, or internal combustion can be applied in more than one stage. The various options are described below.

Figure 31:
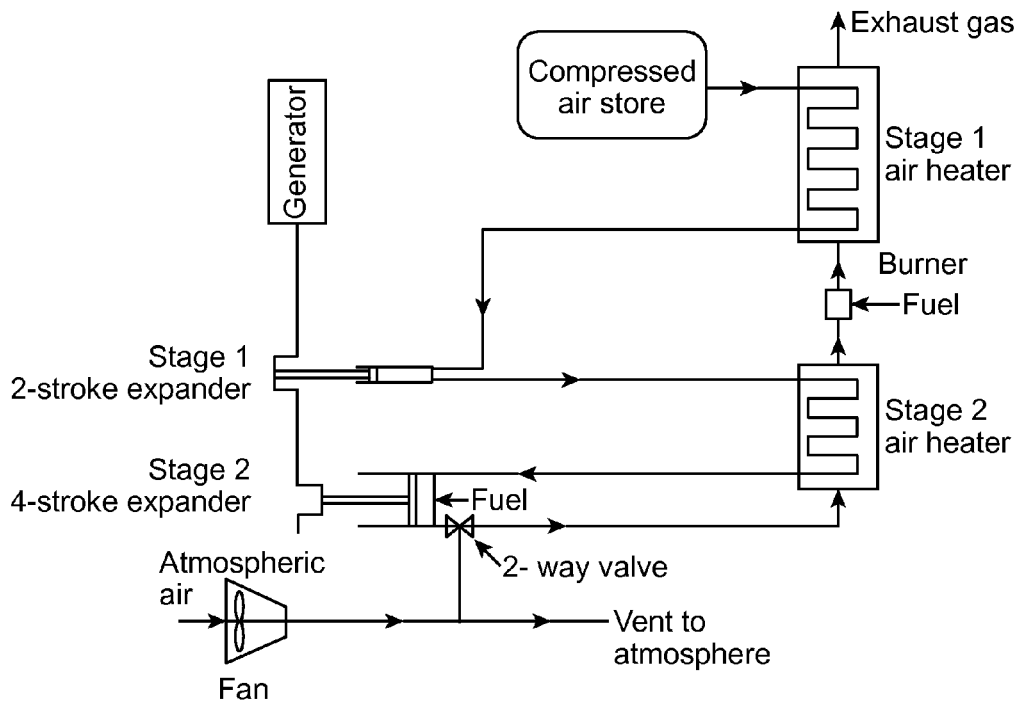
FIG. 31 is a simplified view of a 2-stage expansion system with a 4-stroke internal combustion expander at the low pressure stage and a 2-stroke external combustion expander at the high pressure stage.

FIG. 31 shows a 2-stage expansion system in which the low pressure stage is heated with internal combustion. In comparing FIG. 31 with FIG. 23, it is seen that there is no Stage 2 burner in FIG. 31, since the function of the burner has been replaced by the combustion of fuel injected directly into the cylinder of the Stage 2 expander.

Moreover, a 2-way valve has also been incorporated into the exhaust pipework. The 2-way valve is used to draw in, and then expel, cool atmospheric air.

The 2-way valve changes the direction of flow twice in every cycle (twice in every two engine revolutions). Since the direction of the gas flow is reversing in this part of the pipework, the distances are kept short. Thus the 2-way valve may be mounted directly onto the cylinder head or integrated with it.

Figure 32:
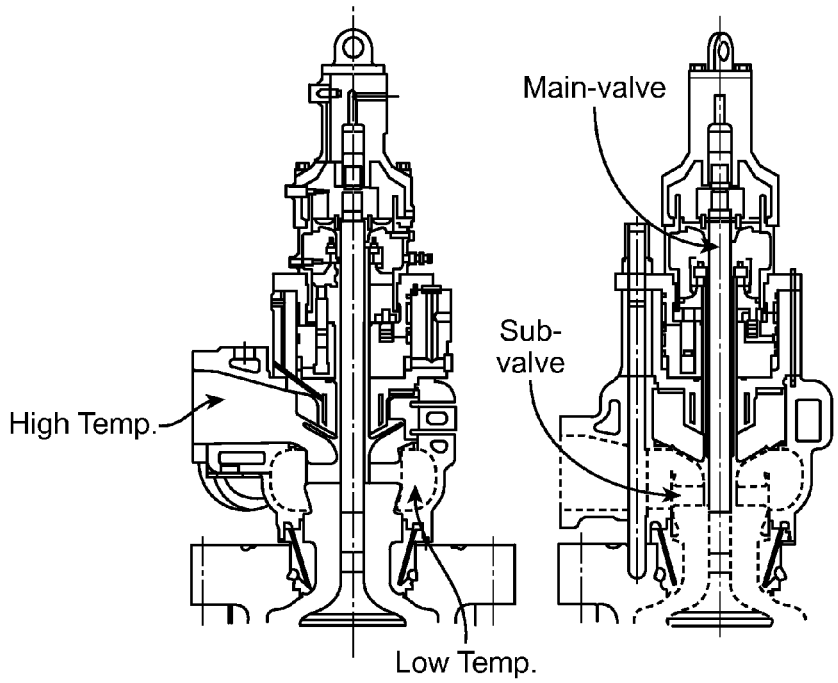
FIG. 32 shows a simplified view of an exhaust gas separation valve.

A similar type of valve has already been applied for a rather different purpose to a diesel engine by Takahashi et al., "Study of Exhaust Gas Separation System (EGS) System on 2-stroke Engine", *CIMAC Congress* Bergen, Norway (2010), a copy of which is incorporated by reference herein for all purposes. FIG. 32 shows two cross-sections of this valve assembly. It is seen that the 2-way valve is close to the main exhaust valve controlling the flow into and out of the cylinder.

The purpose of this 2-way valve was to separate the high temperature combustion gases containing relatively high concentrations of NOx exhausted immediately after the exhaust valve opens, from the cooler scavenging air coming from the inlet ports in the lower part of the cylinder wall.

The separation of these gases is advantageous to the diesel engine from the point of view of exhaust gas treatment to remove NOx. The separation of these gases is also advantageous to the diesel engine from the point of view of recovery of heat, since the high temperature component of the exhaust gases can be used more effectively if it is not diluted and mixed with the scavenging air.

As employed in embodiments as described herein, the two positions of the 2-way valve may be described as follows. In first position, when the cylinder exhaust valve is open and the piston is advancing in the cylinder during the exhaust stroke, the 2-way valve allows exhaust gas to flow from the cylinder exhaust valve to the Stage 2 air heater in FIG. 31.

In a second position, when the cylinder exhaust valve is open and the piston is receding following the exhaust stroke, the 2-way valve allows cool air or cooled exhaust gas to be drawn into the cylinder. Then, when the piston is advancing again during the following stroke, the 2-way valve allows the cool air or cooled exhaust gas, to return to its source.

The following Table 15 summarizes the sequence of valve events during a 720° rotation of the crankshaft, which corresponds to the 4-stroke cycle.

| Approx. CA | Event |
| --- | --- |
| 0° | Air inlet valve opens, fuel injection begins |
| 45° | Air inlet valve closes, fuel injection ends |
| 170° | Exhaust valve opens, 2-way valve sends gas to exhaust system |
| 360° | 2-way valve switches and connects to the cool air/gas system and starts to draw in cool air/exhaust gas |
| 540° | Cooling air/gas starts to be expelled from the cylinder and returned to its source |
| 675° | Exhaust valve closes, 2-way valve switches to the exhaust system |
| 720° | Air inlet valve opens, fuel injection begins |

Figure 33:
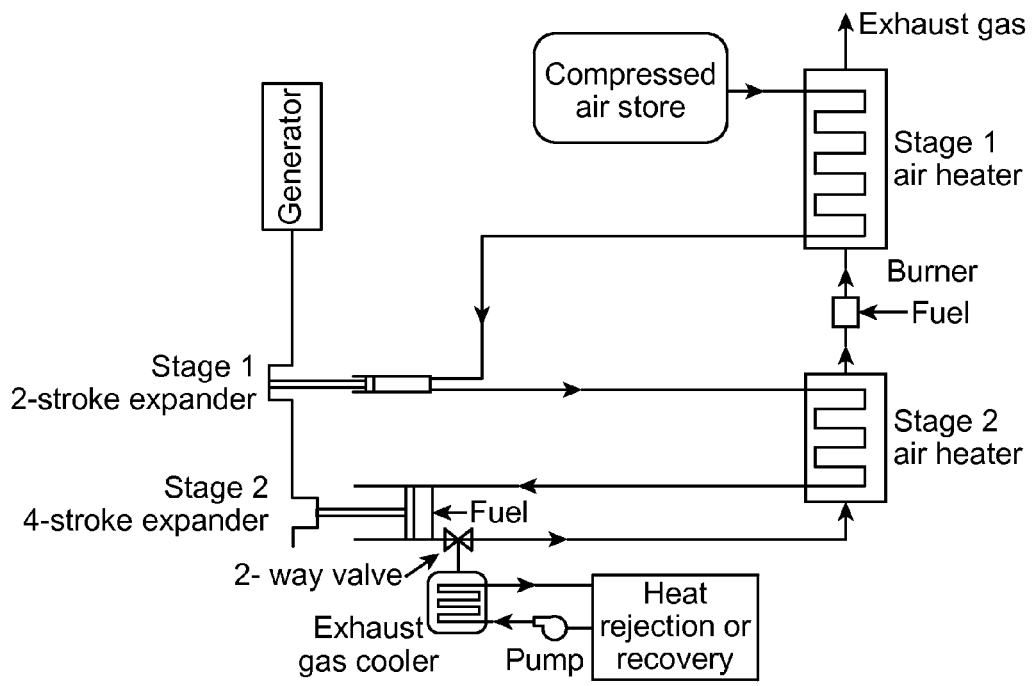
FIG. 33 shows a two stage expansion system with internal combustion in the low pressure stage and cooling using an exhaust gas cooler.

FIG. 33 shows a variation on the system shown in FIG. 31, but using an exhaust gas cooler in place of the cooling by atmospheric air. In this case, some of the exhaust gas is trapped inside the exhaust gas cooler, where it is cooled by a pumped circuit as shown.

The pumped circuit could be connected to a separate cooling tower or to the conventional water cooling circuit that would be used to cool the cylinders and cylinder heads of the expanders. Alternatively, the pumped cooling circuit could contain organic fluid which might be used for heat recovery in an organic Rankine cycle.

It may be convenient to include a small bleed line between the exhaust gas cooler and the main exhaust pipework in order to maintain similar average pressures in the two components. However this may not be necessary, since the average pressures would probably equalize naturally due to small amounts of leakage through the 2-way valve.

Clearly, when the piston is drawing gas from the exhaust gas cooler, the pressure in the cooler will drop and then rise again when the piston pushes the cooling gas back to the cooler. To avoid too large a variation in pressure it may be desirable that the volume of gas in the exhaust gas cooler, is significantly more than the volume of the cylinder.

FIG. 33 shows only one cylinder in each expansion system stage. Usually, there would be multiple cylinders in the low pressure stage and maybe in the high pressure stage as well. In this case, it would be necessary to have a separate 2-way valve for each cylinder, but the exhaust gas cooler could be shared between cylinders operating under the same pressure conditions.

Figure 34:
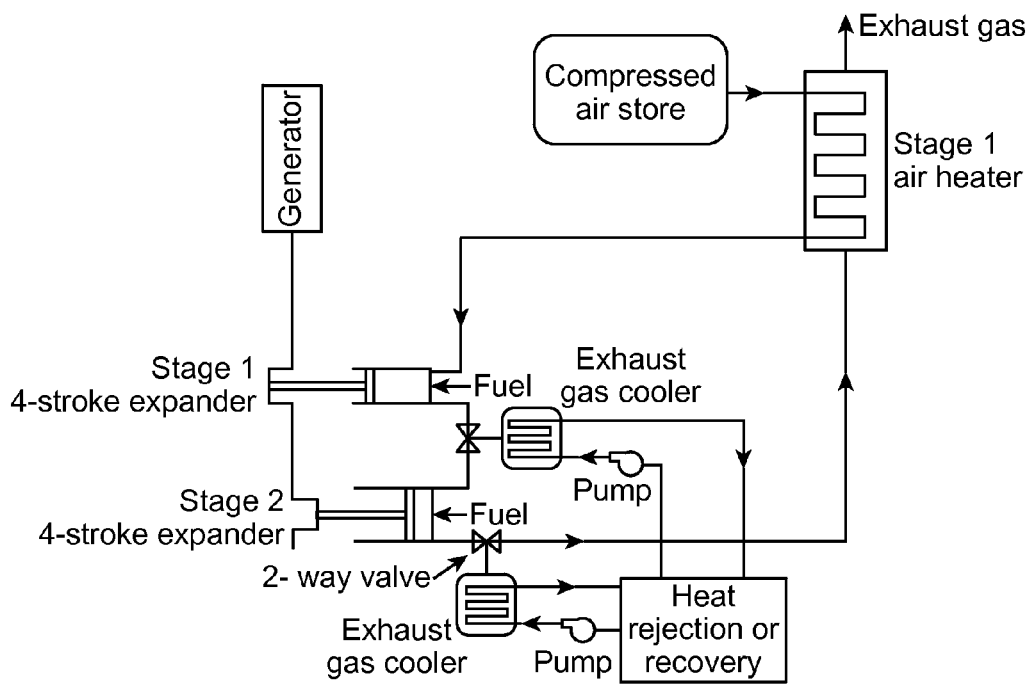
FIG. 34 shows a 2-stage expansion system with 4-stroke internal combustion expanders in both stages.

FIG. 34 shows a 2-stage expansion system with 4-stroke internal combustion expanders in both stages. There is no Stage 2 air heater in this system, since the exhaust gas from the Stage 1 expander flows directly to the inlet valves of the stage 2 expander.

Also there are no external burners. This is because the inlet air for the Stage 1 expander is heated by the exhaust gas from the Stage 2 expander.

FIG. 34 also shows a 2-way valve at the exhaust of the Stage 1 expander in addition to the 2-way valve at the exhaust of the Stage 2 expander. There is a separate exhaust gas cooler for each expansion stage, because of the pressure difference.

The achievement of good combustion in an internal combustion engine calls for a certain amount of development and optimization. In the case of an expander fed by hot compressed air with simultaneous injection of fuel, it may be important to ensure that the air or gas containing unused air, should be hot enough to evaporate the fuel (if it is a liquid) and to achieve fast ignition.

Proper mixing of the air and the fuel may also be important. Care may be taken under conditions of low air flow rate, where heat losses in the air pipework can cause the air or gas temperature to fall below the level needed for fast evaporation and combustion.

Another consideration is that the gases should not become so hot during combustion that too much NOx is formed.

Several concepts may arise in the design of a vehicle configured to run on compressed air from a compressed air store. For example, in certain embodiments the outside shell or skin of the vehicle may be configured to act as a heat exchanger, for example contributing ambient temperature heat where expansion of the compressed gas has the tendency to lower the temperature below ambient. Such a heat exchanger could be designed utilizing a flow of a working fluid through the vehicle shell.

It is further noted that changes in gas temperature arising from compression and/or expansion of gas, can be utilized for vehicle functions. For example, a rise in gas temperature as a result of compression, can be used for vehicle cabin heating.

Conversely, a fall in gas temperature as a result of expansion, can be used for vehicle cabin cooling, or even refrigeration (as in a camper etc.)

Other concepts relevant to vehicular applications may involve the manner of storage and replenishment of the compressed gas. For example, in certain embodiments the compressed gas may be stored in various compartments forming part of the vehicle frame.

Figure 35:
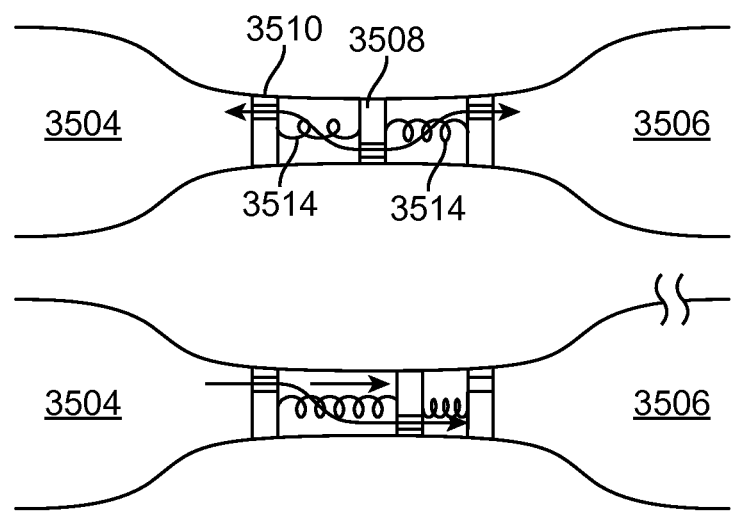
FIG. 35 shows a simplified view of an embodiment of an air fuse.

Moreover, safety in the event of a catastrophic failure (burst, leakage) of one of these compartments, may be ensured by providing an air fuse structure between them. FIG. 35 shows a simplified view of an embodiment of such an air fuse.

In particular, the air fuse 3500 is positioned at connecting joint 3502 between two compartments 3504 and 3506. The air fuse comprise a first perforated plate 3508 maintained between second and third perforated plates 3510 and 3512, respectively, by biasing members 3514 (e.g. springs).

In normal use, the upper view of FIG. 35 shows that compressed gas is free to flow between the compartments through the plates.

Upon a failure event affecting one compartment (here 3506), however, FIG. 35 shows that the pressure differential will bias the first plate in the right hand direction against the third plate. The resulting non-alignment between the perforations blocks any movement of gas, maintaining the integrity of the gas in the remaining compartment.

Another concept possibly arising in connection with the storage of compressed gas in vehicles, is the need for ongoing refill of the tank. In particular, the forcing of compressed gas (e.g. from a compressor or tank) into an empty storage tank, will create inefficiencies related to heating of the gas.

In order to avoid this, prior to refilling the tank with gas, a liquid is inserted to occupy space within the tank and thereby raise the pressure of the remaining gas to the storage pressure. Then as gas is pumped into the tank, liquid is removed. In this manner, the gas does not experience a dramatic change in pressure. Such a "pipe in" approach is analogous to a "plug in" commonly referenced in the recharging of electrical hybrid type vehicles.

Figure 36A:
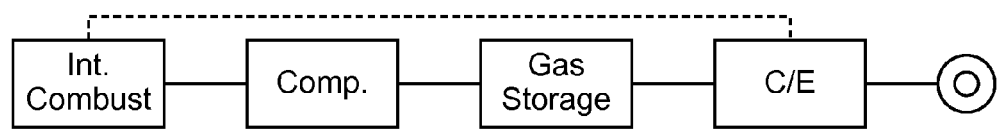
FIGS. 36A and 36B show different configurations of a hybrid vehicle utilizing compressed gas and internal combustion.
Figure 36B:
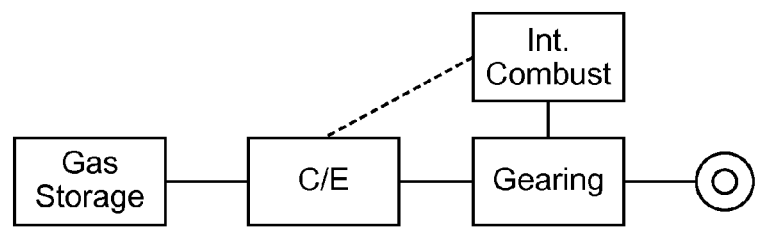

FIGS. 36A and 36B show different configurations of a hybrid vehicle utilizing compressed gas and internal combustion. In the "serial" configuration of FIG. 36A, the internal combustion is in mechanical communication with a compressor (C) that provides compressed air to the storage tank. This compressed gas may be released to drive a compressor/expander as an expander that turns the vehicle wheels, with a thermal linkage (dashed) providing additional energy. During braking, the wheels drive the compressor/expander as compressor to refill the tank. This embodiment offers the benefits of relatively simple structure.

In the "parallel" configuration of FIG. 36B, the internal combustion is in mechanical communication with the wheels through gearing (e.g. a multi-node gearing system). That gearing is also in communication with a compressor/expander in fluid communication with the gas storage. Release of gas from the gas storage unit serves to drive compressor/expander to operate as an expander, providing further power to the wheels through the gearing. During braking, the wheels and the internal combustion may drive the compressor/expander as a compressor to refill the tank. This embodiment offers the benefit of reducing the need to convert power between different forms (e.g. mechanical power from the internal combustion may be channeled directly to the wheels, rather than being required to be converted to compressed gas first).

Finally, it is noted that certain embodiments of an engine utilizing internal combustion and compressed gas, may experience six cycles of operation. Specifically, the four cycles of an internal combustion engine featuring a low pressure (LP) side valve and a high pressure (HP) valve, may comprise:
1. intake of air with fuel (LP valve open, HP valve closed);
2. compression of air and fuel (LP valve closed; HP valve closed);
3. combustion and expansion (LP valve closed; HP valve closed); and
4. exhaust (LP valve closed; HP valve open).

According to embodiments, these four strokes may be supplemented with an additional two strokes. In particular, compression may utilize:
1. intake of air w/o fuel; (LP valve open, HP valve closed); and
2. compression (LP valve closed, HP valve closed then open).

Expansion may utilize:
1. intake of high pressure air and expansion (LP valve closed, HP valve open); and
2. exhaust (LP valve open, HP valve closed).

During compression and expansion phases, no fuel is injected or mixed with the incoming air, and no spark is applied to any sparkplugs that are in the engine. This arrangement allows for a single mechanical device to function alternately as an internal combustion engine, a compressor, and an expander.

In vehicular application as well as other applications, these operating modes can be switched from one to another on a cycle-by-cycle basis utilizing instructions communicated from a controller. In this manner, the vehicle can be powered from fuel, can store braking energy as compressed gas in a tank, or can recover that stored energy by powering the car using the compressed gas.

Figure 37:
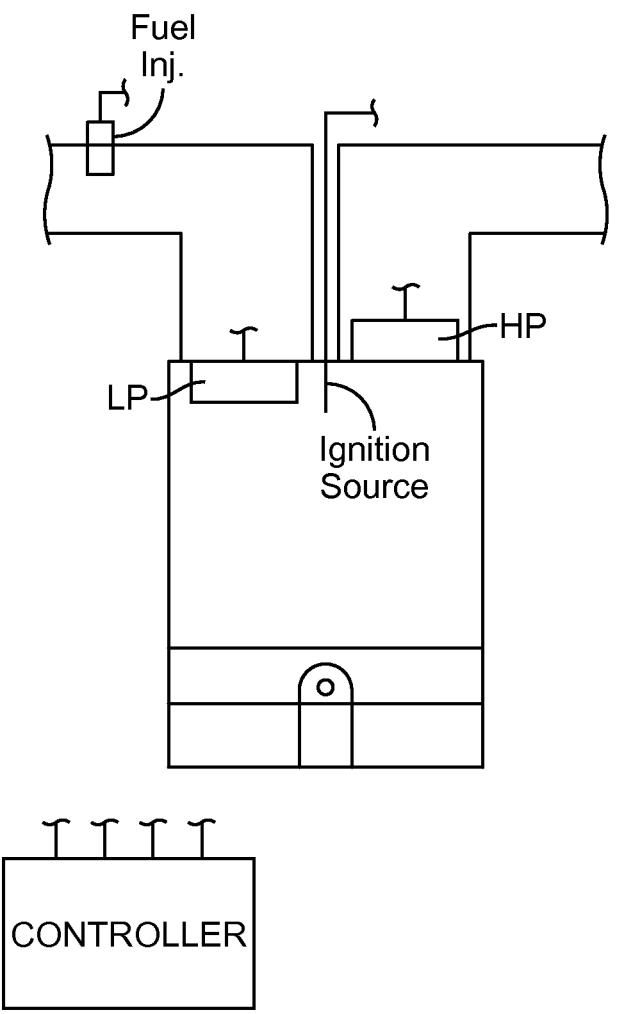
FIG. 37 shows a reciprocating cylinder configurable between different cycles.

FIG. 37 shows a reciprocating cylinder configurable between different phases. In particular, the low pressure valve, the high pressure valve, the fuel injector, and the ignition source are all in electronic communication with a controller to determine the operational configuration of the apparatus.

While the specific embodiment mentioned above relates to a cylinder configurable to operate according to six (6) possible total cycles, this specific number is not required. According to particular embodiments, signals from a controller could be employed to control various components to augment a 6-cycle engine to n cycles, where other cycles having different configurations could be added.

1. An apparatus comprising:
a cylinder receiving a reciprocating piston in communication with a crankshaft;
a first valve in fluid communication with a low pressure side;
a second valve in fluid communication with a high pressure side;
a fuel source in communication with the cylinder;
an ignition source within the cylinder; and
a controller configured to coordinate operation of the first valve, the second valve, the fuel source, and the ignition source between the following modes,
four stroke internal combustion comprising intake, compression, combustion, and exhaust,
two stroke compression comprising intake and compression, and
two stroke expansion comprising expansion and exhaust.

2. An apparatus as in claim 1 wherein during two stroke compression, the piston is configured to be driven by a drivetrain of a moving vehicle.

3. An apparatus as in claim 1 wherein during four stroke internal combustion, the piston is configured to drive a drivetrain of a moving vehicle.

4. An apparatus as in claim 1 wherein during four stroke internal combustion, the piston is configured to drive a separate gas compressor to store gas for energy recovery by the two stroke expansion.

5. A method comprising:
causing a piston reciprocating within a cylinder to operate according to one of the following modes based upon a signal received from a controller,
an internal combustion mode in which gas admitted to the cylinder through a low pressure side valve and compressed by the piston is combusted with a fuel,
a compression mode in which gas admitted to the cylinder through a low pressure valve is compressed in an absence of combustion, and
an expansion mode in which compressed gas admitted to the cylinder through a high pressure valve is expanded in an absence of combustion.

6. A method as in claim 5 wherein the controller instructs operation in the compression mode during braking or idling of a motor vehicle.

7. A method as in claim 5 wherein the controller selects between the internal combustion mode and the expansion mode based upon an amount of stored compressed gas.

To summarize, the results shown above demonstrate performance feasibility of a reciprocating expansion system using externally heated air, working as part of a compressed air energy storage system. In particular, given a supply of compressed air at pressures between about 50 bar and 200 bar, a nominal 250 kW expansion system comprising three reciprocating stages can convert fuel to electrical power with an efficiency of about 70%, over the expected range of air source pressures of 200 bar down to 50 bar.

The energy output ratio of the heated expansion system working with a near-isothermal compressor with 85% efficiency, may lie between about 1.6 and 1.8, over a range of pressures. This compares with an expected energy output ratio of 0.7 for an unheated expansion system.

The energy output per unit mass of stored air of the heated expansion system is calculated to vary from about 0.268 kWh/kg at 200 bar, down to about 0.178 kWh/kg at 50 bar. The corresponding figures for an unheated expansion system may be about 0.105 kWh at 200 bar, down to about 0.077 kWh/kg at 50 bar. The heated expansion system may thus be able to deliver between about 2.3×-2.5× as much energy per unit mass of air, as could be achieved by an unheated expansion system.

Investigation of the effect of expander speed, showed that mean piston speeds above a threshold (e.g. ~7 m/s) could lead to a loss of efficiency due to friction and valve losses. Embodiments may accommodate high rotational speed provided that the length of the stroke does not cause an excessively high piston speed.

Calculations of integrated performance were performed of a nominal 250 kW reciprocating expansion system working at a fixed speed of 1200 rpm with a storage volume of 100 m³ over a pressure range between 50 and 200 bar. Such a system would generate 3.8 MWh of electrical energy over a period of 16 hours. The average expansion system efficiency with respect to fuel consumption was 73.9%. The average cycle efficiency including compression work was 31.2%.

The source of heat for the expansion system can be any fuel which can be burned at near atmospheric pressure to produce combustion gases at temperatures up to 750° C. Lower combustion temperatures may also be acceptable.

The burners used for external combustion may be operated continuously, allowing for much better control of the quality of combustion. This can lead to significantly lower generation of pollutants such as CO, NOx, and particulates.

In embodiments lacking a gearbox and/or frequency converter, an expansion system can be operated at constant speed of 1200 rpm, to maintain a substantially constant power output over a range of air source pressures from about 200 bar down to about 70 bar. The air source pressure can fall as low as 50 bar, with a corresponding modest reduction in expansion system power output. Some embodiments may include a gearbox or frequency converter, in order to achieve more flexibility in operation than is possible using a constant speed.

The expansion system can be used to provide electrical power to a compressor, which can be operated within a temperature range (e.g. near isothermal). The compressor may in turn deliver compressed air directly to the expansion system, with the net power available for export. Such an operational mode could continue as long as necessary, independently of the compressed air store.

Such a configuration likely differs from a corresponding energy storage and recovery system employing an unheated expansion system. There, it may be necessary to install a separate power source because the power output of the expansion system would be less than the power demand of the compressor when the compressed air store becomes depleted.

In operating in such a continuous mode, the overall electrical efficiency of the system with an externally heated expansion system is calculated to be about 32%. Although this is lower than the 40% electrical efficiency achieved by a diesel engine, it is still attractive, particularly when considering factors such as the fuel flexibility and environmental performance.

In the continuous mode of operation, a maximum net power output figure may be 130 kW, which is more than half the nominal power output of the expansion system alone. If more power is required in the continuous mode of operation, then it would be possible to achieve this if a gearbox or frequency converter is used.

An expansion system utilizing air heated by combustion, may be beneficially incorporated for use as distributed generation in factories, hotels, supermarkets, hospitals, ports, airports, campuses, office buildings, and other locales. In such an application, off-peak energy (or local renewable energy) could be stored as compressed air and then utilized with fuel at an efficiency of 70% or greater during periods of peak demand. Moreover, the application of external heating (as opposed to internal combustion) offers flexibility for use of a wide range of solid, liquid, or gaseous fuels.

In view of the relative contribution of frictional losses occurring in the 3rd stage of an exclusively reciprocating 3-stage expansion system, calculations were also performed for a mixed embodiment in which a turbine expander was substituted for the four reciprocating cylinders in the 3rd stage. Allowing for the friction of a speed reduction gear, it was estimated that the mixed expander combination would allow an improvement in expansion system efficiency from 75% to 80%. The overall efficiency (including compression work), could be improved from about 32% to 35%. This overall efficiency figure reflects compression being carried out by a reciprocating near-isothermal compressor operating with an efficiency of 85% relative to ideal isothermal compression.

1. An apparatus comprising:
a moveable member within a chamber and configured to be driven by compressed air;

a mechanical linkage in communication with the moveable member and configured to transmit power out of the chamber to an electrical generator; and a combustor external to the chamber and in thermal communication with the compressed air through a heat exchanger, the combustor configured to receive a combustion fuel and heated air output from a compressed air expander.

2. An apparatus as in claim 1 wherein the compressed air expander comprises the moveable member within the chamber.

3. An apparatus as in claim 1 wherein the compressed air expander comprises a next expansion stage.

4. An apparatus as in claim 3 wherein:
the moveable member comprises a piston;
the mechanical linkage comprises a piston rod; and
the next expansion stage comprises a reciprocating expander including a gas flow valve.

5. An apparatus as in claim 4 wherein the gas flow valve is hydraulically actuated.

6. An apparatus as in claim 3 wherein:
the moveable member comprises a piston;
the mechanical linkage comprises a piston rod; and
the next expansion stage comprises a rotary expander.

7. An apparatus as in claim 1 wherein:
the moveable member comprises a piston; and
the mechanical linkage comprises a piston rod.

8. An apparatus as in claim 1 wherein:
the moveable member is configured to rotate within the chamber; and
the mechanical linkage comprises a rotating shaft.

9. An apparatus as in claim 1 wherein the combustor comprises a duct burner.

10. An apparatus as in claim 1 wherein the heat exchanger comprises a tubular heat exchanger.

11. An apparatus as in claim 1 further comprising a compressed air storage unit storing the compressed gas prior to exposure to the heat exchanger.

12. An apparatus as in claim 11 further comprising an air compressor in communication with the compressed air storage unit.

13. An apparatus as in claim 12 wherein the air compressor is configured to generate the compressed air within a temperature range.

14. An apparatus as in claim 13 wherein the air compressor is configured to generate the compressed air in conjunction with gas-liquid heat exchange.

15. An apparatus as in claim 12 wherein the air compressor comprises a rotary compressor.

16. An apparatus as in claim 12 wherein the air compressor comprises a reciprocating compressor.

17. An apparatus as in claim 12 wherein the air compressor is configured to be operated by the mechanical linkage.

18. An apparatus as in claim 12 wherein the air compressor is configured to be operated by electrical power from the generator.

19. An apparatus as in claim 12 wherein the air compressor is configured to be operated by a turbine.

20. An apparatus as in claim 19 wherein the air compressor is configured to be operated by a wind turbine.

21. A method comprising:
providing a moveable member within a chamber and in communication with a mechanical linkage;
heating compressed air by thermal communication with combustion products created external to the chamber by ignition of a fuel in expanded heated air;
flowing the heated compressed air into the chamber to drive the moveable member and the mechanical linkage; and
operating an electrical generator from the mechanical linkage.

22. A method as in claim 21 wherein the expanded heated air comprises exhaust from the chamber.

23. A method as in claim 21 wherein the expanded heated air comprises exhaust from a next expansion stage.

24. A method as in claim 23 wherein:
the moveable member comprises a piston;
the mechanical linkage comprises a piston rod; and
the next expansion stage comprises a reciprocating expander including a gas flow valve.

25. A method as in claim 24 wherein the gas flow valve is hydraulically actuated.

26. A method as in claim 23 wherein:
the moveable member comprises a piston;
the mechanical linkage comprises a piston rod; and
the next expansion stage comprises a rotary expander.

27. A method as in claim 21 wherein:
the moveable member comprises a piston; and
the mechanical linkage comprises a piston rod.

28. A method as in claim 21 wherein:
the moveable member is configured to rotate within the chamber; and
the mechanical linkage comprises a rotating shaft.

29. A method as in claim 21 wherein the combustion products are created in a duct burner.

30. A method as in claim 21 wherein the compressed air is heated by being flowed through a tube of a tube in shell heat exchanger.

31. A method as in claim 21 further comprising storing the compressed air in a compressed air storage unit prior to the heating.

32. A method as in claim 21 further comprising generating the compressed air by operation of a compressor.

33. A method as in claim 32 wherein the compressor is operated by the mechanical linkage.

34. A method as in claim 32 wherein the compressor is operated by electricity from the electrical generator.

35. A method as in claim 32 wherein the compressor is operated by a turbine.

36. A method as in claim 35 wherein the turbine comprises a wind turbine.

37. A method as in claim 32 wherein the compressor maintains a gas temperature within a range.

38. A method as in claim 35 wherein the gas temperature is maintained within the range by gas-liquid heat exchange.

As mentioned above, an expander featuring may be used in combination with a gas compressor to form an energy storage and recovery system. In certain embodiments, a compressor may be configured to compress gas within a limited temperature range, for example to achieve isothermal or near-isothermal performance offering important thermodynamic efficiencies.

Certain compressed gas energy storage approaches are described in U.S. Patent Publication No. 2011/0115223 ("the Publication"), which is incorporated by reference in its entirety herein for all purposes. According to the Publication, gas may be compressed in the presence of liquid water as a heat exchange medium. That is, heat generated from the compression of gas is transferred across a gas-liquid boundary (e.g. fine droplets), such that the temperature experienced by the gas remains within a relatively small range over the course of the course of the compression cycle. This enhances the thermodynamic efficiency of the compression process. The transferred heat of gas compression may be retained in the heated water, and may be available for other uses.

A compressor as described in the Publication, may utilize a reciprocating or rotating moveable member for gas compression. An example of the former is a solid piston connected to a mechanical linkage comprising a piston rod and rotating shaft (e.g. crankshaft). An example of the latter is a rotating turbine, screw, or other structure connected to a mechanical linkage comprising a rotating shaft.

In certain embodiments, liquid may be introduced directly into the compression chamber for heat exchange. In certain embodiments, liquid may be introduced to gas in a mixing chamber upstream of the compression chamber.

What is claimed is:

1. An apparatus comprising:
   a moveable member within a chamber and configured to be driven by compressed air;
   a mechanical linkage in communication with the moveable member and configured to transmit power out of the chamber to an electrical generator;
   a combustor external to the chamber and in thermal communication with the compressed air through a heat exchanger, the combustor configured to receive a combustion fuel and heated air output from a compressed air expander, wherein the heat exchanger is configured to maintain the compressed air physically separate from combustion products of the combustor; and
   further comprising a compressed air storage unit separate from the chamber and defining a fixed space to store the compressed gas prior to exposure to the heat exchanger.

2. An apparatus as in claim 1 wherein the compressed air expander comprises a next expansion stage.

3. An apparatus as in claim 2 wherein:
   the moveable member comprises a piston;
   the mechanical linkage comprises a piston rod; and
   the next expansion stage comprises a reciprocating expander including a gas flow valve.

4. An apparatus as in claim 3 wherein the gas flow valve is hydraulically actuated.

5. An apparatus as in claim 2 wherein:
   the moveable member comprises a piston;
   the mechanical linkage comprises a piston rod; and
   the next expansion stage comprises a rotary expander.

6. An apparatus as in claim 2 wherein the next expansion stage comprises internal combustion of a fuel.

7. An apparatus as in claim 6 wherein:
   the moveable member is configured to reciprocate within the chamber to operate according to an intake stroke and an exhaust stroke; and
   the next expansion stage is configured to operate according to four strokes.

8. An apparatus as in claim 7 further comprising a two-way valve in communication with a low pressure valve of the next expansion stage.

9. An apparatus as in claim 6 wherein the chamber and the next expansion stage are located in a vehicle.

10. An apparatus as in claim 2 wherein the chamber and the next expansion stage are located in a vehicle.

11. An apparatus as in claim 1 wherein:
    the moveable member comprises a piston; and
    the mechanical linkage comprises a piston rod.

12. An apparatus as in claim 1 wherein:
    the moveable member is configured to rotate within the chamber; and
    the mechanical linkage comprises a rotating shaft.

13. An apparatus as in claim 1 wherein the combustor comprises a duct burner.

14. An apparatus as in claim 1 wherein the heat exchanger comprises a tubular heat exchanger.

15. An apparatus as in claim 1 wherein the compressed air expander comprises the moveable member within the chamber.

16. An apparatus as in claim 1 further comprising an air compressor in communication with the compressed air storage unit.

17. An apparatus as in claim 16 wherein the air compressor is configured to generate the compressed air within a temperature range.

18. An apparatus as in claim 16 wherein the air compressor is configured to generate the compressed air in conjunction with gas-liquid heat exchange.

19. An apparatus as in claim 16 wherein the air compressor comprises a rotary compressor.

20. An apparatus as in claim 16 wherein the air compressor comprises a reciprocating compressor.

21. An apparatus as in claim 16 wherein the air compressor is configured to be operated by the mechanical linkage.

22. An apparatus as in claim 16 wherein the air compressor is configured to be operated by electrical power from the generator.

23. An apparatus as in claim 16 wherein the air compressor is configured to be operated by a turbine.

24. An apparatus as in claim 23 wherein the air compressor is configured to be operated by a wind turbine.

25. An apparatus as in claim 16 wherein the air compressor is configured to be operated by moving wheels of a vehicle.

26. An apparatus as in claim 16 wherein the air compressor is configured to be operated by internal combustion of a lower pressure stage.

* * * * *